Jan. 27, 1959 E. J. LEONARD 2,871,297
100-LINE DIRECT-ACCESS CROSSBAR TELEPHONE SWITCHING UNIT
Filed March 8, 1954 26 Sheets-Sheet 1
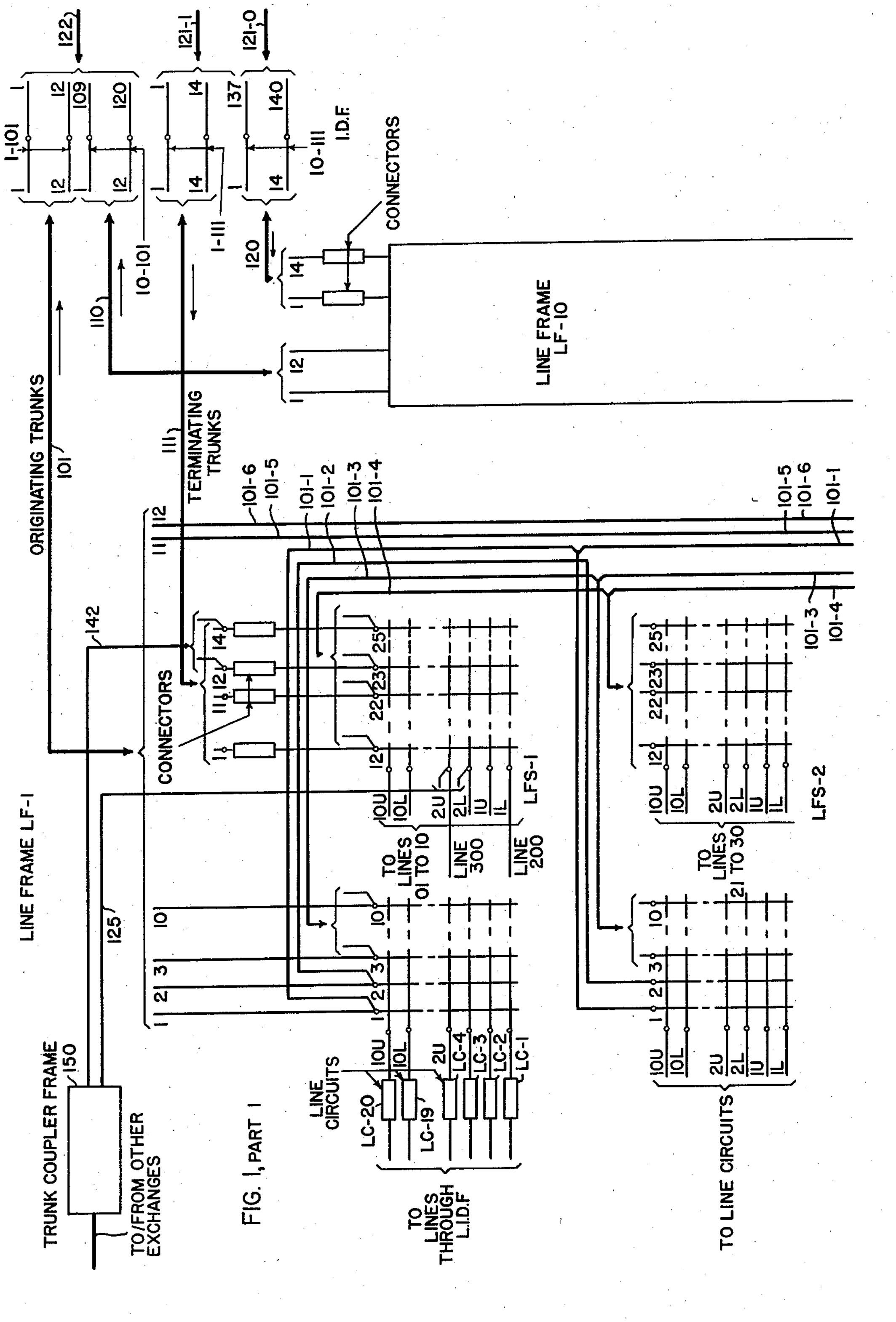
FIG. 1, PART 1

Jan. 27, 1959 E. J. LEONARD 2,871,297
100-LINE DIRECT-ACCESS CROSSBAR TELEPHONE SWITCHING UNIT
Filed March 8, 1954 26 Sheets-Sheet 2
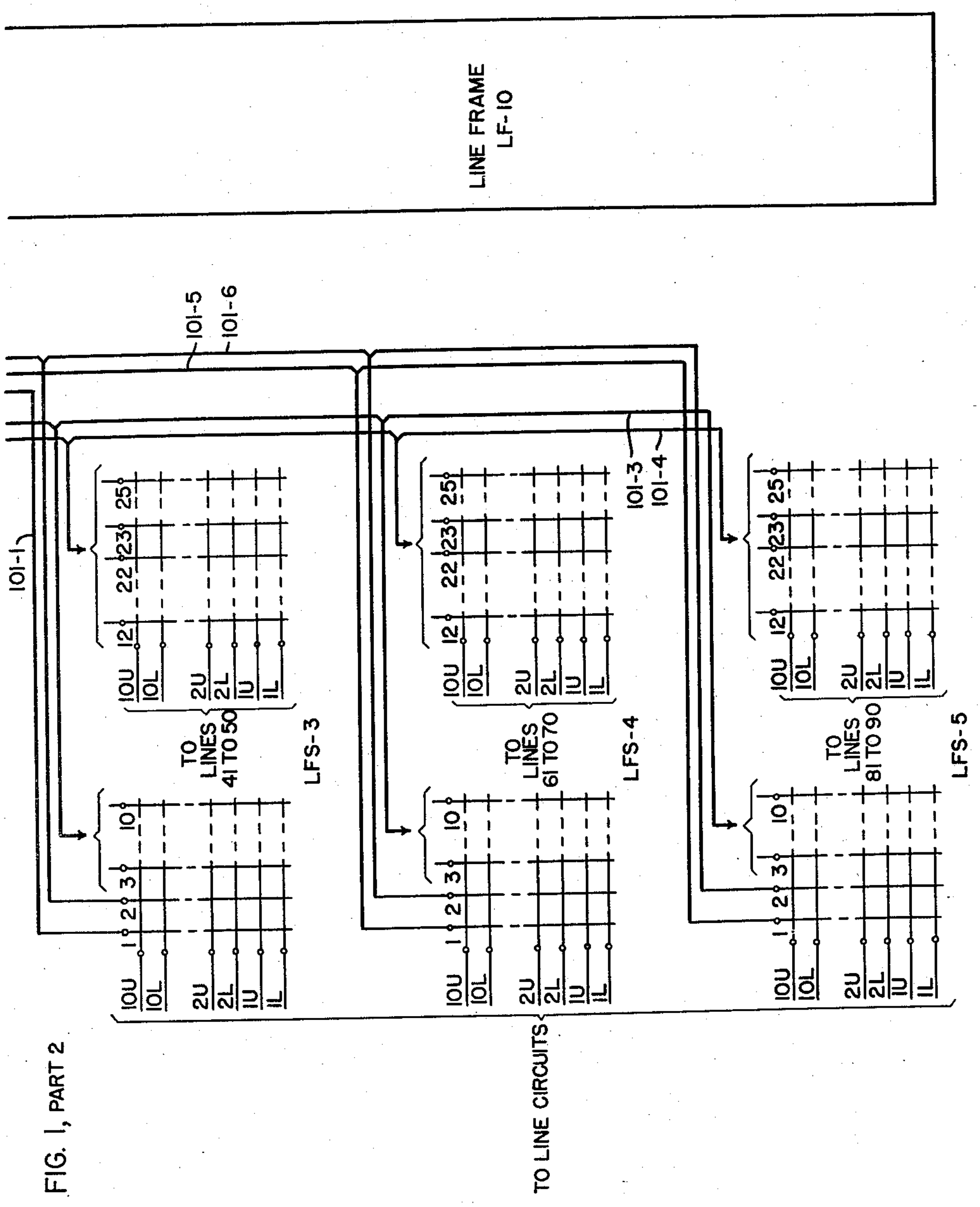
FIG. 1, PART 2

Jan. 27, 1959 E. J. LEONARD 2,871,297
100-LINE DIRECT-ACCESS CROSSBAR TELEPHONE SWITCHING UNIT
Filed March 8, 1954 26 Sheets-Sheet 3
FIG. 1, PART 3
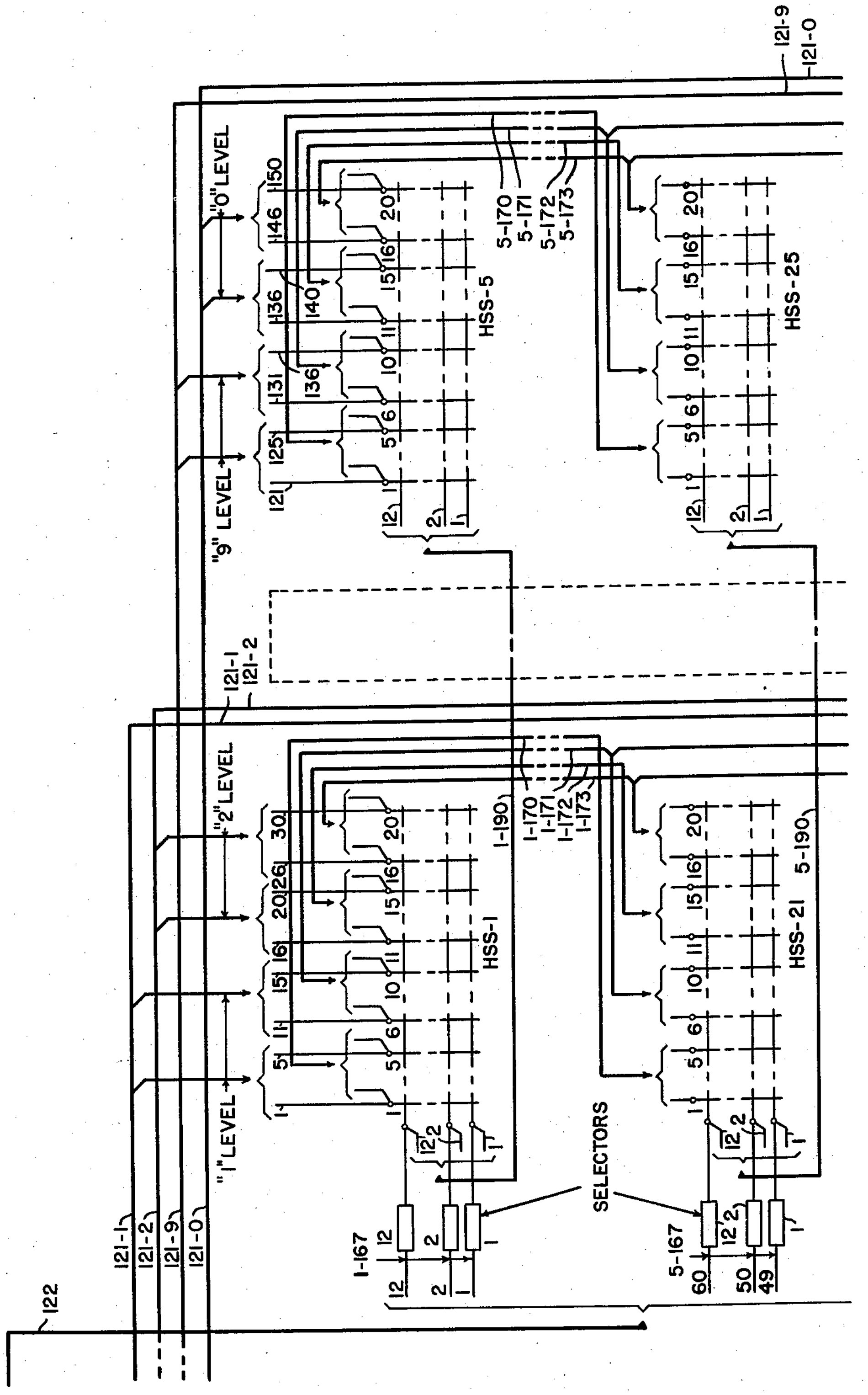

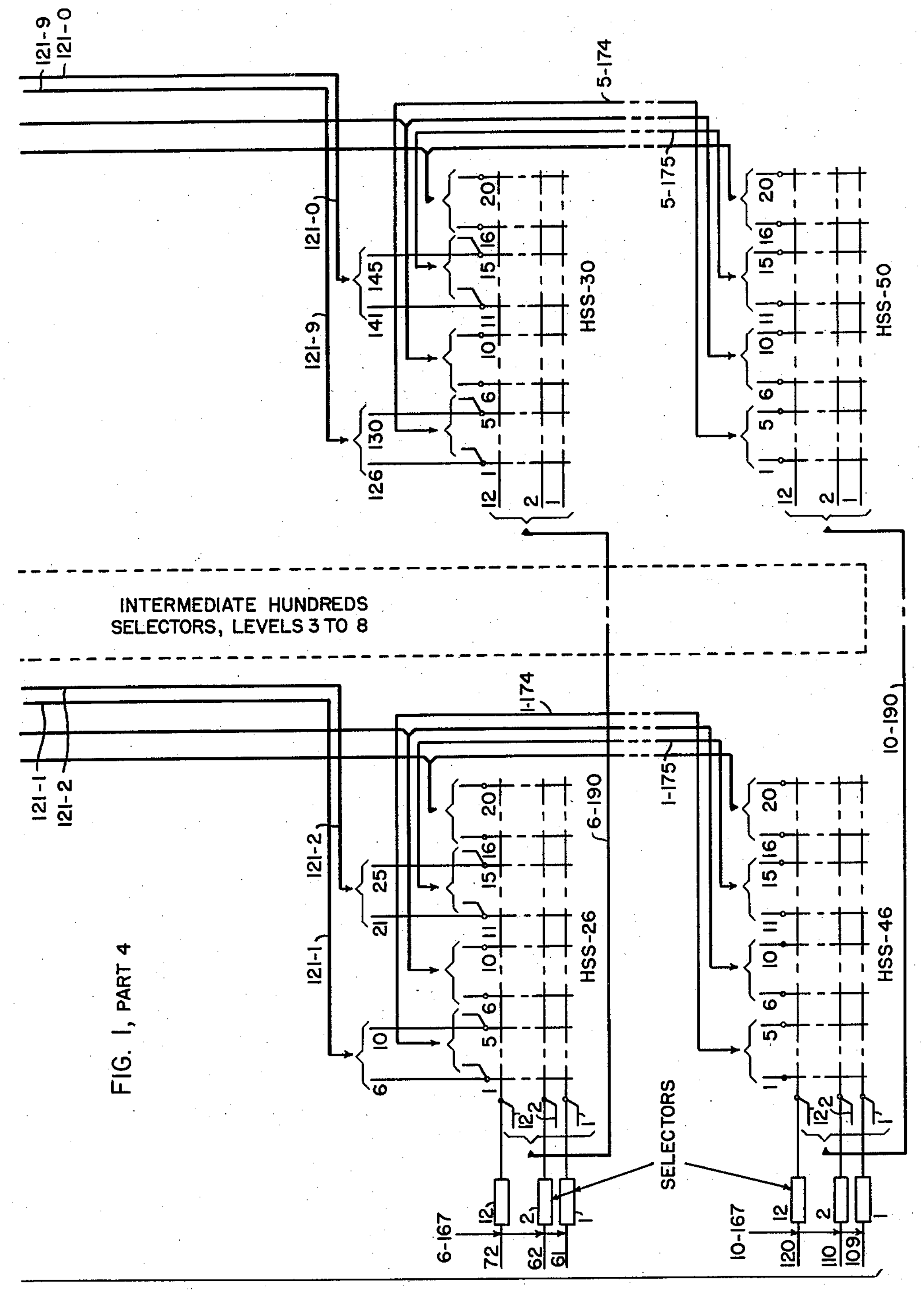
FIG. 1, PART 4

Jan. 27, 1959 E. J. LEONARD 2,871,297

100-LINE DIRECT-ACCESS CROSSBAR TELEPHONE SWITCHING UNIT

Filed March 8, 1954 26 Sheets-Sheet 5

Jan. 27, 1959 E. J. LEONARD 2,871,297

100-LINE DIRECT-ACCESS CROSSBAR TELEPHONE SWITCHING UNIT

Filed March 8, 1954 26 Sheets-Sheet 6

Jan. 27, 1959 E. J. LEONARD 2,871,297
100-LINE DIRECT-ACCESS CROSSBAR TELEPHONE SWITCHING UNIT
Filed March 8, 1954 26 Sheets-Sheet 7
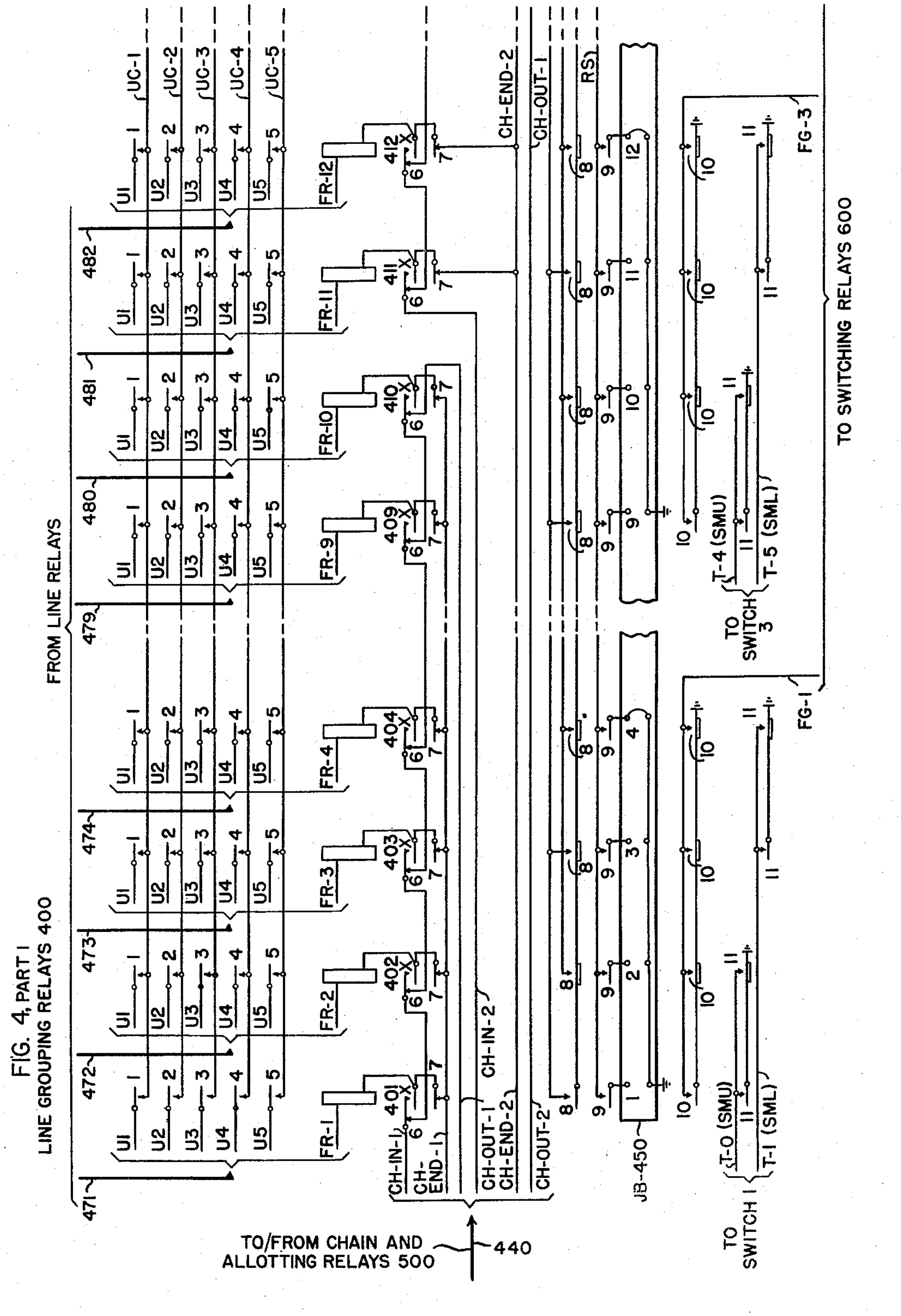
FIG. 4, PART I

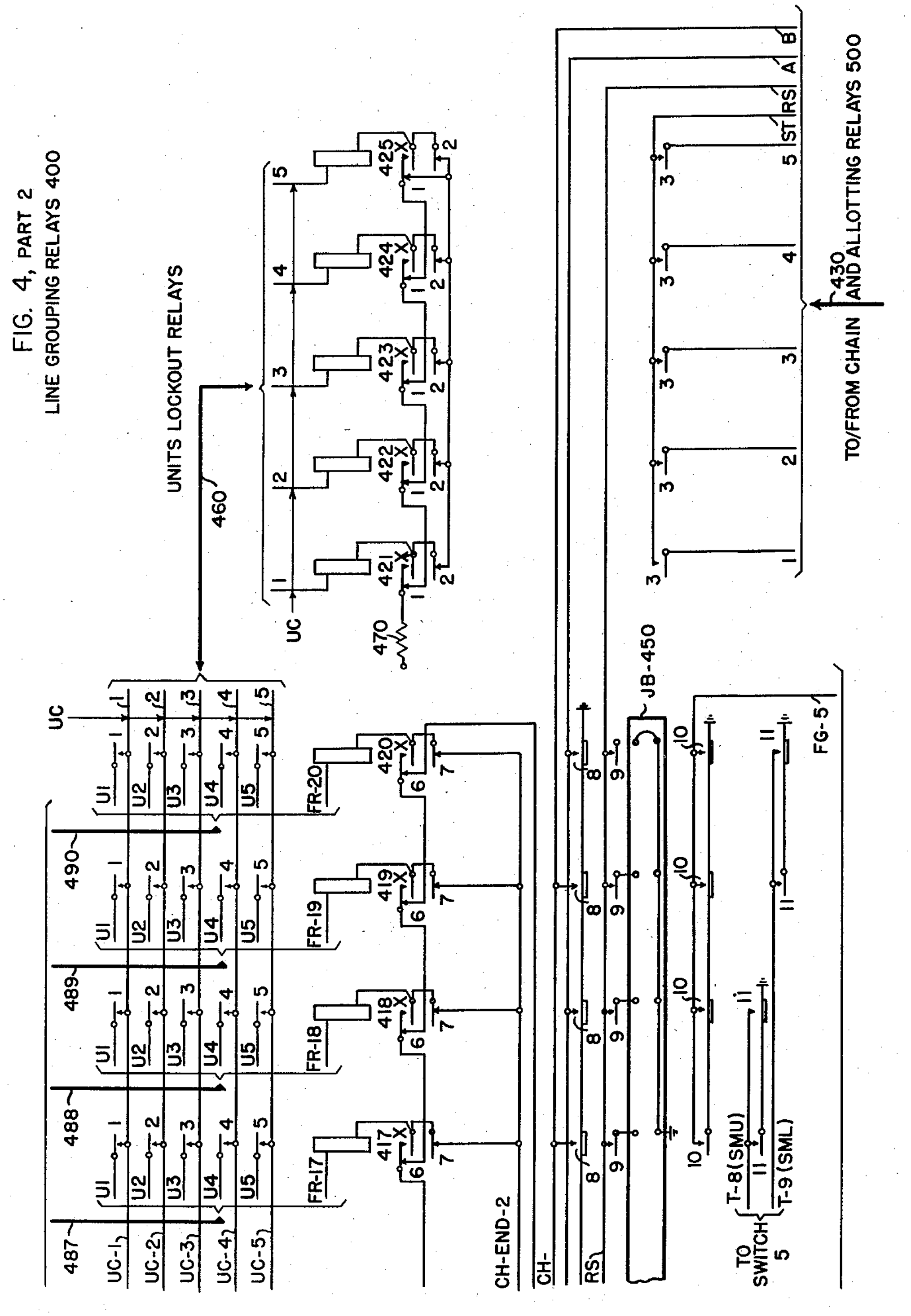
FIG. 4, PART 2

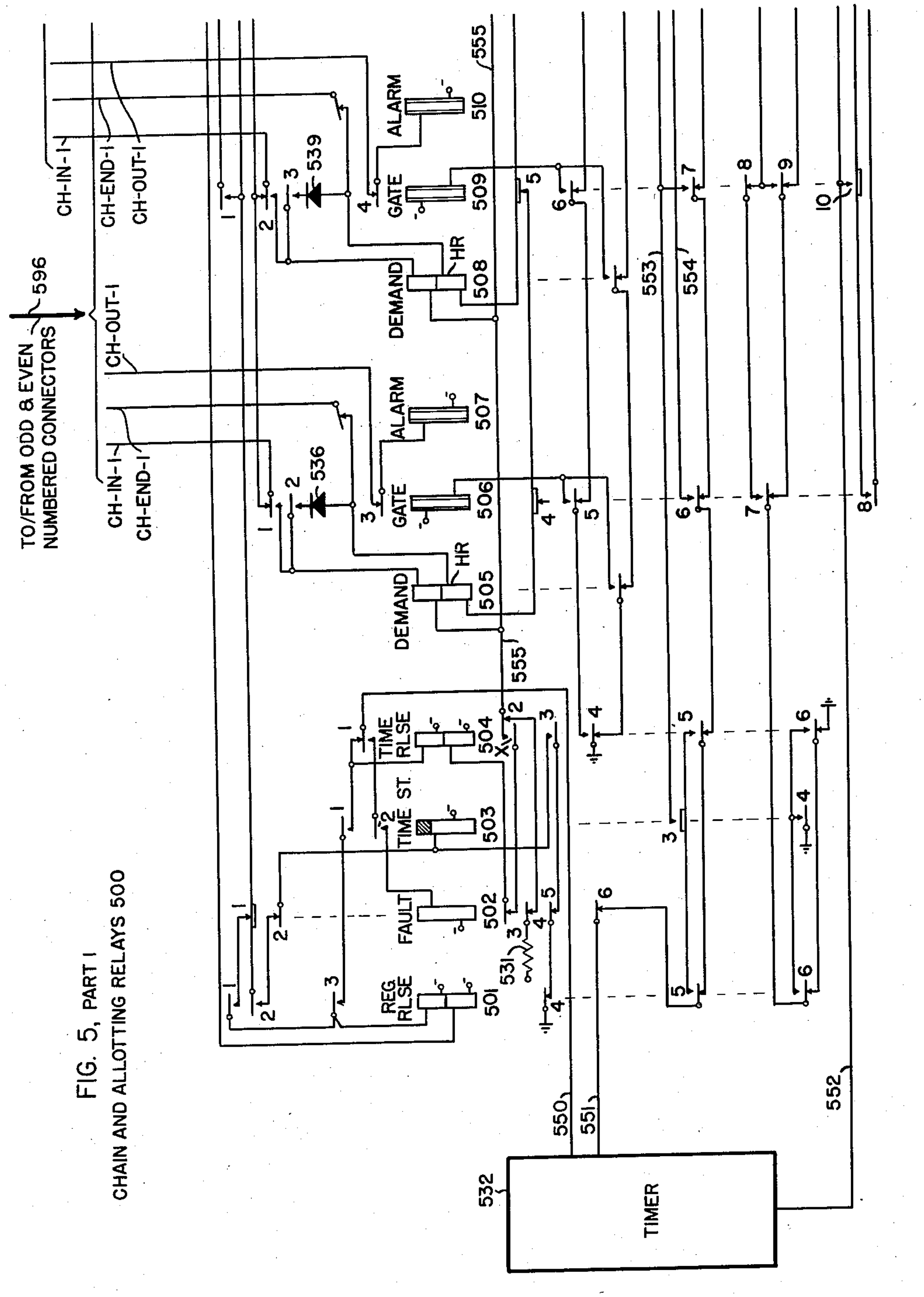
FIG. 5, PART I
CHAIN AND ALLOTTING RELAYS 500

Jan. 27, 1959 E. J. LEONARD 2,871,297
100-LINE DIRECT-ACCESS CROSSBAR TELEPHONE SWITCHING UNIT
Filed March 8, 1954 26 Sheets-Sheet 10
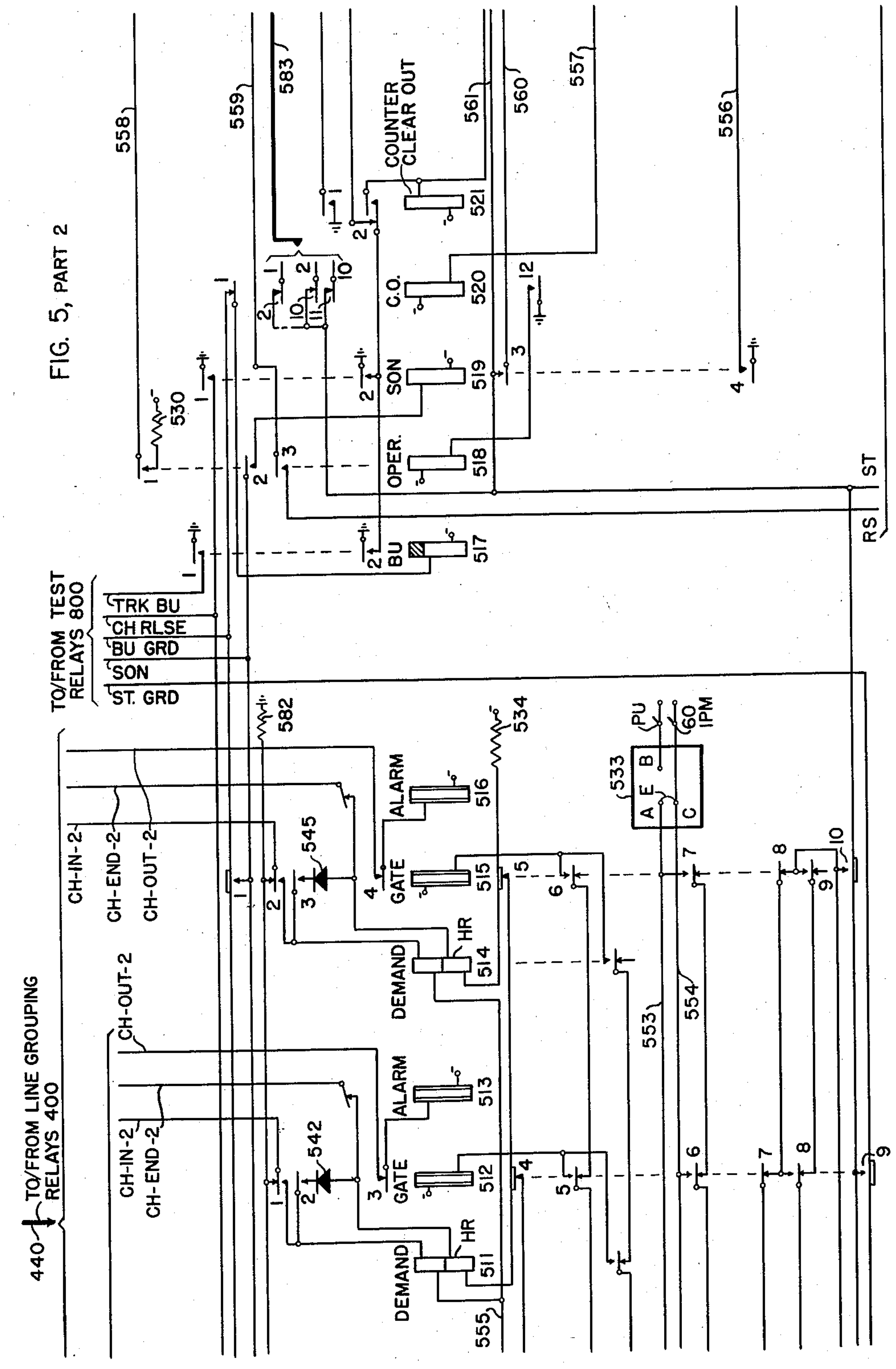
FIG. 5, PART 2

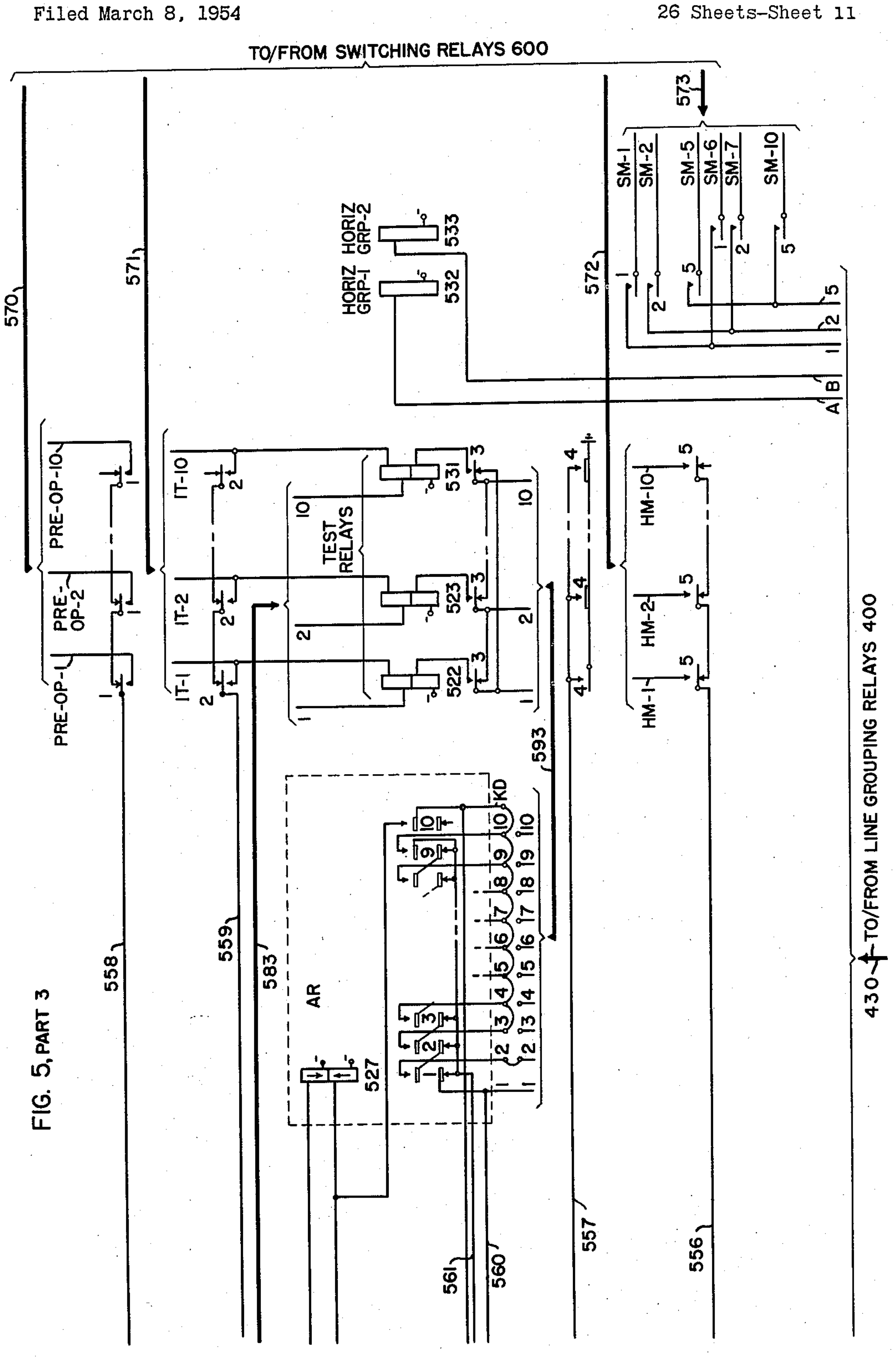
FIG. 5, PART 3

Jan. 27, 1959 E. J. LEONARD 2,871,297
100-LINE DIRECT-ACCESS CROSSBAR TELEPHONE SWITCHING UNIT
Filed March 8, 1954 26 Sheets-Sheet 12
FIG. 6, PART I
SWITCHING RELAYS 600
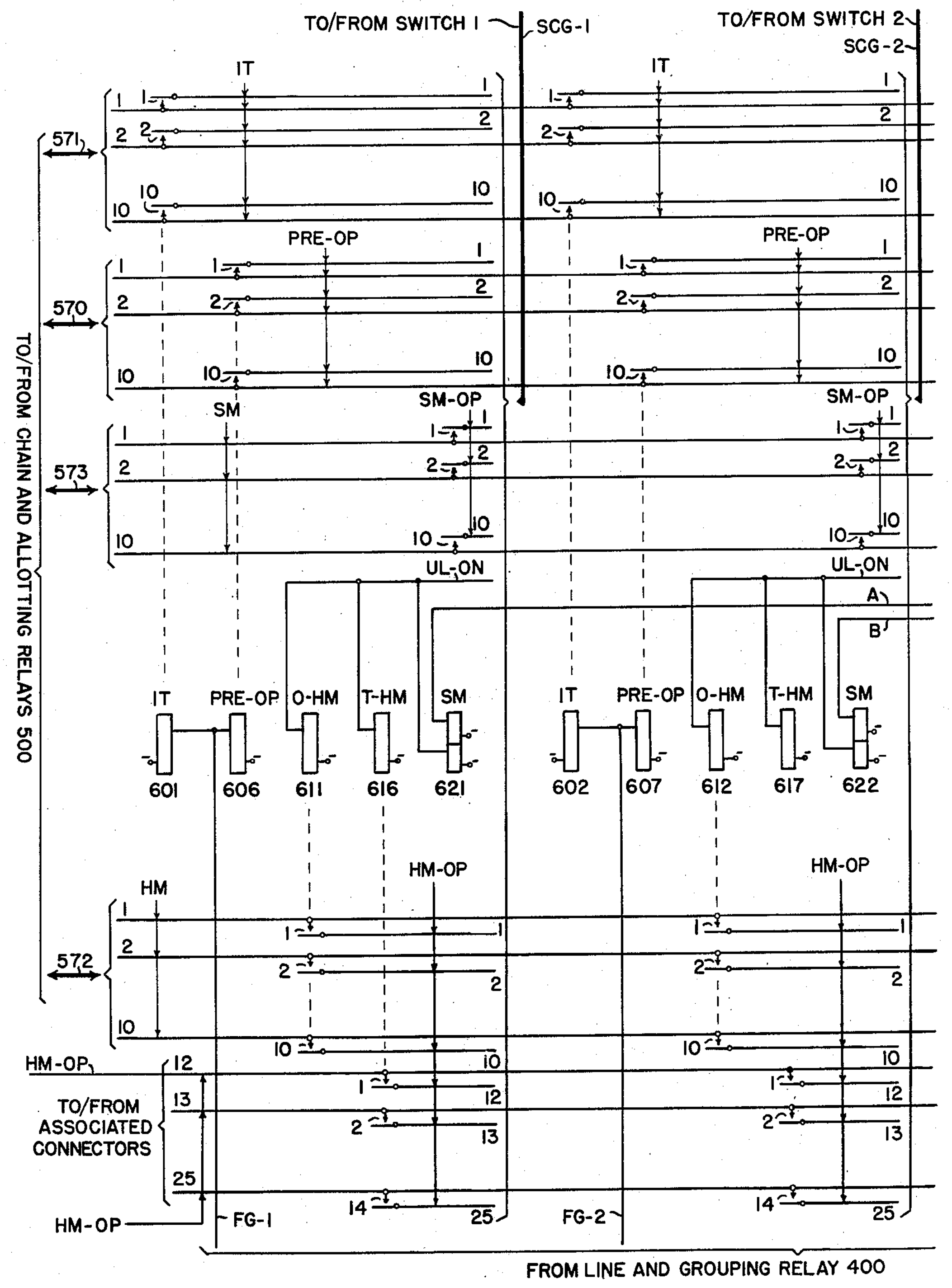

FIG. 6, PART 2
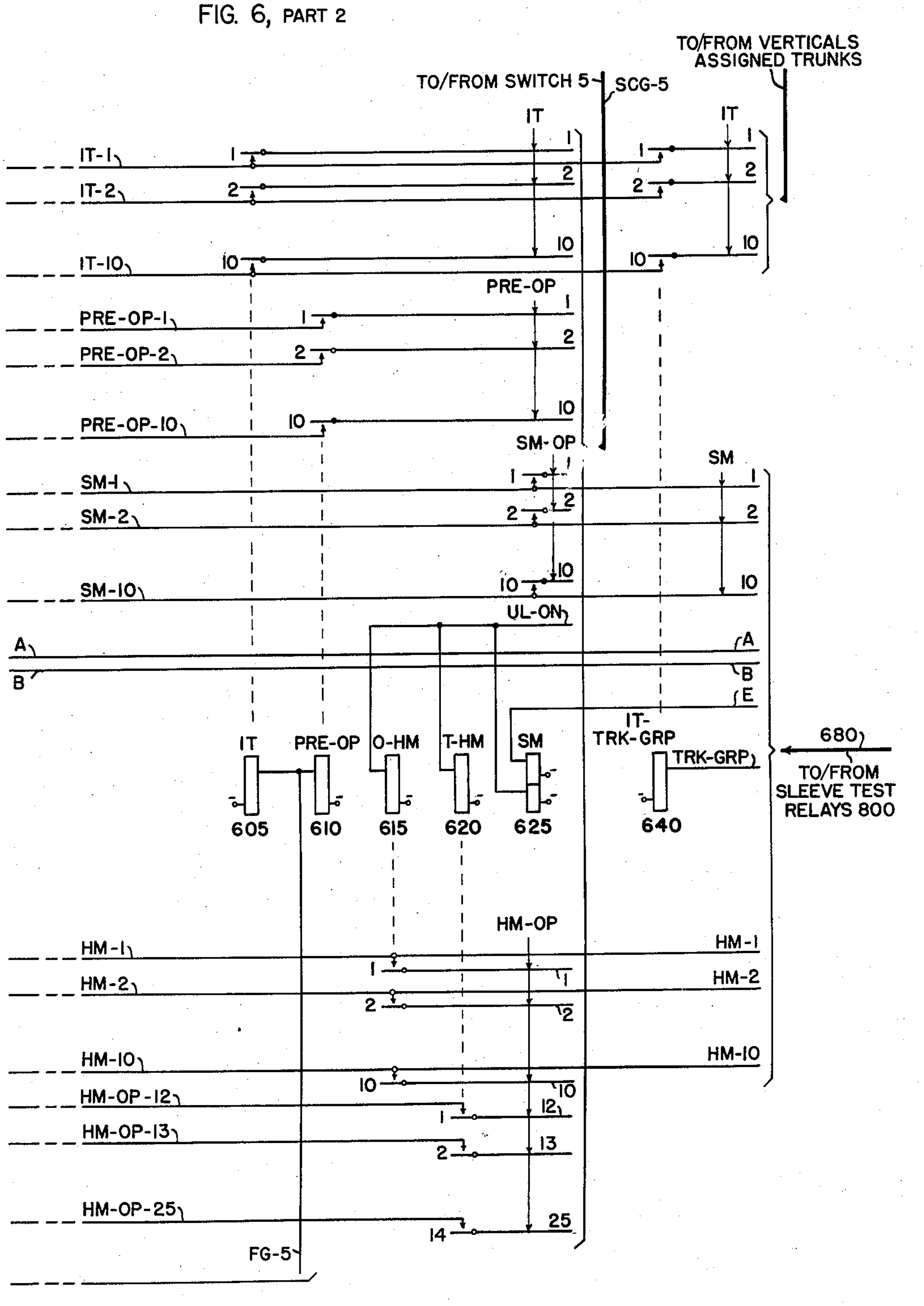

Jan. 27, 1959 E. J. LEONARD 2,871,297

100-LINE DIRECT-ACCESS CROSSBAR TELEPHONE SWITCHING UNIT

Filed March 8, 1954 26 Sheets-Sheet 14

PIN-TERMINAL SECTION 700

Jan. 27, 1959 E. J. LEONARD 2,871,297
100-LINE DIRECT-ACCESS CROSSBAR TELEPHONE SWITCHING UNIT
Filed March 8, 1954 26 Sheets-Sheet 15
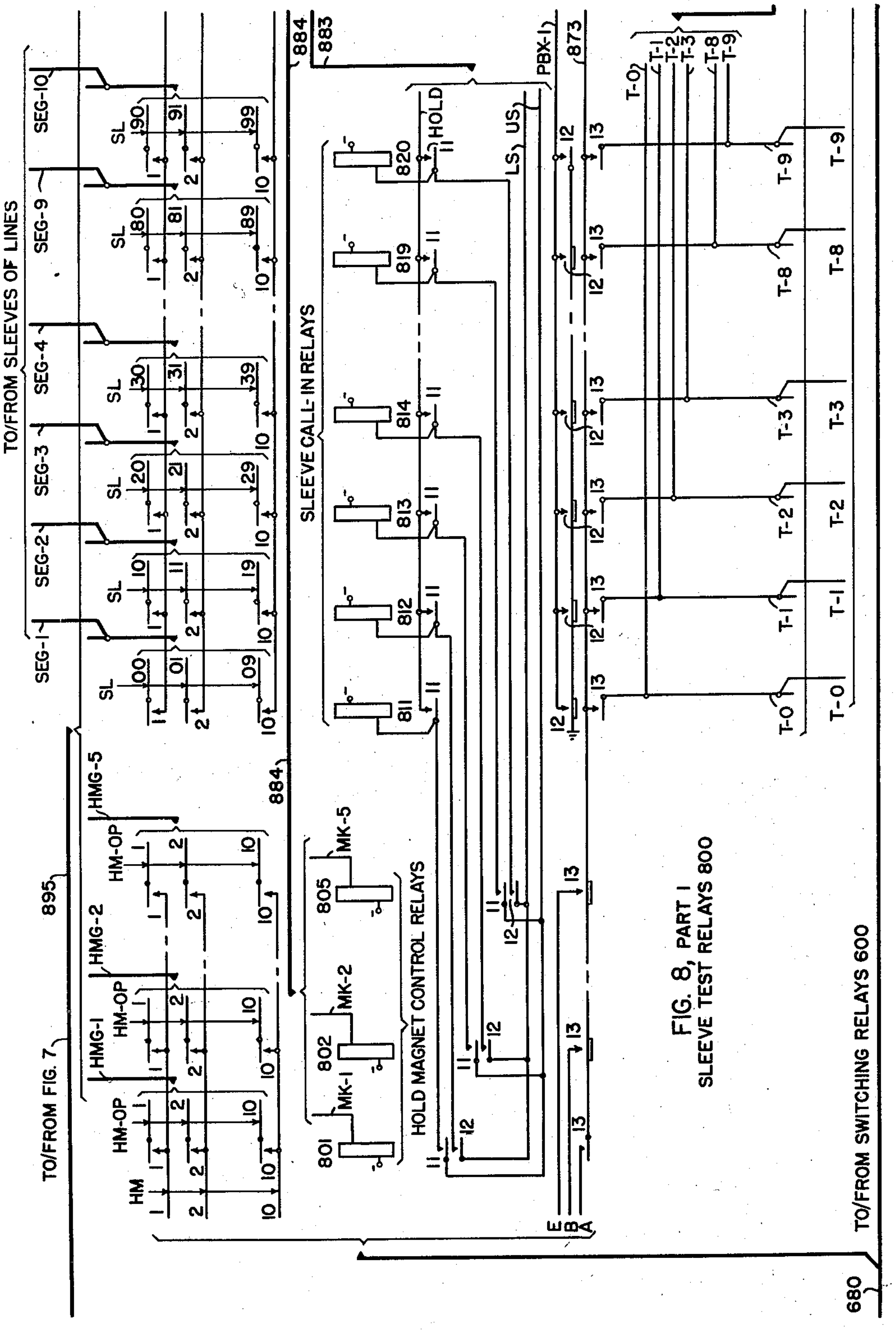
FIG. 8, PART I
SLEEVE TEST RELAYS 800

Jan. 27, 1959 E. J. LEONARD 2,871,297
100-LINE DIRECT-ACCESS CROSSBAR TELEPHONE SWITCHING UNIT
Filed March 8, 1954 26 Sheets-Sheet 16
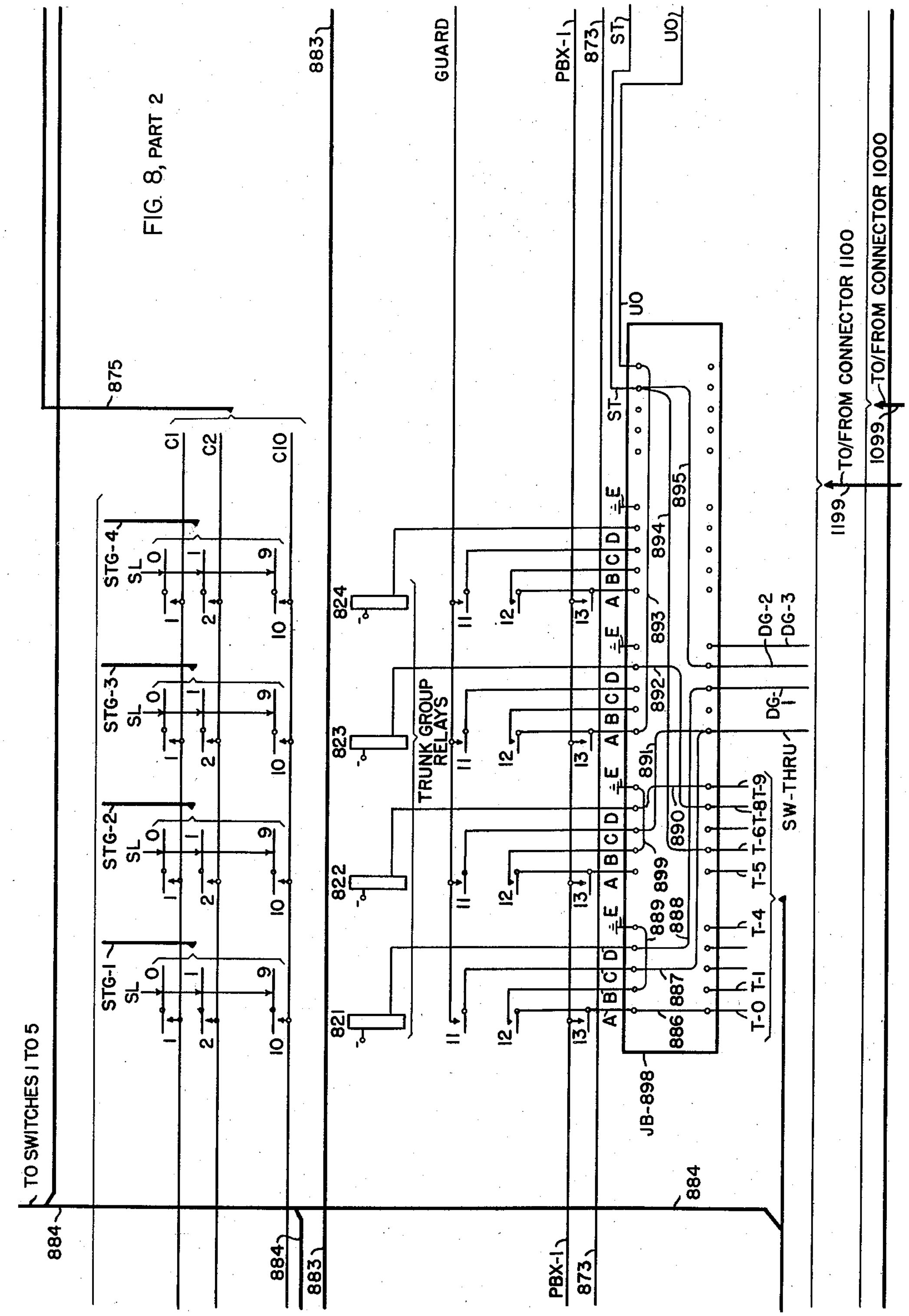
FIG. 8, PART 2

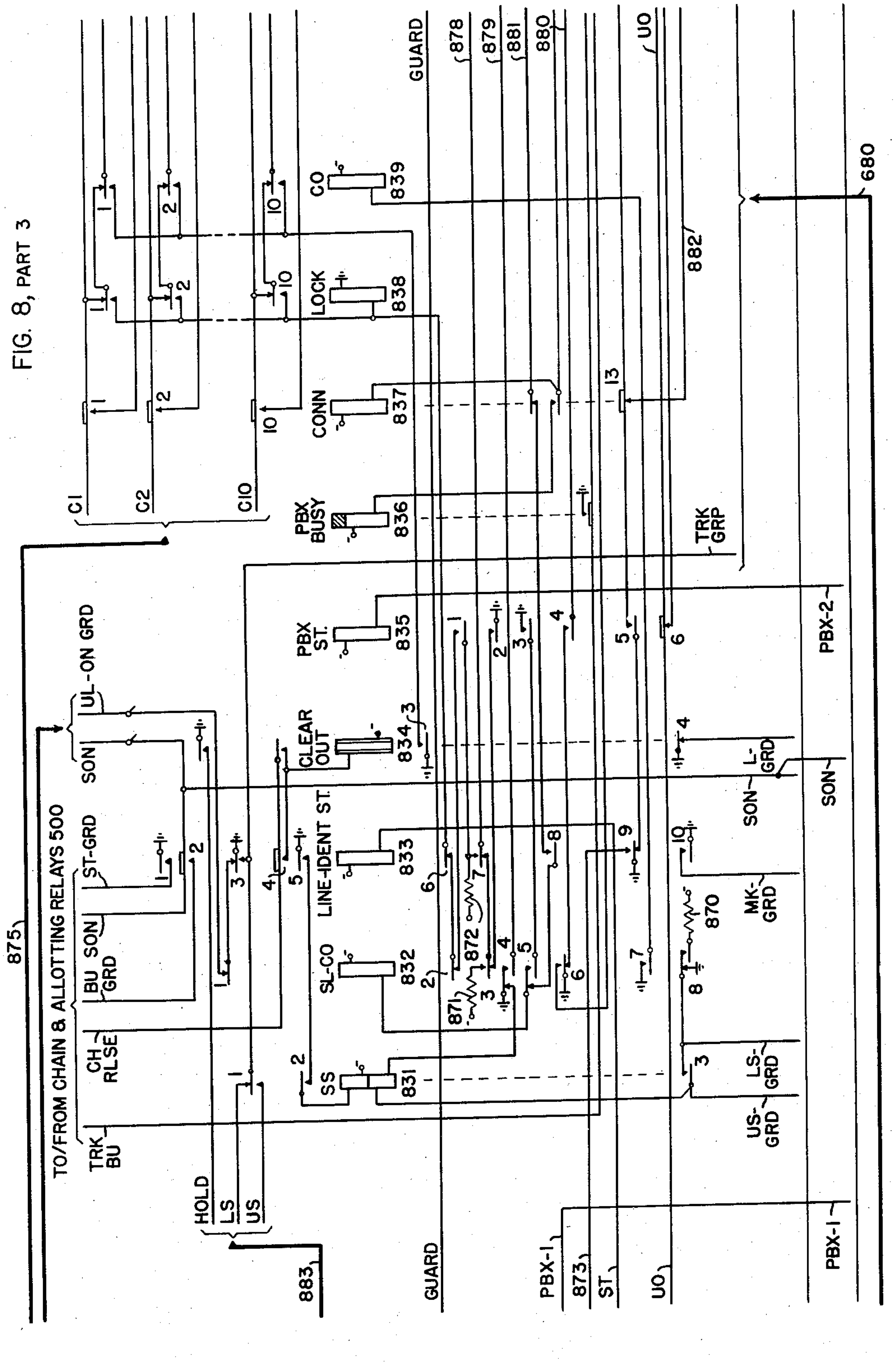
FIG. 8, PART 3

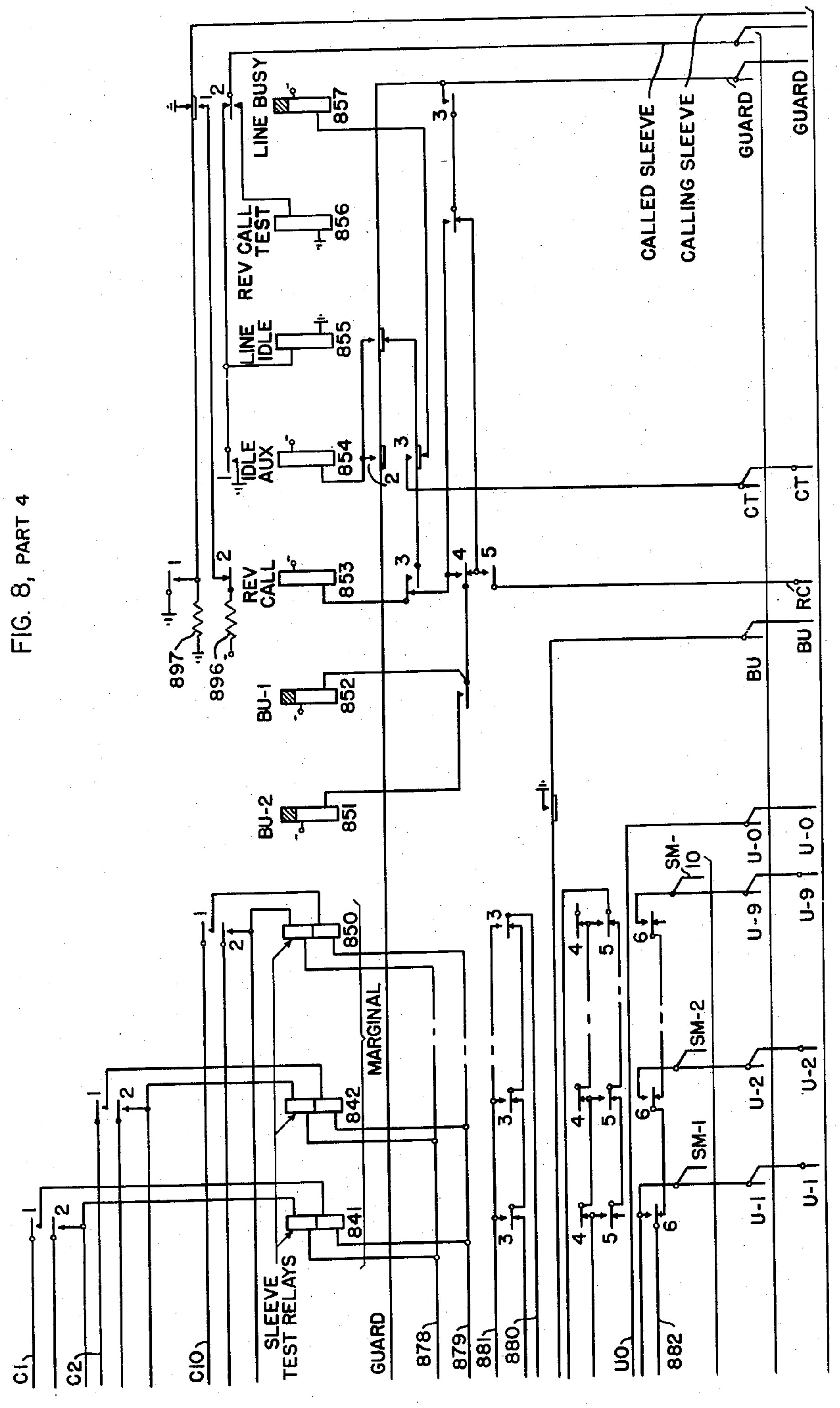
FIG. 8, PART 4

Jan. 27, 1959 E. J. LEONARD 2,871,297

100-LINE DIRECT-ACCESS CROSSBAR TELEPHONE SWITCHING UNIT

Filed March 8, 1954 26 Sheets-Sheet 19

Jan. 27, 1959 E. J. LEONARD 2,871,297
100-LINE DIRECT-ACCESS CROSSBAR TELEPHONE SWITCHING UNIT
Filed March 8, 1954 26 Sheets-Sheet 21
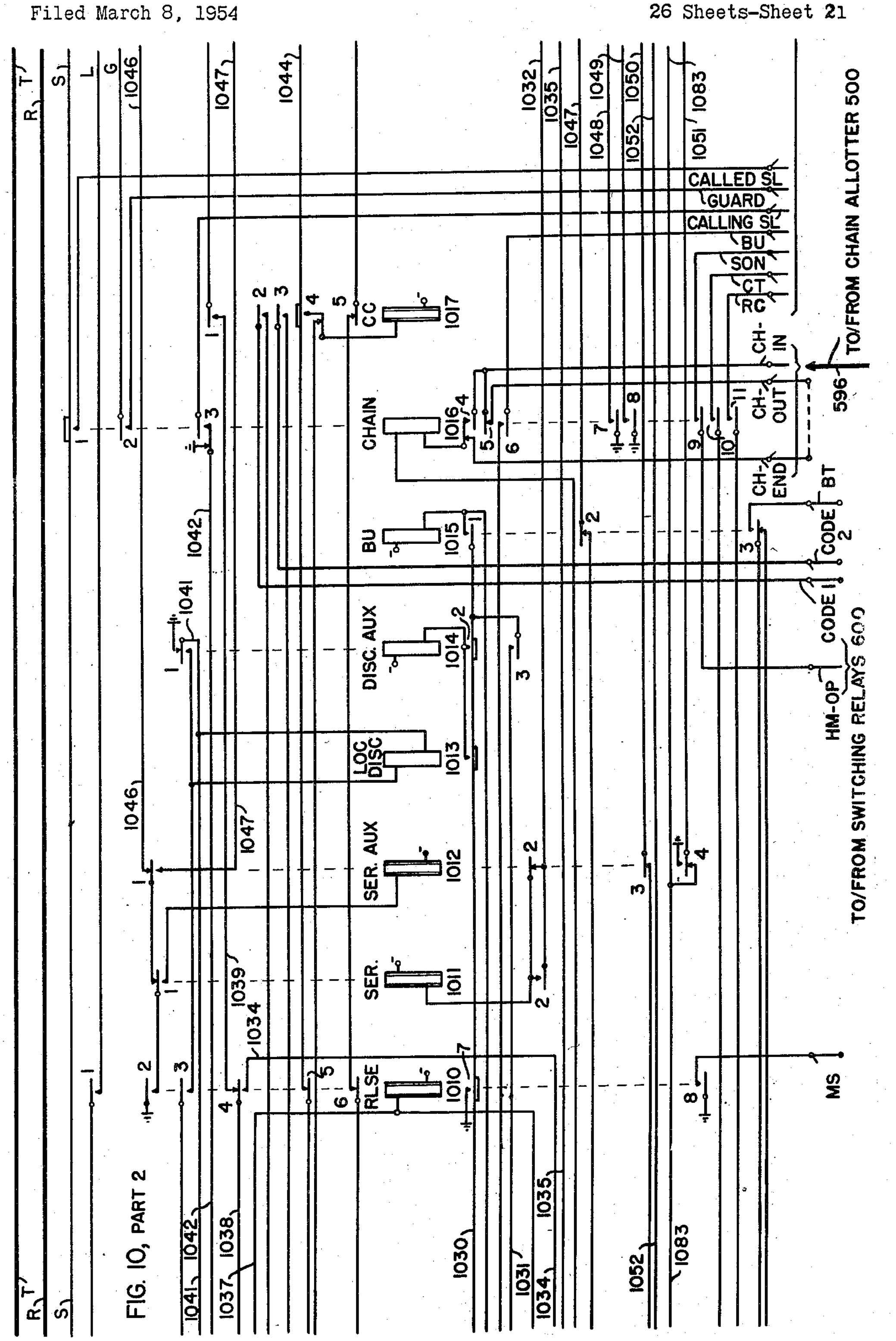
FIG. 10, PART 2

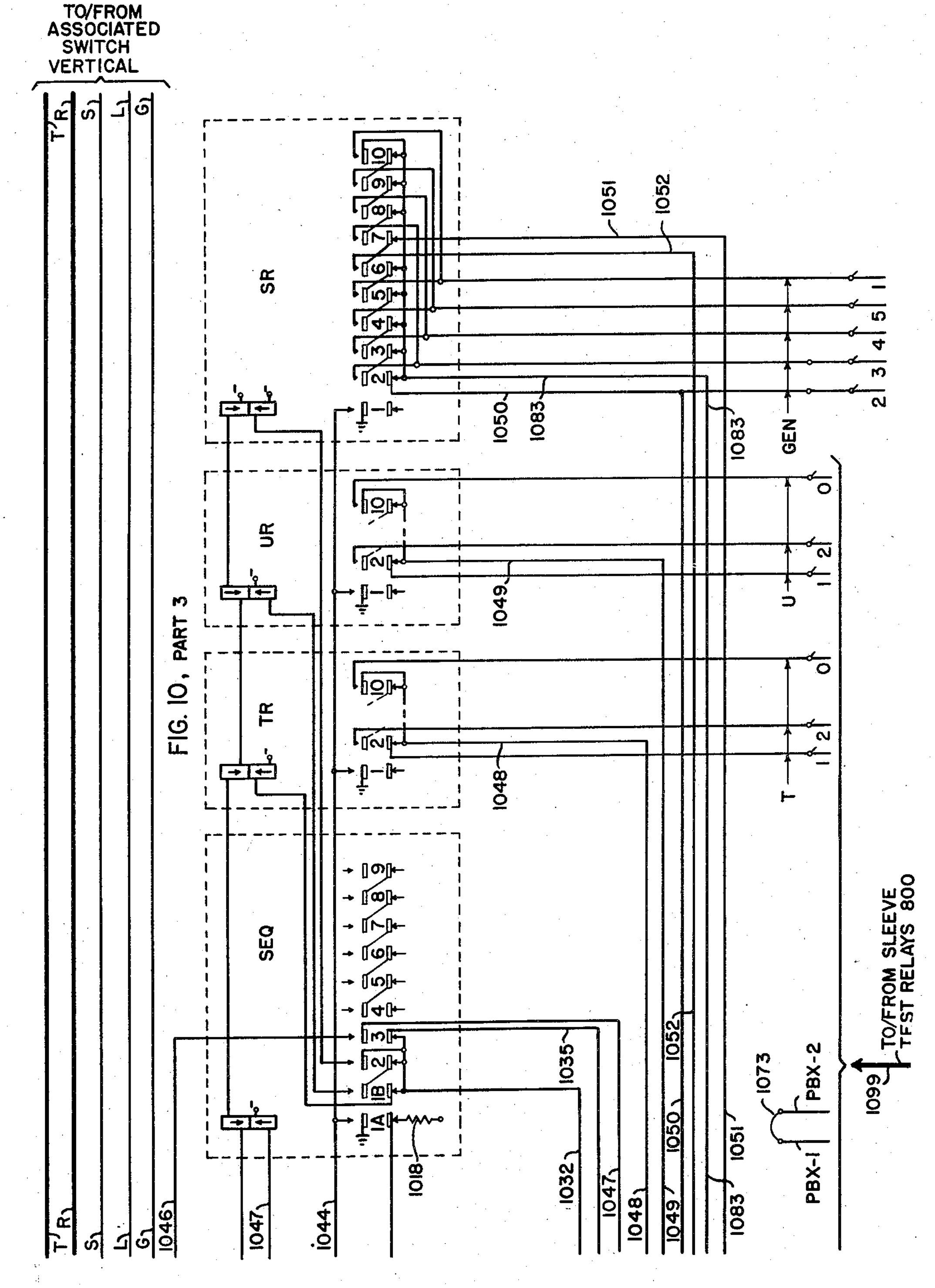
FIG. 10, PART 3

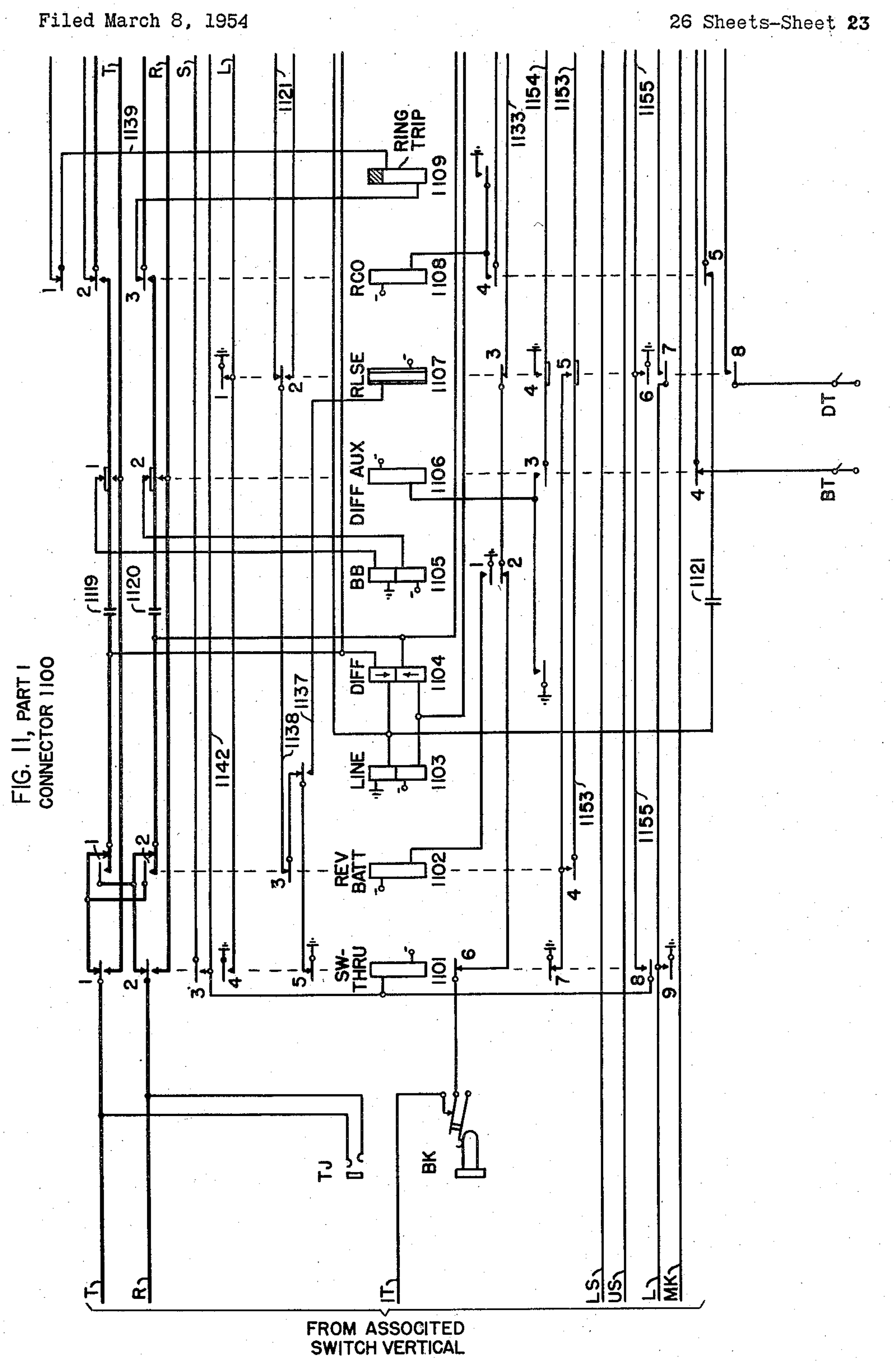
FIG. 11, PART I CONNECTOR 1100

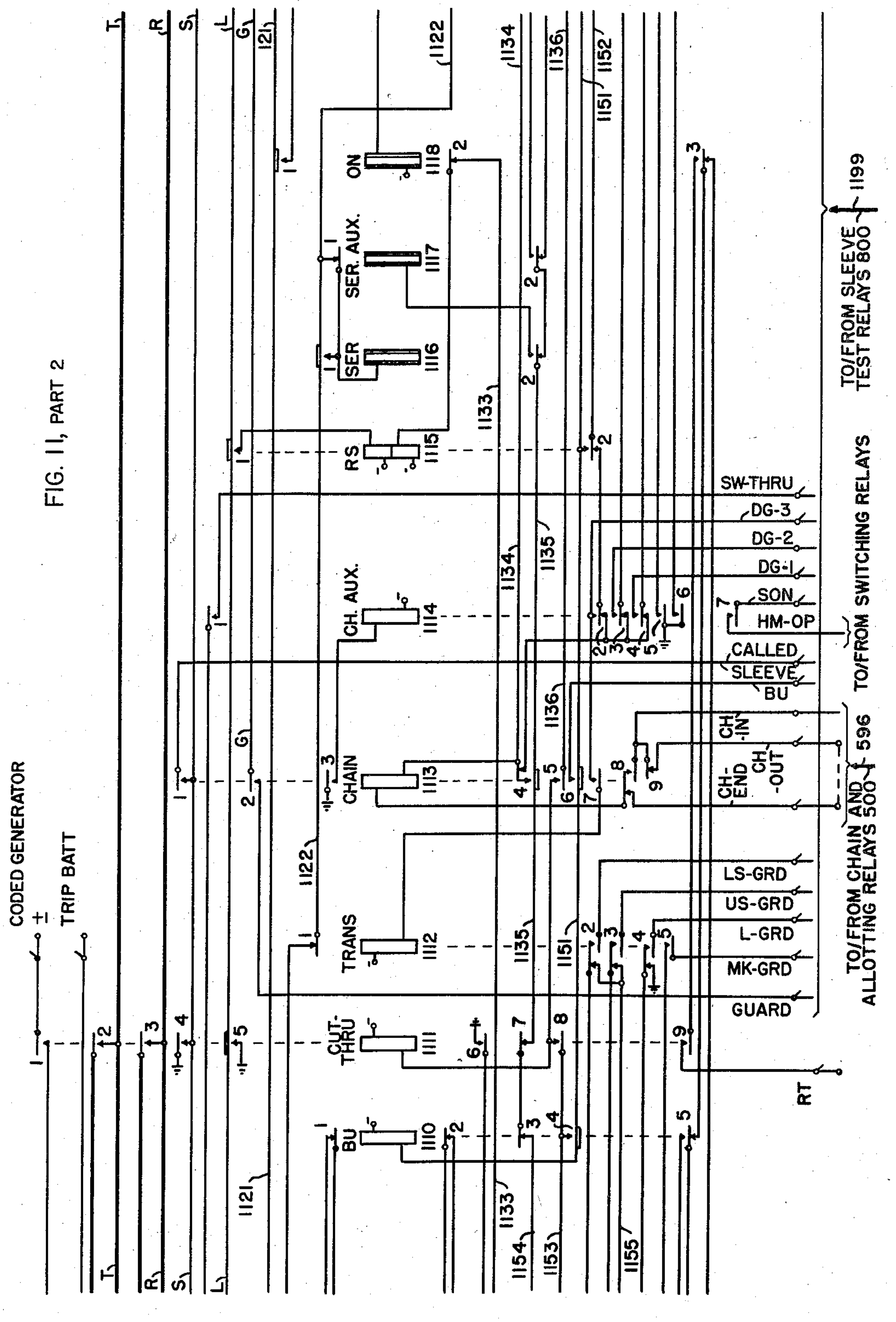
FIG. 11, PART 2

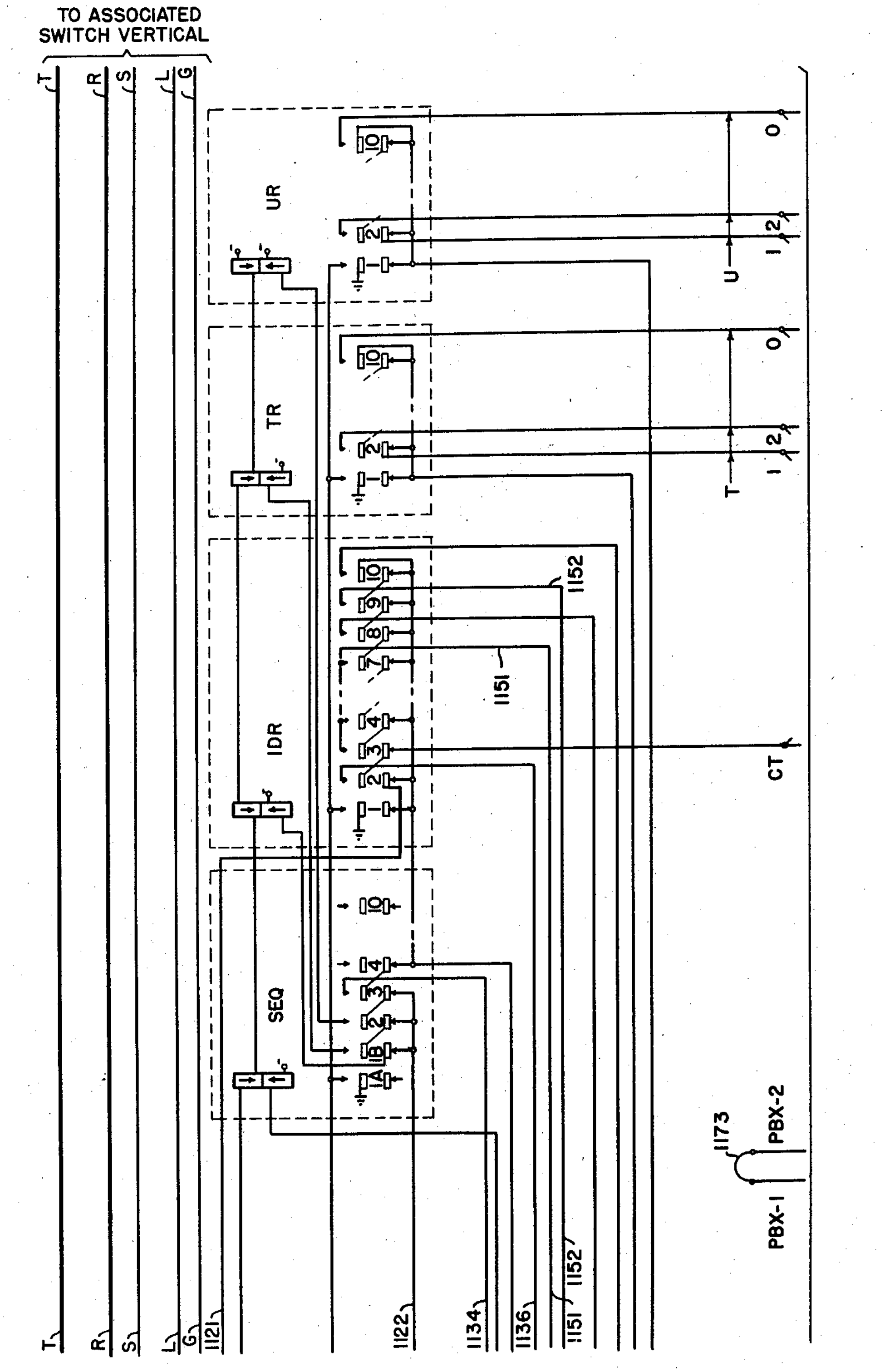
FIG. 11, PART 3

Jan. 27, 1959 E. J. LEONARD 2,871,297

100-LINE DIRECT-ACCESS CROSSBAR TELEPHONE SWITCHING UNIT

Filed March 8, 1954 26 Sheets-Sheet 26

2,871,297
Patented Jan. 27, 1959

2,871,297

100-LINE DIRECT-ACCESS CROSSBAR TELEPHONE SWITCHING UNIT

Edward J. Leonard, Chicago, Ill., assignor to International Telephone and Telegraph Corporation, a corporation of Maryland Application March 8, 1954, Serial No. 414,845
9 Claims. (Cl. 179—18)

Figure 2:
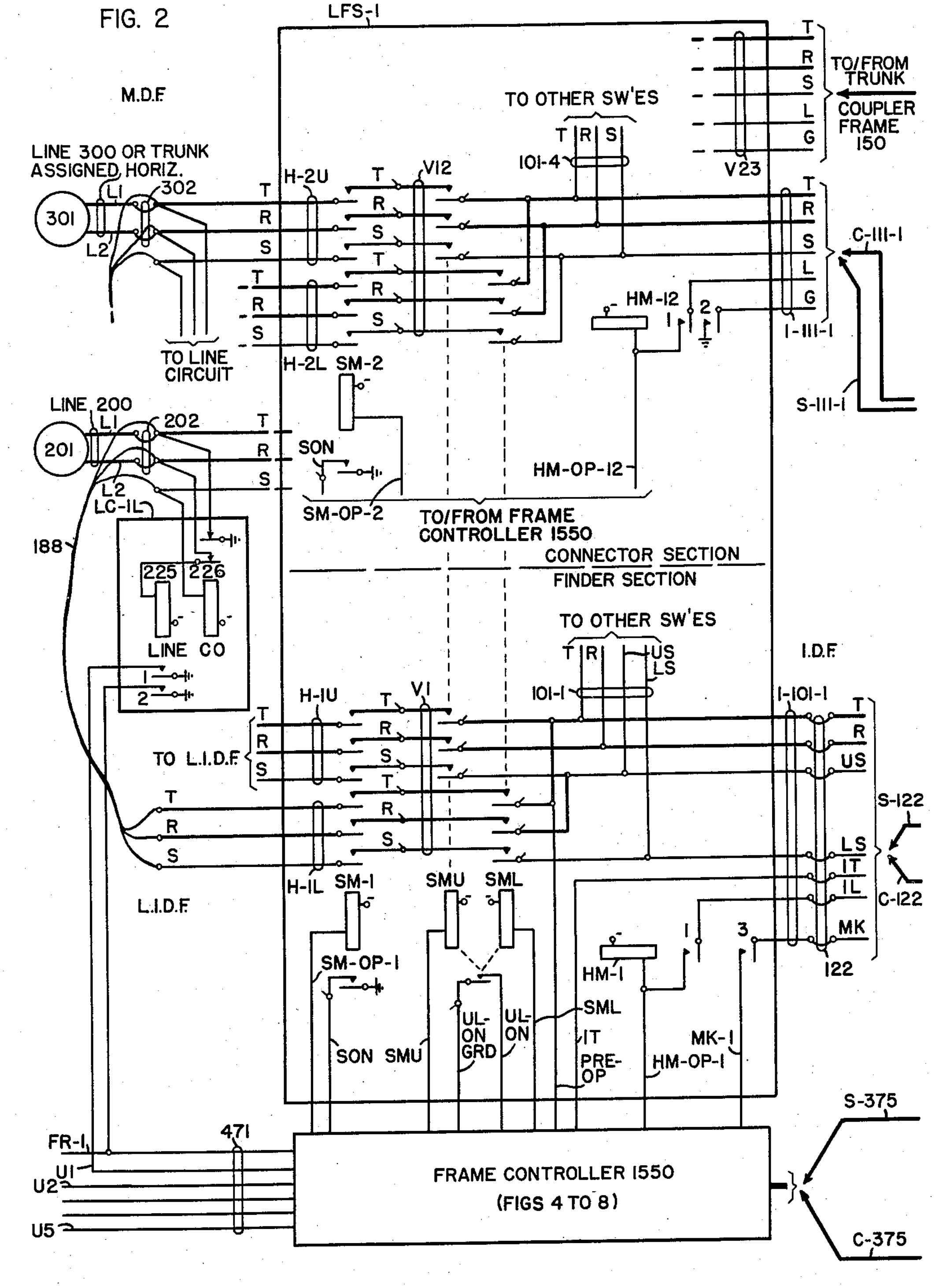

This invention relates to a 100-line direct-access crossbar telephone switching unit, being a unit or frame of apparatus arranged to provide calling and called two-way service for one hundred telephone lines. The principal object of the invention is to provide a reliable standardized unit of the foregoing character which is capable of serving in a wide variety of situations.

A further object is to provide a suitable frame controller which controls both the non-numerical extension of connections from calling lines and the numerical extension of connections to called lines.

A still further object is to so arrange the frame controller that each crossbar switch may serve a separate group of the one hundred lines, and each may have a first section for extending connections from calling lines of its group and a second section for extending connections to called lines of its group, whereby the total required number of crossbar switches is held to a minimum.

I. GENERAL DESCRIPTION

It has been chosen to illustrate the invention as applied to crossbar switches of the construction as illustrated in Figs. 1 to 20 of the United States Patent No. 2,577,067. In such a switch, each hold magnet and its associated crosspoint elements (referred to as a "vertical") provides selective access to twenty intersecting circuit paths which are referred to as "horizontals."

A feature of the invention is that each 20-horizontal crossbar switch fully serves twenty lines, whereby only five switches are required. For this purpose, the twenty horizontals of each of the five switches are connected to respective lines, and the verticals comprise respective call-extending (finder-action) and call-completing (connector-action) groups. The verticals of the five switches may be connected respectively in multiple, thus providing as many finder and connector trunks common to all the lines as there are verticals on any switch.

A further feature is that the horizontal multiple of each switch is severed between the finder verticals and the connector verticals to permit the usual line intermediate distributing frame (L. I. D. F.) to be employed where desirable.

As illustrated, each of the five switches has twenty-four verticals on a 25-vertical frame. Verticals 1 to 10 are used for finder action. The final fourteen verticals (12 to 25) are used for connector action. The horizontal multiple is severed at the position of the eleventh vertical, which is omitted to leave room for a standardized connection to the horizontal conductors in the second section of the switch bank.

The fourteen connector paths provided by the foregoing full multiple of the connector verticals through the five switches are ample for most 100-line groups. The ten finder paths provided by the full multiple of the finder verticals through the five switches is adequate for a 100-line group only if there is a relatively low calling rate. A feature of the arrangement, however, is that the frame controller is arranged to control the finder action of the switches either when a full multiple of the finder verticals is used, or when the finder multiple between the switches is divided into either separate or graded sections, to provide such additional finder trunks as may be required for lines of higher calling rates.

According to a further feature, the unit is readily adaptable to serve a 100-line branch exchange connected by two-way trunks with another exchange. In one arrangement, certain of the connector verticals are connected to respective inter-exchange trunks, and are arranged to give both outgoing line-finder action and incoming connector action, whereby the number of verticals employed in inter-exchange connections is reduced.

Other objects and features of the invention will appear as the description progresses.

IA. *The drawings*

Figure 3:
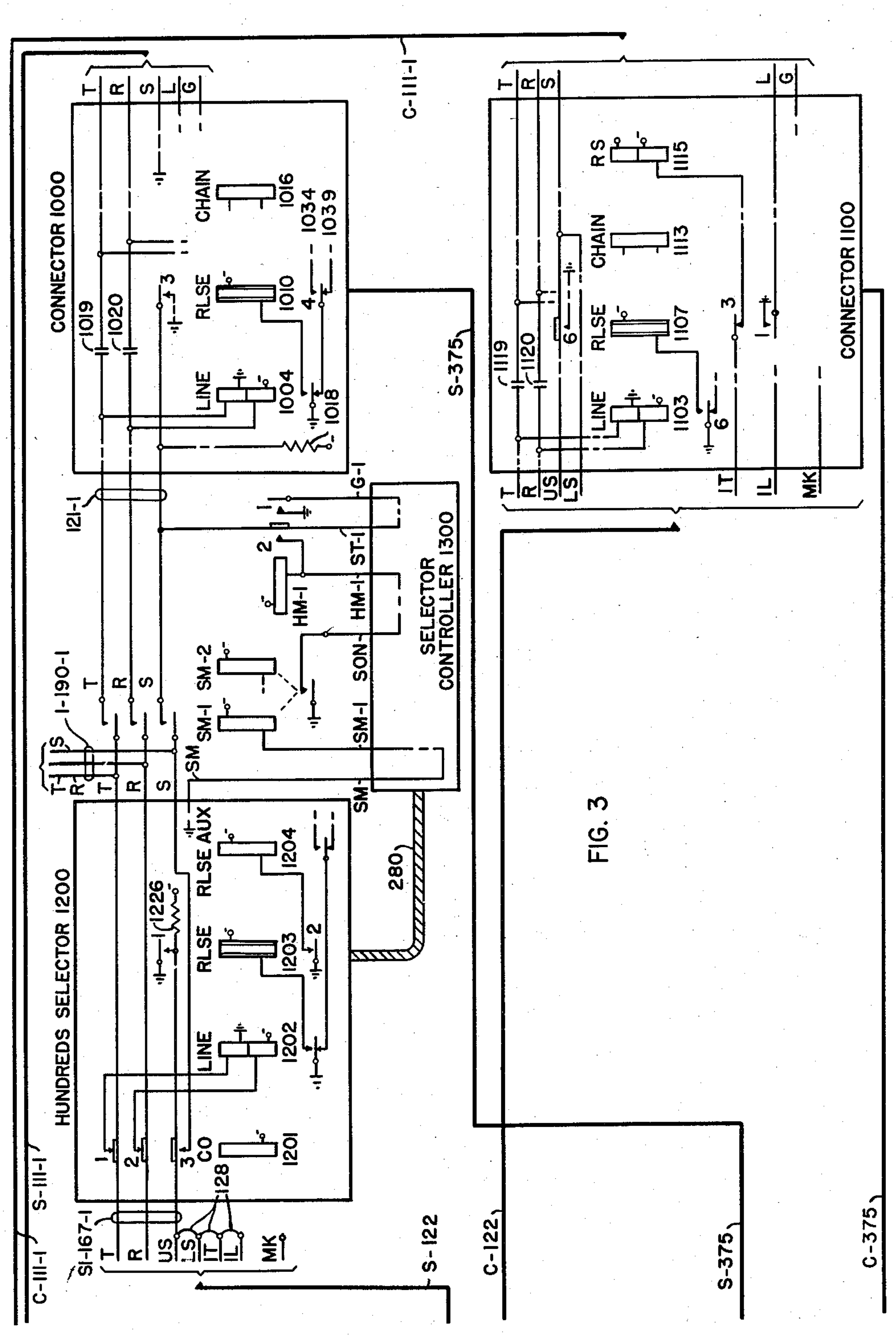
Figure 7:
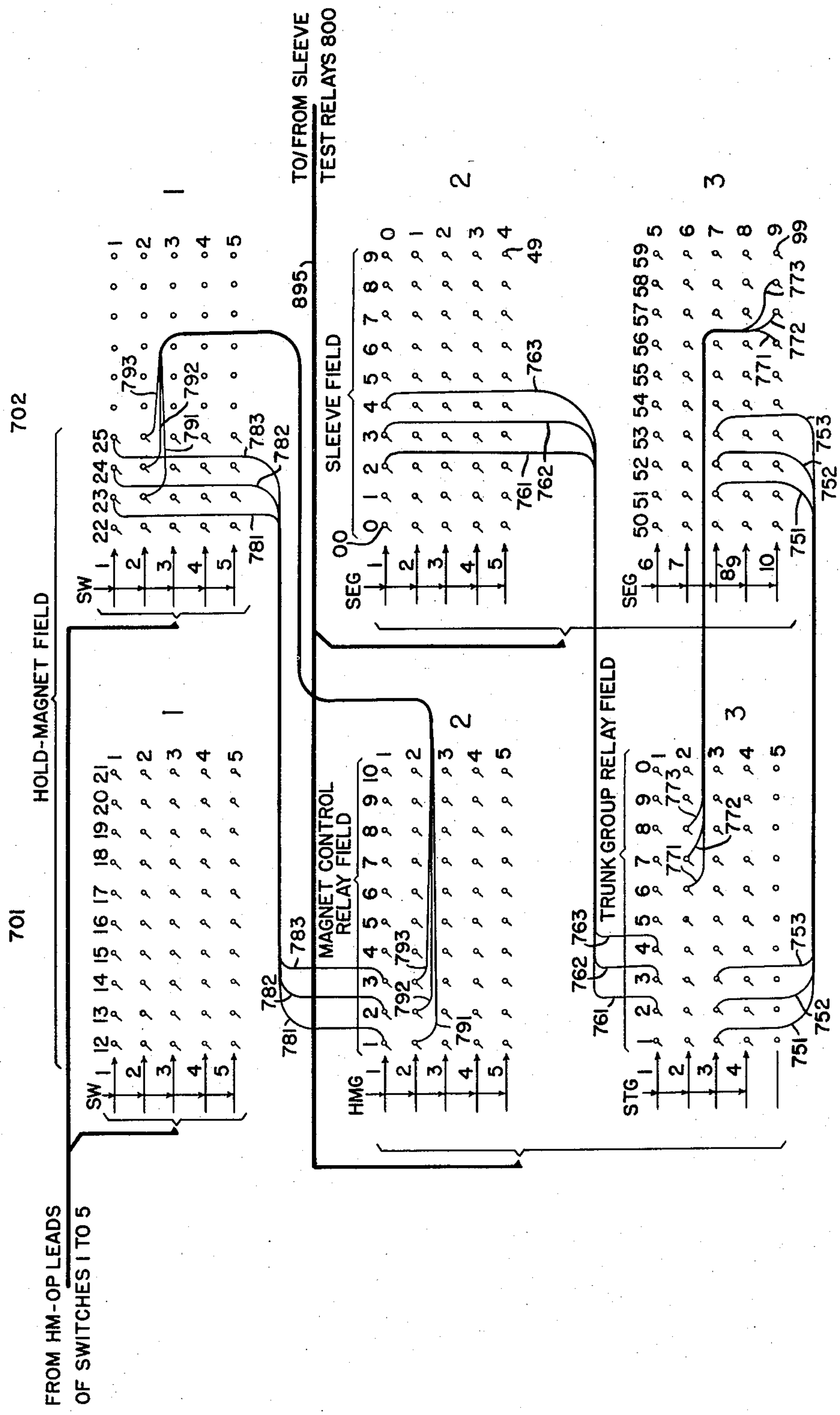
Figure 9:
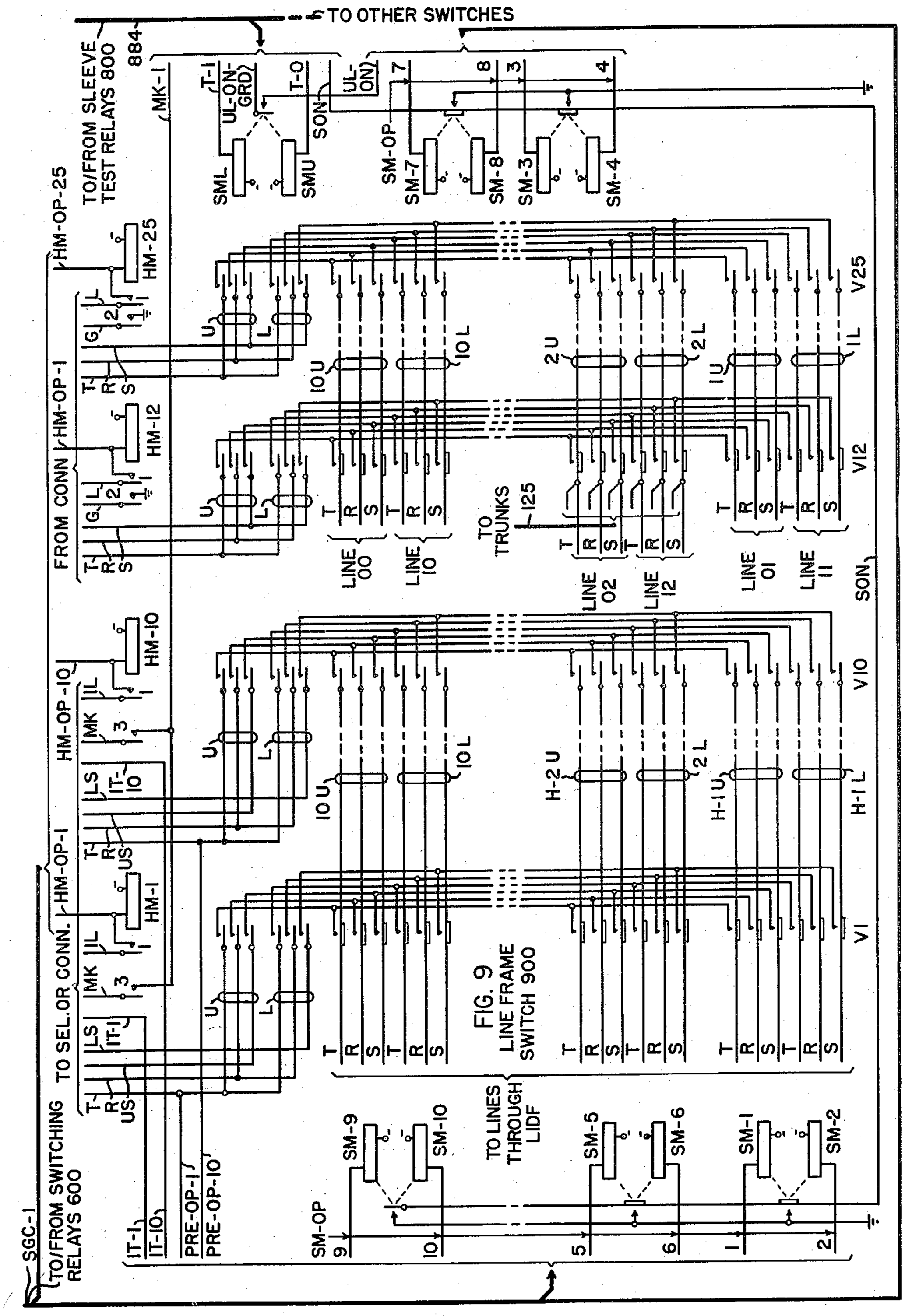
Figure 10:
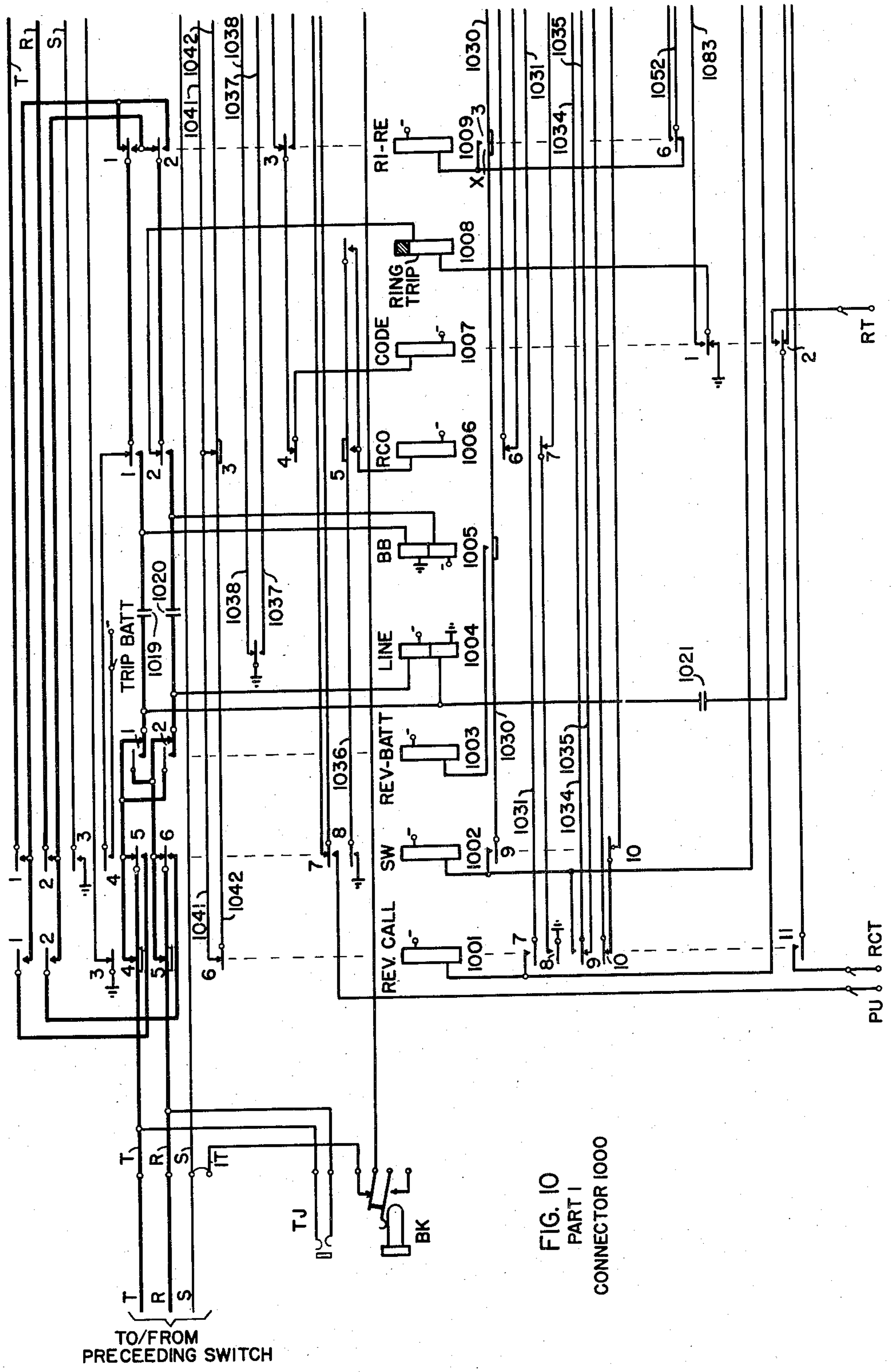
Figures 12, 13, 14, 15, 16, 17, 18, 19, 20, 21:
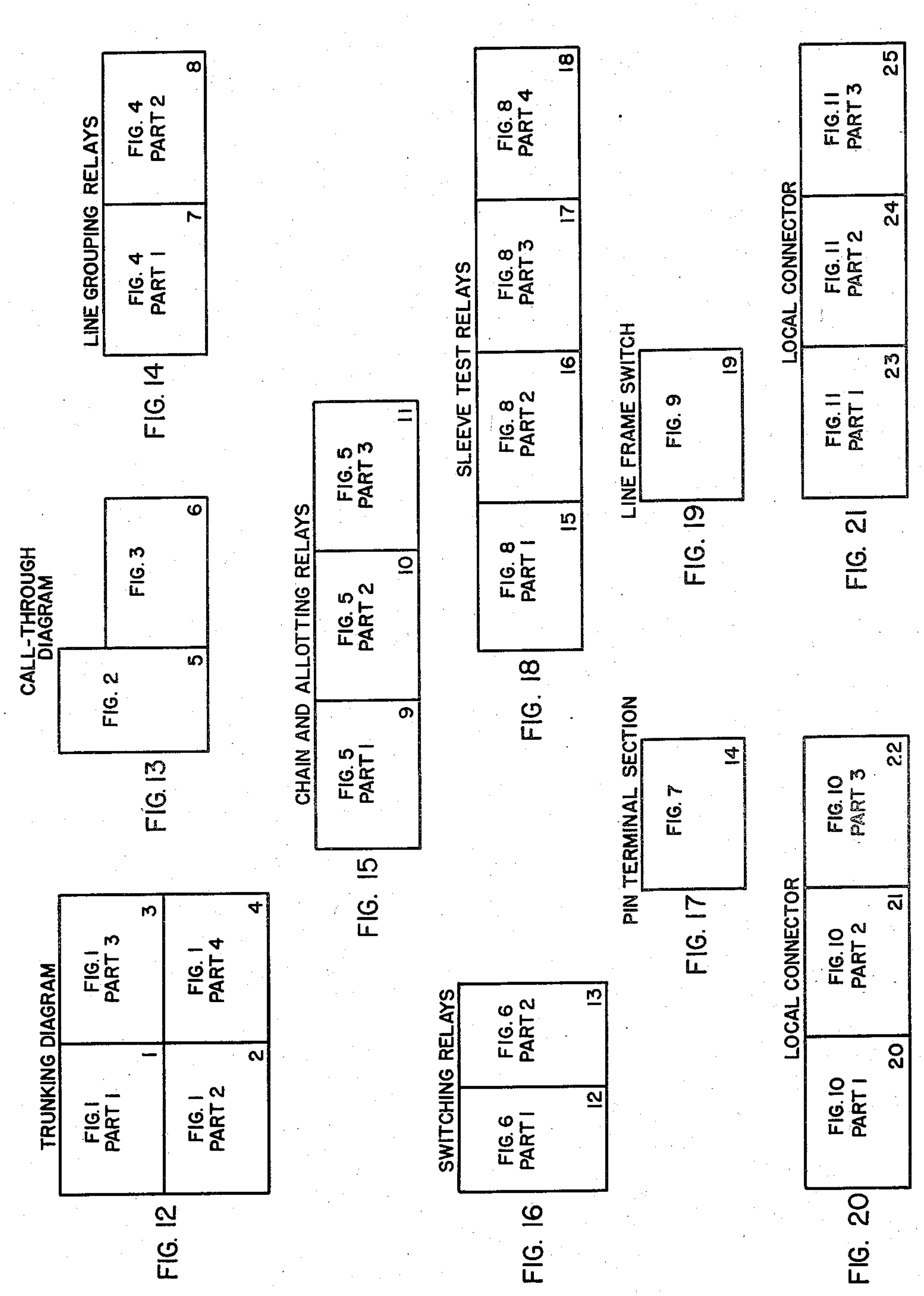

Referring now to the drawings, comprising Figs. 1 to 21, a preferred embodiment of the invention is disclosed as follows:

Fig. 1, parts 1 to 4, is a complete single-line trunking diagram showing the relationship existing between the crossbar switches employed in extending connections to and from lines and trunks;

Figs. 2 and 3, when arranged as indicated in Fig. 13, represent a call-through diagram showing briefly the apparatus involved in extending a connection from calling lines or trunks to called lines and trunks;

Fig. 4, parts 1 and 2, shows a circuit diagram of the line grouping relays 400. These relays group the 100 lines of any line switch frame into 20 groups of 5 lines each;

Fig. 5, parts 1 to 3, when arranged as indicated in Fig. 15, comprises the chain and allotting relays 500. These relays exercise preference between groups of calling lines and connectors and act to allot idle selectors or connectors to calling lines on a one-at-a-time basis;

Fig. 6, parts 1 and 2, shows a circuit diagram of the switching relays 600 used for associating the control apparatus with the switches for controlling their operation;

Fig. 7 is a circuit and wiring diagram of the pin terminal section 700 of the sleeve test relays 800;

Fig. 8, parts 1 to 4, shows a circuit diagram of the sleeve test relays 800. The sleeve test relays are used on all calls to test the called line and to provide special services, and are used to control the extension of connections to trunks assigned to the horizontals and to the verticals of the line frame switches;

Fig. 9 is a circuit diagram of any line-frame switch 900 on any line frame;

Fig. 10, parts 1 to 3, discloses connector 1000 for use in systems when selectors are provided, as in a multi-hundred line system;

Fig. 11, parts 1 to 3, discloses connector 1100 for use in a system having no selectors, such as in a 100-line system;

Figs. 12 through 21 show the way in which the sheets of drawings on which Figs. 1 through 11 are shown, should be arranged in order to be best understood.

The devices shown in Figs. 5, 10, and 11, having reference characters AR, SEQ, IDR, TR, UR, and SR assigned thereto are magnetic impulse counters which are of the general type disclosed in U. S. Patent No. 2,538,819.

II. GENERAL TRUNKING DIAGRAM (Fig. 1, parts 1 to 4)

The general trunking diagram shown in Fig. 1, parts 1 to 4 will now be explained.

IIA. *Line switch frame*

Referring now to Fig. 1, parts 1 and 2, it will be observed that the lines of the disclosed exchange are served by line frames LF–1 to LF–10, of which only line frame LF–1 is shown in some detail, the switches of the remaining frames LF–2 to LF–10 assumed to be similar.

In any line frame such as line frame LF–1, there are five crossbar switches LFS–1 to LFS–5. Each such switch may be described as a 24 by 20 three-wire switch, as each switch has 24 vertical locations or paths to which 24 originating and terminating trunks are respectively connected, and has 20 horizontal locations or longitudinal paths to which lines are connected. Accordingly, 5 switches serve 100 lines. The 100 subscriber lines, 20 of which are shown connected to line-frame switch LFS–1, are served by originating trunks in trunk cable 101 and are accessible by the terminating trunks in cable 111. With each section of the switch serving 20 lines, the line intermediate distributing frame L. I. D. F. (Fig. 2) is provided to connect the line associated with the finder-action horizontals to the lines associated with the connector-action verticals.

Verticals 1 to 10 of any switch LFS–1 to LFS–5 provide termination points for originating trunks serving the 20 lines terminated on the horizontals of such line-frame switch. The trunks associated with the first 10 verticals may be multipled (graded) to other switches, as will hereinafter be pointed out, to provide 12 originating trunks for serving the 100 lines.

Verticals 12 to 25 provide termination points for 14 terminating trunks incoming to the switch over cables 111. Of these 14 verticals it has been chosen to disclose 11 such verticals (vertical 12 to vertical 22) as terminating connectors associated with terminating trunks 1 to 11 and to disclose 3 verticals (vertical 23 to vertical 25) as serving the three incoming trunks from trunk coupler frame 150 over conductors in cable 142.

When the system is embodied in a 100-line system, the originating trunks in cable 101 are directly connected to the terminating trunks in cable group 111 at intermediate distributing frame I. D. F., thereby bypassing the selector stage of the multi-hundred systems as is well known.

One of the features of the invention is to utilize lines to serve as termination points for trunks. Such trunks are shown connected to the second horizontals of line frame switch LFS–1 and extend to the trunk coupler frame 150 over conductors in cable 125.

When the system is embodied in a multi-hundred system, the originating trunks of cable 101 are terminated on the intermediate distributing frame terminals 1–101 and are jumpered to the selector stage shown in Fig. 1, parts 3 and 4, over conductors in cable group 122. The terminating trunks of cable group 111 are jumpered to the outgoing levels (121–1 to 121–0) of the selector stages at I. D. F. terminals 1–111. With the provision of selector stages, all trunk groups such as those in cables 125 and 142 are served by the selector levels.

Referring now to the grading of the originating trunks, it will be observed that originating trunk 1 of cable group 101 is connected to the corresponding vertical 1 of switches LFS–1 to switch LFS–3 over conductors in cable 101–1; originating trunk 2 is multipled by conductors in cable 101–2 to the corresponding vertical 2 of switches LFS–1 and LFS–2; originating trunks 3 to 10 of cable group 101 are multipled to the corresponding verticals 3 to 10 of each of the switches LFS–1 to LFS–5; originating trunk 11 is accessible by switches LFS–4 and LFS–5 from vertical 1 of such switches; and the last originating trunk 12 is accessible by the last three switches LFS–3 to LFS–5 from vertical 2. In this manner, 12 originating trunks are accessible by the 100 lines terminated on the horizontals of the 5 switches of line frame LF–1.

Verticals 12 to 25 of switch LFS–1 associated with the terminating trunks incoming to switch LFS–1 over conductors in cable group 111 are multipled to corresponding verticals of switches LFS–2 to LFS–5 by conductors in cable group 101–4. In this manner, each of the 14 terminating trunks have access to any one of the 100 lines served by the line frame LF–1.

The provision of ten line-switch frames (multi-hundred line system) each serving 100 lines and each having access to a total of 12 originating trunks results in a total of 120 trunks for 1000 lines. These trunks extend to the intermediate distributing frame IDF over conductors in cable group 101 to 110 (the intermediate cable groups not shown) from whence they are assigned to selectors as will be described hereinafter.

IIB. *Hundreds selector frame*

Referring now to Fig. 1, parts 3 and 4, it has been chosen to illustrate the selectors and selector switches on the hundreds selector frame HS–1 as similar to the corresponding apparatus on the hundreds selector frame disclosed in the U. S. patent application of R. W. Hutton et al. for a Multi-Group Direct-Access Crossbar Telephone Switching System, Serial No. 359,761, filed June 5, 1953. Such hundreds selector frame is illustrated in Fig. 1, parts 5 and 6 of such application.

The 120 originating trunks in cable groups 101 to 110, associated with line frames LF–1 to LF–10, are extended over respective conductors in cable group 122 to the selectors in the hundreds selector frame.

The trunks extending from the hundreds selector frame HS–1, as disclosed in the noted application, are extended over conductors in cable groups 121–1 to 121–0 to the intermediate distributing frame IDF from whence they are connected to the connectors terminating on verticals 12 to 25 of the line frame switches LFS–1 to LFS–5.

It has been chosen to provide the 100 lines on any line frame with 14 connectors. These connectors are terminated on the verticals 12 to 25 of the line frame switch LFS–1 as noted and are multipled by conductors in cable groups 101–4 to the other switches. The 100 lines in any line frame are therefore served by 14 connectors or the 1000 lines are served by 140 connectors.

As noted in the R. W. Hutton et al. application, 15 trunks are provided in each level on the hundreds selector frame HS–1. These 15 trunks are assigned 14 connectors for serving the 100 lines of any line frame. The trunks in level "1" are assigned to the connectors associated with the line frame LF–1; selector level "2" trunks assigned connectors of line frame LF–2; and so forth.

IIC. *Line assignment*

Referring now to the second section of the line-frame switch LFS–1 (verticals 12 to 25), it will be observed that switch LFS–1 terminates lines having tens digits "0" or a "1," the lines of switch LFS–2 having a tens digit "2" or "3"; and the lines of switch LFS–5 having a tens digit "8" or "9."

On each of the switches, the tens digit of least value of the two tens digits assigned to any switch, is assigned to the upper section of the double horizontal (the switch structure will be described hereinafter with reference to Fig. 9). Illustrating, the tens digits "0," "2," "4," "6," and "8" are assigned to the upper horizontal while tens digits "1," "3," "5," "7," and "9" are associated with the lower section of the horizontal pair, this association being controlled by the tens digit wire assignment to the auxiliary select magnet as will be described hereinafter.

The units digit of the directory number of the lines assigned to horizontals correspond respectively to the horizontal numbering as determined by the physical location of such horizontals. The lines whose units digit of the directory number end in "1" are assigned to the first horizontal, both upper and lower sections; the lines with units digit "2" are assigned to the second horizontal; and so forth.

IID. *Capacity variations*

The capacity of the trunking plan shown in Fig. 1 is capable of variations according to the number of lines being served, and the number of outgoing trunk levels provided. If, for example, 100 lines are initially required for an installation, only line frame LF–1 is provided and the originating trunks in cable group 101 are connected directly to the trunks in cable group 111 at intermediate distributing frame IDF.

If the initial installation is for 1000 lines, ten line frames LF–1 to LF–10 are provided along with a hundreds selector frame HS–1.

The line frames may be omitted when the full ten-frame capacity of 1000 lines is not required. Omitting any such line frame reduces the capacity of the line frame by 100 lines. Therefore, under conditions when only 500 lines are provided, only 5 line frames are needed and accordingly the number of selectors on the hundreds selector frame is reduced.

When the exchange serves several thousand lines, additional selector stages are required, as is well known.

III. GENERAL OPERATION

The operation of the system in completing calls will now be described with particular reference to Figs. 2 and 3, which show in more circuit detail the portion of the apparatus directly involved in the talking path. Subsequent parts of the description cover the detailed operation of the control apparatus involved in operating the crossbar switches and in extending connections from calling lines and trunks to called lines and trunks.

IIIA. *Station 201 calls station 301* (*selector system*)

The operations involved in making a locally originated call from a calling station 201 on line 200 to called station 301 on line 300 will now be described with reference to Figs. 2 and 3.

When the receiver (not shown) is removed at the calling station 201 of calling line 200, the usual direct-current bridge is closed across the tip and ring conductors L1 and L2 of line 200 to operate line relay 225 of line circuit LC–1 through break contacts 1 and 2 of cutoff relay 226. Line relay 225, at its contacts 1 and 2, ground the common fives relay wire FR–1 and the units wire U1 of cable 474 which extends to frame controller 1550. The units wire U1 is individual to line relay 225 while the fives relay wire FR–1 is common to the first five lines assigned to lower horizontals 1 to 5 of line-frame switch LFS–1.

It has been chosen to illustrate line circuit LC–1L as a two-relay line circuit instead of the three-relay line lockout circuit required for reverting call lines. When connector 1000 is used for reverting calls, a line circuit is used, such as shown and described in the patent application of J. L. Culbertson for Line Clearing Apparatus for a Telephone System, Serial No. 312,276, filed September 30, 1952.

Grounding the fives relay wire FR–1 and units wire U1, as will hereinafter be described in detail, causes frame controller 1550 (Figs. 4 to 8 taken together) to set the line frame switch LFS–1 with specific regard to the calling line and with an idle originating trunk extending to the hundreds-selector frame HS–1. Upon being so set, the frame controller operates the concerned select magnets and the concerned hold magnet to close the indicated open points on the line frame switch LFS–1 to extend calling line 200 to an originating trunk 1–101–1 extending to the intermediate distributing frame IDF.

The frame controller responds to the grounding of the units and fives wires by operating the auxiliary select magnet (lower select magnet SML) associated with the calling line 200.

Off-normal contacts thereon ground the units-locks off-normal wire UL–ON to start the frame controller into its hereinafter described operation. Following the seizure of the frame controller 1550, the originating trunks available to the calling line are tested. This test circuit includes idle test wire IT, jumper 122, the sleeve conductor S of trunk S1–167–1 or C1–167–1 of cables S–122 or C–122, and current limiting resistor 1226 or the battery-connected winding of relay 1115, depending on whether the system is a selector system or not.

The grounding of the units-lock off-normal wire UL–ON completes a circuit to the select magnet operate wire SM–OP–1 (associated with calling line 200) thereby operating select magnet SM–1. Such operation positions the associated select shaft with specific regard to calling line 200.

The off-normal contacts on select magnet SM–1 ground secondary-off-normal conductor SON which serves as an indication that the hold magnet associated with the selected idle trunk 1–101 may be operated. The frame controller grounds the hold magnet wire HM–OP–1 which operates hold magnet HM–1 to complete the extension of the calling line to the selected idle trunk.

As will be described in detail hereinafter, battery potential is projected ahead over wire PRE–OP to the tip conductor of the selected trunk to operate the line relay 1202 in selector 1200 or relay 1106 of connector 1100 to reduce the time interval of seizure.

The line relay of the seized apparatus operates and operates the associated release relay which grounds the sleeve conductor S of its associated trunk. Ground is thereupon returned over jumper 122 on the lock lead L to provide a locking circuit for the concerned hold magnet.

The ground potential on the sleeve conductor S is further extended rearwardly to the battery-connected winding of the cutoff relay 226 of the line circuit LC–1L associated with the calling line. Cutoff relay 226 operates and at its contacts 1 and 2 restores line relay 225. With the restoration of line relay 225, ground potential is removed from the grounded conductors in cable group 471 and the marking potentials are thereby removed from the frame controller.

When battery potential is extended ahead on the tip conductor of the selected trunk, relays in the frame controller are operated to initiate the clearing out of the common apparatus and to restore the operated select magnets in preparation for another call. However, before the common apparatus is completely cleared out, ground is returned to the hold magnet and cutoff relay winding to maintain the connection intact, as noted. The calling line 200 is now connected to an idle hundreds selector 1200 or connector 1100; the common equipment is released; and dial tone is returned to the calling line.

When hundreds selector 1200 is seized by the described extension of a connection thereto from calling line 200, line relay 1202 is maintained operated. Its original operate circuit, as hereinbefore described, is from the battery potential projected ahead over the tip conductor of the associated trunk. The sleeve conductors US and LS, the idle test wire IT, and the lock wire L are tied together by jumpers 128 while conductor MK is left unconnected, when the system is a selector system.

Release relay 1203 and release auxiliary relay 1204 operate in sequence and ground the sleeve conductor as hereinbefore pointed out, and other contacts not shown, remove the idle-indicating battery potential from the sleeve conductor.

The operation of the selector controller 1200 in responding to the dialing of the hundreds digit and in extending the calling line through hundreds selector switch HSS–1 to an idle connector 1000, is as described in the noted Hutton et al. application.

When connector 1000 is seized by the described extension of a connection thereto by operation of selector 1200, the closed bridge across the tip and ring conductors of hundreds trunk 121–1 causes line relay 1004 to operate. Contacts thereon operate release relay 1010 to ground the sleeve conductor to hold the preceding apparatus operated and to initiate the clearing out of the common apparatus on the selector frame, such clearout operation being described in the noted Hutton et al. application.

When the system is used as a 100-line system, connector 1100 is seized by the extension of a connection over conductors in cable C–122 to hold operated line relay 1106. Relay 1107 operates and removes the idle-indicating potential and grounds the sleeve conductor to maintain the preceding equipment operated in a manner described generally for selector 1200. At such time, dial tone is returned to the calling line indicating that the tens and units digit of the desired line may be dialed.

Responsive to the dialing of the tens and units digit of a called line, connector 1000 or 1100 exercises control over frame controller 1550 of Fig. 2 (described in detail with reference to Figs. 4 to 8) over conductors in cable group S–375 or C–375 to cause the calling line to be extended to the called line.

Responsive to the dialing of the tens digit, connector 1000 or connector 1100 and frame controller 1550 cooperate to operate the upper or lower select magnet of the switch serving the called line (line switch LFS–1) by grounding the select magnet operate wire SMU.

Off-normal contacts on the operated auxiliary select magnet SMU condition the frame controller to extend the marked units digit wire to the principal select magnet operate wire (SM–OP–2) associated with the horizontal terminating the called line 300. Responsive to an off-normal signal from the principal select magnet SM–2, the hold magnet operate wire (HM–OP–12) associated with the hold magnet (HM–12) serving the vertical to which the calling connector is associated, is grounded operating hold magnet HM–12.

Hold magnet HM–12 locks operated to the grounded lock lead L of cable S–111–1 or C–111–1 and at its contacts 2, ground the guard wire G therein to indicate to the common control apparatus that hold magnet HM–12 has operated and that the testing of the called line may begin.

Following the idle determination of the called line, ground potential from the sleeve conductor is extended forward to operate the cutoff relay of the line circuit of the called line 300 to operate the cutoff relay therein. Contacts 1 and 2 of the cutoff relay open the operate circuit of associated line relay to prevent it from being closed responsive to answer by the called party. Thereafter the concerned select magnets and the frame controller are released.

At this time, the calling line is connected to the called line through the intersection of horizontal H–1L and vertical V1, contacts on the lower auxiliary select magnet SML, originating trunk 1–101, jumper 122, trunk S1–167–1 or C1–167–1, the next switching stage of equipment, trunk S–111–1 or C–111–1, contacts on the upper auxiliary select magnet SMU, the intersection of horizontal H–2U and vertical V12, and line intermediate distributing frame jumper 188.

The cutoff relay of the calling line and the associated hold magnet are held operated by ground potential from connector 1000 or 1100 extended rearwardly, while the hold magnet of the connector switch section and the cutoff relay of the called line are held operated from ground projected forward from connector 1000 or 1100. As will be described hereinafter, connector 1000 or 1100 thereafter signals the called line.

Responsive to answer by the called party, the calling subscriber 201 of calling line 200 may converse with the called subscriber 301 of called line 300. Upon completion of the call, disconnect by the calling and the called parties clears out the apparatus involved in the above-traced extended connection.

IIIB. *Station 201 calls trunk assigned line circuit*

According to one feature of the invention, any line, such as line 300, may be assigned for service as a two-way trunk line. Assuming line 300 to be connected to trunk coupler frame 150 over trunk cable 125 as shown in Fig. 1, part 1, the general operation in directing calls thereto will now be given.

When the subscriber at station 201 in a 100-line system desires to call a subscriber in another exchange over a trunk line assigned a horizontal, he removes his receiver, waits for dial tone from the allotted connector, and then dials a single digit assigned such trunk level, either an initial digit or a tens digit.

When the receiver is removed at calling station 201, the previously described operations take place to extend the calling line to an idle connector 1100. It may be assumed that the calling line is extended to connector 1100 over originating trunk 1–101 in cable C–122.

When the initial digit or tens digit assigned specifically to trunks in cable 125 is dialed and recorded in connector 1100, the frame controller 1550 calls-in the sleeve of the trunks in the called trunk group, operates the principal and auxiliary select magnets assigned an idle trunk, and operates the concerned hold magnet in a manner previously described.

At such time, however, connector 1100 responds to control from frame controller 1550 to cause it to switch-through metallically to the selected trunk in the called group. The frame controller 1550 is then returned to common use.

The connection between calling line 200 and the selected trunk includes a hold magnet of the finder section, connector 1100, a hold magnet of the connector section, originating trunk 1–101 and terminating trunk 1–111.

The connection established from the calling line to the selected trunk is released responsive to operations occurring in trunk coupler frame 150 when the receiver is subsequently replaced at calling station 201.

IIIC. *Station 201 calls trunk assigned vertical*

According to another feature of the invention, any vertical such as verticals V12 to V25 may be assigned for service as two-way trunk lines. Assuming vertical V25 (Fig. 1) is connected to trunk coupler frame 150 over conductors in cable group 142, the operations involved in extending a connection from line 200 to trunk coupler 150 over trunks in cable 142 will now be described generally.

When a call is made to a trunk group having its trunks assigned to verticals of the line frame switch, the calling line is identified and then connected directly through the intersection of one vertical and one horizontal to the selected trunk, thereby freeing the connector for use in handling other calls.

As in the case of trunks assigned to line circuits, the trunks assigned to verticals may be reached by dialing an initial digit or a tens digit.

When the subscriber at station 201 in a 100-line system desires to call a subscriber in another exchange over a trunk in a trunk group assigned to switch verticals, he removes his receiver, waits for dial tone and then dials the desired single digit trunk group.

When the receiver is removed at station 201, the previously described operations take place to extend the calling line to an idle connector such as connector 1100 over an originating trunk such as 1–101.

When the initial digit or tens digit assigned specifically to trunks in cable 142 extending to trunk coupler frame 150 is dialed and recorded, frame controller 1550 assumes control of the calling line sleeve conductor and the vertical assigned the originating trunk used in extending a connection to connector 1100.

At such time, frame controller 1550 disables the normal terminating call action by opening the select magnets operating circuit; calls in the idle-test leads (Fig. 6, part 1) assigned trunks terminated on verticals; identifies the calling line and operates the auxiliary select magnet and the principal select magnet serving such line; tests the trunks in the called group; operates the hold magnet associated therewith; releases the hold magnet associated with the calling line; releases connector 1100; and restores the common apparatus.

The connection from the calling line 200 to a selected idle trunk of cable group 142 is completed through switch bank contacts at the intersection of the horizontal serving the calling line and the vertical assigned the selected trunk in the called group.

IIID. *Incoming trunk call to line 300*

Incoming calls to the local exchange are extended through a trunk coupler (not shown) in trunk coupler frame 150 and over trunks in cable group 125. The frame controller thereupon operates as described for calls originated at line 200.

IIIE. *Exchange C calls line 300*

When the disclosed 100-line exchange is called from a trunk terminated on the connector verticals, the call reaches the local exchange over a trunk coupler (not shown) in trunk coupler frame 150, and conductors in cable group 142. This call reaches a special connector, similar to connector 1100, except that it preferably does not apply dial tone upon being taken for use.

Following the seizure of such connector, the call may be extended to line 300 as previously described for connector 1100, the incoming portion of the connector being connected to the incoming trunk in cable 142.

IV. FRAME CONTROLLER 1550

(Figs. 4 to 8)

Frame controller 1550 comprising Figs. 4 to 8 will now be described in detail. One frame controller is provided for the 100 lines on any line frame and functions to connect associated calling lines with idle originating trunks on a one-at-a-time basis and to extend connections from terminating trunks to called lines. The illustrated frame controller is assumed to be associated with line frame LF–1 shown in Fig. 1, parts 1 and 2, comprising five switches LFS–1 to LFS–5.

The purpose of frame controller 1550 is to control the previously described extension of a connection from a calling line to available originating trunks extending to the next switching stage and to extend the connection therefrom to idle called lines. Frame controller 1550 comprises line grouping relays 400, chain and allotting relays 500, switching relays 600, pin terminal section 700, and sleeve test relays 800, all suitably interconnected with each other and associated with the five noted switches to perform all testing and control operations required of a frame controller.

The relays of frame controller 1550 comprise the following functional groups.

(1) Relays 401 to 425, line grouping relays (Fig. 4).
(2) Relays 501 to 526, chain and allotting relays (Fig. 5).
(3) Relays 601 to 640, switching relays (Fig. 6).
(4) Pin terminal section 700 (Fig. 7).
(5) Relays 801 to 857, sleeve test relays (Fig. 8).

The functions of the various relay groups will now be described.

IVA. *Line and grouping relays 400*

(Fig. 4, parts 1 and 2)

The lines in any line switch frame are divided into two groups of fifty lines each. The line grouping relays 400 determine which one of the two groups of fifty lines is calling; the group of five lines containing the calling line; and the particular calling line in the selected fives group.

On receiving ground over one of the fives relay mark wires FR–1 to FR–20 from the line frame switch serving the calling line, line grouping relays 400 (Fig. 4, parts 1 and 2) select the corresponding fives group of line, exercising an order of preference if two or more fives wires are grounded; locks in the fives selection locally and disconnects the remaining fives wires to preclude subsequent interference thereover; prepares an operate circuit for the units relays associated with the calling line in the selected fives groups; and operates the auxiliary select magnet associated with the calling fives group.

On receiving ground over one of the units mark wires U1 to U5 in the fives group containing the calling line, the concerned units lockout relay operates, exercising an order of preference if two or more lines in the same selected fives group are initiating a call; locks in the units relay selection locally; opens the units chain circuit to preclude any subsequent interference with the established units selection by another call being originated in the same fives group; and completes an operate circuit for the principal select magnet associated with the calling line.

IVA1. *Detailed operation*

On all calls from the lines of any switch frame, the detailed operation of line and grouping relays 400 is as follows:

When a call is originated in any one of the switch groups on any line frame LF–1, line relay 225 of the concerned line circuit (LC–1L, Fig. 2) operates. As previously noted, such line relay (1) grounds the individual units mark conductor U1 to U5 and (2) grounds the fives relay wire FR–1 to FR–20.

IVA2. *Fives group selection*

The grounding of any fives relay wire closes an operate circuit for the associated one of the fives-group relays 401 to 420, shown in Fig. 4.

Twenty fives relays 401 to 420 are provided for the 100 lines of any switch frame, each fives relay being associated with five lines of the 100. Of the twenty relays, only those associated with switches LFS–1, LFS–3, and LFS–5 are shown, the remaining assumed to be similar.

Relays 401 to 420 are divided into two groups, relays 401 to 410 being associated with the first fifty lines terminated on switches LFS–1, LFS–2, and a portion of LFS–3 and relays 411 to 420 being associated with the second fifty lines. Two preference chains are provided in order to treat the one hundred lines as two separate groups of fifty lines and to thereby reduce the possibility of contact failure.

Responsive to the appearance of ground on one of the fives relay wires FR–1 to FR–20 of the fives group of lines containing the called line, the chain and allotting relays 500 determine whether the concerned fives relay wire is next in order of preference. The ground on the fives wire is extended through the winding of the associated fives relay and break contacts 7 thereof to the associated chain-end wire CH–END–1 or CH–END–2 extending to the chain and allotting relays 500 over conductors in cable 440. As will be described in detail hereinafter, the chain-end conductor operates relays in the chain and allotting relays to determine the order of preference and upon being found to be next, returns battery potential over the chain-end conductor of the associated chain to operate the concerned fives relay.

Upon operating, the concerned fives relay locks to the battery on the chain-in lead CH–IN–1 or CH–IN–2 through its contacts 6; at its contacts 1 to 5, it extends the grounded one of units mark wires U1 to U5 to the associated unit lockout relays 421 to 425 over common units conductors UC–1 to UC–5; its break contacts 7 disconnect the chain-end wire from the operated fives relay; its contacts 8 extend ground potential to the A or B wire extending to the chain and allotting relays 500 over conductors in cable group 430 to identify the calling line as one assigned to the first five horizontals or the second five horizontals; its contacts 9 extend ground potential to the restricted service wire RS, when the associated jumper on jumper board JB–450 is connected; its contacts 11 extend ground potential to the upper or lower auxiliary select magnet of the associated switch depending on whether the calling line is assigned to an upper or lower horizontal; and its make contacts 10 extend ground potential to switching relays 600 over wires FG–1 to FG–5 to operate the concerned idle-test and pre-operate relays therein to prepare the frame controller for testing the originating trunks and, upon such selection of an idle one of them, for effecting seizure thereof.

If two or more fives relay wires FR–1 to FR–10 are energized at the same time from two or more calls in the first 50-line group, but in two separate fives group, each of the corresponding ones of the fives relay starts to operate. However, the first such relay in the current order of preference opens the preference chain in chain and allotting relays 500 as will be described hereinafter to prevent effective operation of any other group relay.

IVA3. *Units selection*

When the call is originated at any one of the 100 lines in any switch group, ground appearing on any units mark wire U1 to U5 reaches line grouping relays 400 over conductors in cable group 471 to 490 and is then extended through the concerned one of the closed contacts 1 to 5 of the operated fives-group relay, over the concerned one of conductors US–1 to UC–5, through the winding of the corresponding units lockout relay 421 to 425, and through the chain contacts on the units lockout relays to battery potential through current-limiting resistor 470.

Responsive to the operation of any one of the relays 421 to 425, contacts 1 and 2 thereon preclude the operation of all other relays.

If two or more of the units mark wires U1 to U5 are grounded at the same time, for example, if two lines in the same fives group are calling simultaneously, each of the concerned units lockout relays start to operate, but the first such relay in the current order of preference opens the preference chain thereby preventing effective operation of any succeeding one.

Make contacts 3 of each of the operated units lockout relay connects the start wire ST to the selected one of the control wires 1 to 5 extending to chain and allotting relays 500 over conductors in cable group 430.

Assuming that the calling line is the first line in the first fives group of the first switch, fives group relay 401 operates from ground appearing on the fives mark wire FR–1 and units lockout relay 421 operates from ground appearing on the units wire U–1.

If two calls are simultaneously originated from two separate 50-line groups, the associated fives-group relays start to operate. As will be pointed out hereinafter, however, chain and allotting relays 500 are so arranged that only one 50-line group has preference and only the fives-group relay therein fully operates.

Restricted service is provided on the last five lines of each switch as indicated by jumpers connecting ground to contacts 9 of the last fives relay associated with each switch. Operation of any such fives-group relay grounds restricted service wire RS to restrict such lines from certain trunk groups, such operation being described hereinafter.

IVB. *Chain and allotting relays 500*

(Fig. 5, parts 1 to 3)

The operation of the chain relays 501 through 516 and the operation of the allotting relays 517 through 524 will now be described in detail.

IVB1. *Relay functions of the chain relays*

The chain relays shown in Fig. 5, parts 1 and 2, have principal functions assigned thereto as follows:

Relay 501 (regular release) operates when the hold magnet operate wire is energized to stop the timer and start the release of chain equipment;

Relay 502 (fault relay) operates after a predetermined time to forcibly release the equipment in the event the apparatus is not cleared out in the usual manner;

Relay 503 (time-start relay) is operated by either the regular-release relay or the time-release relay to forcibly release the chain equipment;

Relay 504 (time-release relay) when operated releases the operated gate relays to prevent repeated seizure of the equipment by the same call when trouble is present;

Relays 505, 508, 511 and 514 (demand relays) respond to a calling condition to start the frame controller into its operation and to operate the associated gate relay;

Relays 506, 509, 512, and 515 (gate relays) control the operation of the frame controller so that it handles only one call in a 50-line group at any one time; and Relays 507, 510, 513 and 516 (alarm relays) are normally operated but restore whenever the chain is opened when no call is in progress to furnish a trouble alarm and provide a sufficient delay between two successive calls to prevent any interaction within the same chain.

The chain relays comprise two separate groups, an originating-call group comprising relays 508 to 510 and 514 to 516 and a terminating-call group comprising relays 505 to 507 and 511 to 513. The originating call group is called into operation responsive to a demand for an originating trunk (finder action) and the terminating call chain group is called into operation responsive to a demand for a terminating trunk (connector action).

IVB2. *Detailed operation*

A detailed operation of the allotting relays will now be given.

IVB2*a*. *Finder-chain operation*

Responsive to the grounding of a fives-group relay wire of the ten wires FR–1 to FR–10, a circuit is completed through the winding of such relay, the chain-end conductor CH–END–1 of cable group 440, break contacts of alarm relay 510, the lower winding of demand relay 508, and break contacts on gate relays 512 and 515 to battery through current-limiting resistor 534, provided relays 512 and 515 are restored. The current flow through current-limiting resistor 534 and the calling fives-group relay and associated demand relay in series is of such value that the demand relay is the only one of the two relays which operate.

Responsive to the operation of demand relay 508, its make contacts extend ground potential from break contacts 4 of time-release relay 504 and back contacts of the preceding demand relay to the winding of the associated gate relay 509.

Gate relay 509 operates. Battery potential from current-limiting resistor 531 is extended through break contacts 4 of the fault relay 502, and break contacts 2 of the time-release relay 504, wire 555, the upper winding of demand relay 508, make contacts 2 thereon, the associated rectifier 539, and make contacts on the associated alarm relay 510 to the chain-end wire CH–END–1 extending to the winding of the concerned one of fives-group relays 401 to 410. The current flow over this path is such that the concerned group relay operates and as noted, locks over the associated chain-in conductor CH–IN–1 independently of the alarm relay contacts and associated rectifier. Rectifier 536 blocks the interaction of the chain-in and chain-end wire.

In this manner, demand relay 508, associated with the first group of fifty lines is operated provided it is in the current order of preference, such preference being determined by the break-make contacts on the gate relays; operates the associated gate relay to prevent subsequent interference; and thereafter operates the associated group relay, which locks in series with the demand relay, maintaining them both operated.

Break contacts 4 of gate relay 509 restore the alarm relay thereby opening the chain-end wire to the other fives-group relays in the same 50-line group to prevent subsequent calls for seizing and establishing a demand in the same group. The break contacts 5 of relay 509 open the operate circuit of any succeeding demand relays to maintain the operation of the frame controller on a one-at-a-time basis. Make contacts 6 of relay 509 lock the associated gate relay operated to prevent continuous demand relay operation in the event trouble occurs. This feature will be described in detail hereinafter. Make contacts 7 of the break-make combination on gate relay 509 connects wire 553 to timer control wire 551. Jumper E of jumper board 533 connects the 60 I. P. M. lead to timer 532 in order to start timing the call. Make contacts 9 extend ground potential from break contacts 6 of time-release relay 504 through break contacts 6 of regular-release relay 501, and chained break contacts on the unoperated gate relays to wire 552. This ground starts the timer into its timing operation by rendering it responsive to the 60 I. P. M. pulses appearing on wire 551. Contacts 10 of relay 509 connect grounded wire 552 to the start wire ST to start the allotting relays to test the trunks accessible by the calling line. This ground is also extended to the concerned one of the wires 1 to 5 of cable 430, as determined by the units lockout relays of Fig. 4, as noted.

IVB2*b*. *Connector-chain operation*

The operation of the connector-chain relays is similar to above described operation. When the chain circuit of the calling connector is closed, the chain relay thereof is placed in series with the demand relay of Fig. 5 as described for the fives-group relay of the line grouping relays 400.

The gate relays of the connector-chain relays have locking preference over the gate relays of the finder-chain group as calls to trunk groups assigned connector-section switch verticals release the connector so that the next succeeding call will be able to use the connector just released, rather than meet an all-busy-condition if all other connectors are busy.

IVB2*c*. *Clearout*

On completion of the extension of the connection from the calling line to an idle originating trunk or upon completion of the connection from the connector to a called line, this operation being described hereinafter, ground from contacts 1 of relay 519 of the allotter circuit or the chain-release wire CH–RLSE is extended to the battery-connected winding of the regular-release relay 501.

Regular-release relay 501 operates and at its contacts 5, open the timer 60 I. P. M. lead and at its contacts 6 open the start ground wire ST to release the allotter and chain relays.

At such time, gate relay 509 being slow-restoring (as indicated by a copper sleeve surrounding its winding) provides sufficient time for the other chain demand relay to operate before relay 508 reoperates on another call, if a call is waiting in the second chain.

IVB2*d*. *Timing out provisions*

If for some reason the chain equipment is not released within a predetermined time and regular release relay 501 is still operated, the timer releases the chain equipment. This operation is as follows:

As previously noted, operation of any gate relay extends the 60 I. P. M. pulse lead to the timer 532 over wires 551 and 553. Timer 532 is so arranged that after the third impulse is received over wire 551, ground appears on wire 550 to operate the time-release relay 504, which upon operating closes its make contacts 2 before opening its operate circuit at its break contacts 1. Contacts 2 connect the lower winding of relay 504 in series with the upper winding of the associated demand relay and the operated fives-group relay. This circuit path is through break contacts 3 of the fault relay 502, the make-first "*x*" contacts 2, wire 555, the winding of demand relay 508, make contacts 2 of gate relay 509, and the chain-end wire CH–END–1 to the fives-group relay 401.

Contacts 3 of operated time-release relay 504 extends the ground potential from break contacts 4 of regular release relay 501 through break contacts 5 of fault relay 502 to the battery-connected winding of time-start relay 503, operating it, make contacts 4 extend ground potential to the winding of the slow-restoring gate relay 509 to prevent the demand relay from initiating another call at such time; contacts 5 connect wire 551 to wire 554; and make contacts 6 place the start wire ST under control of time-start relay 503.

The placing of the lower winding of time-release relay 504 in series with the winding of demand relay 508 and fives-group relay 401, as noted, limits the current-flow over such circuit to such an extent that relay 401, demand relay 508, and time-release relay 504 restore.

Following the release of these three relays, the operated gate relay is restored, closing an operate circuit for the succeeding gate relays.

In the event that the fives-group relay or the demand relay does not release after placed in series as noted, time-start relay 503 operates through make contacts 3 of relay 504. Contacts 2 of relay 503 extend ground from wire 550 through contacts 1 of relay 504 to the battery-connected winding of fault relay 502.

Relay 502 operates and at its break contacts 3 open-circuits the operate path of the series-connected demand and group relays, thereby forcibly causing their restoration; its contacts 4 remove the battery from wire 555; its break contacts 5 restore time-start relay 503; and its break contacts 6 open wire 551. Immediately following such operations, time-start relay 503 restores, followed by the restoration of the fault relay 502, thereby completely clearing out the equipment in preparation for the next call.

IVB2*e*. *Chain alarm*

A chain alarm relay (not shown) may be connected in place of resistor 582 to provide an alarm when the chain of the fives-group relays or the connector chain relay is opened when no call is in progress. Current flow from the battery-connected winding of an alarm relay such as 507 is extended over the chain-out wire to the associated chain (finder-chain or connector chain), over the chain-in wire of cable 440 or 596 and through break contacts of the gate relays to ground at resistor 582 to maintain the alarm relays normally operated, as illustrated.

IVB3. *Allotting relays*

The allotting relays of chain and allotting relays 500 will now be described with reference to Fig. 5, parts 1 to 3.

IVB3*a*. *Relay functions*

The 17 relays (517 to 533) of the allotting relays have principal functions assigned thereto as follows:

Relay 517 (Busy) operates when all trunks are busy to return busy tone and advance the allotting register AR one step in order to shift the preference;

Relay 518 (Operate) operates following the selection of an idle trunk to operate the secondary-off-normal relay SON to close through the hold magnet leads to the hold magnets to complete the extension of a connection to an idle trunk;

Relay 519 (SON) operates responsive to an off-normal condition from the select magnets; initiates the clearing out of the common equipment; and extends ground potential to the selected hold magnet operate wire;

Relay 520 (Cutoff) operates when an idle originating trunk is found, to prevent subsequent interference with the selected trunk;

Relay 521 (Counter Clearout) operates to restore the counter;

Relays 522 to 531 (Test) are individually associated with called trunks and operate to select an idle one of them;

Relays 532 and 533 (Horizontal Group) operate from control from line grouping relays 400 to select the first five or second five select magnets of the calling switch;

Counter AR (Allotter Register) operates at the end of each call to shift the choice among the ten test relays.

IVB3*b*. *Allotter relay operation*

Responsive to the operation of the fives-group relay associated with the fives group of lines containing the calling line, the associated one of the conductors A or B of cable 430 is ground, as noted, to operate one or the other of the horizontal group relays 532 or 533. Contacts on the operated units lockout relay (Fig. 4, part 2) connect the grounded start wire ST to the selected one of the units wires 1 to 5 extending to contacts on relays 532 and 533.

Assuming the horizontal group 1 relay 532 is operated, contacts 1 to 5 thereon extend the ground potential appearing on one of the wires 1 to 5 to the select magnets control wires SM–1 to SM–5 extending to the switching relays 800 over conductors in cable group 573.

The ground appearing on the start wire ST is also extended over wire 561 to the break contacts of the allotter register AR from whence it is extended through the break and make contact sets to one of the wires in cable group 593, depending on the register setting. In its illustrated position, such ground appears on wire 1 thereby giving first choice in operating preference to test relay 522, such operation being described later. This ground is also extended to break contacts 2 to 11 of cutoff relay 520 from whence it is extended to the one side of the windings of each of the test relays 522 to 531 over conductors in cable group 583, the other side of such windings having battery potential thereon from the idle trunks.

At such time, the hereinbefore noted grounding of one of the fives-group control wires FG–1 to FG–5 operates the switching relays 800 which connects the idle-test wires IT and the pre-operate PRE–OP wires of the trunks associated with the switch containing the calling line to the test relays 522 to 531 over respective conductors 571 and 570.

All test relays with idle-indicating battery potential on the idle test wires IT–1 to IT–10 will operate, but only the one having the preference at such time will lock operated through its make contacts 3 from the ground appearing on the concerned one of the wires 1 to 10 in cable group 593.

Assuming the choice allotter register AR to have its contact sets 1 actuated, the ground appearing on the start wire ST is extended through break contacts 2 and make contacts 1 of the register AR to wire 2 through the associated jumper to the make-break chain of contacts 3 of the test relays over cable 593. Under such conditions, the preference is on test relay 523 associated with the second trunk in the group being tested.

Assuming the first two trunks to be idle, relay 522 and relay 523 will both operate over the noted operate path, (wires 1 to 10 of cable 583) but relay 523, having the preference, will lock operated through its make contacts 3 and its second winding.

Following the operation of relay 523, contacts 3 thereon open the forward extending portion of the chain thereby removing the locking ground potential from the remainder of the locking contacts.

Responsive to the operation of any test relay, make contacts 4 thereon extend ground potential to the battery-connected winding of the cutoff relay 520.

Cutoff relay 520 operates and at its break contacts 2 to 11 removes ground potential from the one side of the upper winding of the test relays thereby permitting all operated ones excepting the locked operated one to restore; at its break contacts 1 it opens the operate circuit of the busy relay 517; and at its make contacts 12, extends ground potential to the battery-connected winding of operate relay 518.

Operate relay 518 operates and at its make contacts 1 extends battery potential from current-limiting resistor 530 to wire 558 from whence it is extended through the break contacts 1 of the unoperated test relays preceding the operated one, and through make contacts 1 of the operated test relay to the associated pre-operate wire PRE-OP of cable 570 extending to the selected trunk. As hereinbefore pointed out, battery potential on the pre-operate wire operates the line relay of the apparatus associated with the selected idle trunk in order to speed up the switching-through operations. Make contacts 2 of relay 518 extend the ground potential on the secondary-off-normal wire SON to the battery-connected winding of the secondary-off-normal relay 519. As hereinbefore pointed out, wire SON was grounded responsive to the operation of the select magnets associated with the calling line. Make contacts 3 of relay 518 extend the ground potential on restricted service wire RS (if the calling line is in a group of five lines having restricted service) to wire 559 extending to the chained break-make contacts 2 of the idle-test relays 522 to 531. This ground is extended to the idle-test wire of the selected trunk over conductors in cable group 571 to provide restricted service, such service being described in more detail hereinafter.

Secondary-off-normal relay 519 operates and at its make contacts 1, grounds chain release wire CH–RLSE to initiate the clearing out of the chain groups as hereinbefore described. Make contacts 2 txtend ground potential through break contacts 2 of counter clearout relay 521 to the battery-connected operate winding of the choice allotter AR causing it to advance its contact sets to its next position, position 3. Make contacts 3 of relay 519 connect start wire ST (conductor 561) to conductor 560 to maintain the selected one of the test relays operated when the choice allotter is advanced or restored. Make contacts 4 of relay 519 ground wire 556 extending through the series make-break contacts 5 of the test relays to ground the hold magnet wire HM–1 to HM–10 associated with the verticals terminating the selected trunk.

Assuming all the trunks are busy, none of the test relays 522 to 531 operates. Under such circumstances, cutoff relay 520 fails to operate and its break contacts 1 maintain the operate circuit for the busy relay 517 closed. Following the operation of the gate relay in the selected chain group, contacts 1 thereon extend the ground potential on wire SON to the busy ground wire BU–GRD. This ground appears on wire BU–GRD on an all-trunk-busy condition and is extended through break contacts 1 of the cutoff relay 520 to operate busy relay 517.

Busy relay 517 operates and at its make contacts 1 grounds the trunk-busy wire TRK–BU extending to the sleeve test relays 800, and at its contacts 2 advance counter AR.

When the choice allotting register AR is advanced to its last and tenth position (when ten trunks are tested simultaneously) when ten non-graded trunks are provided the ground from contacts 2 of the secondary-off-normal relay 519 or contacts 2 of busy relay 517 is extended through make contacts 10 of the register AR to the battery-connected winding of the counter clearout relay 521.

Counter-clearout relay 521 operates and locks. At its make contacts 1, relay 521 closes as operate circuit for the upper (or knock-down) winding of the magnetic impulse counter thereby generating a neutralizing flux in opposition to that holding the counter operated. Responsive to the restoration of counter AR, and the release of the common equipment, relay 521 restores.

The choice allotter register AR is provided with a jumper board from which jumpers may be installed as desired. Assuming there are two first-choice trunks in the group of 12 graded trunks, control wires 3 to 10 are connected together and connected to the KD lead as illustrated. Upon the advancement of the allotter to position 3, ground potential on the start wire ST is extended over the connected jumpers to the battery-connected winding of counter clearout relay 521 which operates and restores the counter, as described. In this manner, the counter can shift the preference among the first-choice trunks, the second-choice trunks being used in fixed order.

Responsive to the grounding of the hold-magnet wire, the associated magnet operates and closes the contacts on the switch to complete the seizure of the selector or connector relay apparatus. Responsive to such operation of the hold magnet, ground is returned on the sleeve conductor of the trunk extending thereto to operate the concerned cutoff relay of the calling line circuit.

Responsive to the operation of the cutoff relay, the line relay of the concerned line circuit is released, thereby restoring the series-connected fives-group relay and demand relay; the operated units relays; the operated horizontal group relay; all operated relays in the swiching relays 800; and the operated gate relay. Ground is removed from the start wire ST and all operated relays of the allotting relays are restored. The apparatus is now cleared out in preparation for another call either from a connector-chain group or from a finder-chain group.

The allotter test relays are also used to test trunks assigned to switch verticals and such testing operation will be described in detail hereinafter, with reference to the sleeve test relays 800.

IVC. *Switching relays 600*

(Fig. 6, parts 1 and 2)

The operation of switching relays 600 in responding to control from the allotter and sleeve test relays to extend a calling line to an idle selector or connector or to a trunk assigned a horizontal or vertical will now be described with reference to Fig. 6, Parts 1 and 2.

IVC1. *Relay functions of switching relays 600*

The 26 relays of switching relays 600 have principal functions assigned thereto as follows:

Relays 601 to 605 (Idle-test) operate from control from the line and grouping relays 400 to close the idle-test wire of the trunks being tested to the test relays of the allotter circuit;

Relays 606 to 610 (Pre-operate) operate in parallel with relays 601 to 605 to extend the pre-operate battery to the tip conductor of the selected idle trunk;

Relays 611 to 615 (Originating Hold Magnet) operate to connect the hold-magnet operate leads of the allotter to the associated hold-magnets on the switch serving the selected originating trunk;

Relays 616 to 620 (Terminating Hold Magnet) operate to connect the hold magnet operate leads of the allotter to the hold magnet associated with calling connectors;

Relays 621 to 625 (Select Magnet) operate to extend the principal select-magnet operate wires to the switch serving the calling line or selected trunk in order to operate the concerned select magnet. On calls to trunks assigned verticals, they are operated over their second winding; and Relay 641 (Idle-test Trunk Group) operates to connect the idle-test wires from the allotter to the switch verticals assigned trunks.

IVC2. *Detailed operation*

A detailed operation of the switching relays 600 will now be given.

Switching relays 600 comprise five groups of five relays each, the first, second and last group being illustrated in Fig. 6, parts 1 and 2.

There is a group of five relays for each line frame switch, these relays functioning to connect the control leads of their associated switch to the common equipment.

When a fives-group relay in the line grouping relays 400 is operated as previously noted, contacts thereon ground one of the fives-group wire FG–1 to FG–5 corresponding to the switch containing the calling line and other contacts on the operated fives-group relay extend ground to operate the auxiliary select magnet associated with the calling fives-group of lines. Following the operation of the auxiliary select magnet, ground is returned on the units-lock off-normal lead UL–ON over conductors in the associated switch cable group SCG–1 to SCG–5.

Assuming the calling line to be served by the first switch, conductor FG–1 from line grouping relays 400 is grounded and conductor UL–ON of cable group SCG–1 is grounded.

The appearance of ground on the fives-group wire FG–1 from line grouping relays 400 is extended to the battery-connected windings of idle-test relay 601 and pre-operate relay 606.

Relay 601 operates and at its contacts 1 to 10 connect the idle-test conductors IT–1 to IT–10 (cable 571) of the trunks assigned to verticals V1 to V10 of switch 1 to the test relays of chain and allotting relays 500 over associated conductors in cable group 571.

Pre-operate relay 606 operates and at its contacts 1 to 10 connect the pre-operate wires PRE–OP–1 to PRE–OP–10 (cable group SCG–1) of the tip conductors T of the trunks served by switch 1.

Following the operation of the auxiliary select magnet of the switch containing the called line, normally grounded units-lock off-normal ground conductor UL–ON–GRD (grounded in sleeve test relays 800) is extended through off-normal contacts on the selected switch to the units-lock off-normal wire UL–ON of cable SCG–1 extending to the battery-connected winding of the parallel-connected relays 611, 616, and 621.

The originating hold magnet relay 611 operates and at its contacts 1 to 10 connect the hold magnet wires HM–1 to HM–10 of cable 572 to the battery-connected winding of the associated hold magnets on the associated switch over conductors HM–OP–1 to HM–OP–10 of cable SCG–1.

The terminating hold magnet relay operates and at its contacts 1 to 15 connect the hold magnet operate wires HM–OP–12 to HM–OP–25 (associated with the 14 connector relay circuits) to the associated hold magnets of the switch serving with the calling connectors.

The select magnet relay 621 operates and at its contacts 1 to 10 connect the principal select magnet operate wires SM–OP–1 to SM–OP–10 (cable SCG–1) of the select magnets of the selected switch to the select magnet wires SM–1 to SM–10 of cable group 573.

With relays 601, 606, 611, 616 and 621 operated, the chain and allotting relays 500 test the trunks in the originating group over idle-test conductors IT–1 to IT–10 of cable 571 and contacts 1 to 10 of relay 601; upon selecting an idle one of them, the chain and allotting relays 500 project battery potential to the tip conductor of the selected trunk over the associated one of the pre-operate leads PRE–OP–1 to PRE–OP–10 of cable 570 and contacts 1 to 10 of relay 606; the chain and allotting relays 500 ground the select magnet wire SM–1 to SM–10 of cable 573 which is extended to the select magnet associated with the calling line through contacts 1 to 10 of relay 621; and the allotter 500 then grounds the hold magnet wire HM–1 to HM–10 of cable 572 which through contacts 1 to 10 of relay 611 operate the hold magnet associated with the vertical serving the selected trunk.

On calls for a terminating trunk (connector-action) contacts 1 o 14 of relay 616 connect the hold magnet operate wire (HM–OP–12 to HM–OP–25) to the hold magnet associated with the vertical terminating the calling connector.

On calls to trunks assigned verticals, the operation of a select-magnet relay such as relay 622 is over the "A" conductor one of the five conductors A to E of cable group 680, and the operation of the idle-trunk-group relay 640 is over the trunk ground lead TRK–GRD of cable 680. The functions performed by the relays will be described hereinafter with reference to calls to trunk groups assigned verticals.

IVD. *Sleeve test relays 800*

(Figs. 7 and 8)

Referring now to Fig. 7 and Fig. 8, parts 1 to 4, a detailed description will be given of the sleeve test relays and associated pin terminal section.

IVD1. *Circuit functions of sleeve test relays 800*

Sleeve test relays 800 is a portion of the frame controller 1550 common to the connectors serving 100 lines and is used primarily for extending connections from calling connectors to called lines or trunks.

The sleeve test relays provide special services such as P. B. X service, calls to trunks assigned verticals, and calls to trunks assigned line circuits (horizontals) in addition to controlling the crossbar switches in extending connections from calling connectors to called idle lines.

IVD2. *Relay functions of sleeve test relays 800*

The 45 relays of sleeve test relays 800 have principal functions assigned thereto as follows:

Relays 801 to 805 (Hold-magnet Control) are operated on calls to trunks assigned verticals. They call-in the hold magnet control wires of the hold magnets of verticals assigned trunks;

Relays 811 to 820 (Sleeve Call-in) are controlled by the hold-magnet control relays to call-in the sleeves of the lines to identify the calling one therein in order that a call to a trunk assigned a vertical may be directly switched through and the connector circuit released;

Relays 821 to 824 (Trunk Group) are operated on calls to P. B. X groups or on calls to trunks assigned line circuits in order to test the sleeves of the line in the tens group serving the calling lines or trunks to determine the idle or busy conditions thereof;

Relay 831 (Sleeve-select) is operated on calls to trunks assigned verticals to mark a call as originating on the upper horizontals;

Relay 832 (Sleeve-control) is operated to mark the sleeve of the calling line for line-identification purposes;

Relay 833 (Line-identification) operates on calls to trunks assigned verticals to start the sleeve test relays into its hereinafter described operation to identify the calling line and to cause the allotter of Fig. 5 to search for an idle trunk;

Relay 834 (Clearout) is operated on calls to trunks assigned verticals after a calling line has been connected to a trunk to clearout the connector and to hold the sleeve test circuit in its operated condition until such time as ground is returned on the sleeve from the seized trunk;

Relay 835 (P. B. X Start) is operated on P. B. X calls or calls to trunks assigned line circuits to start the sleeve test relays 800 into operation;

Relay 836 (Busy) operates on calls to lines in a P. B. X group or to trunks assigned the line circuits when all paths are busy;

Relay 837 (Connect) is operated to momentarily connect the sleeves of the trunks being tested to the test relays;

Relay 838 (Locking) is operated to supply locking-battery potential to the test relays;

Relay 839 (Cutoff) is operated on calls to outgoing trunk groups assigned to verticals to disconnect the sleeves from the test relays;

Relays 841 to 850 (Test) are operated on calls to P. B. X groups or to lines assigned trunks to test the sleeves of such lines;

Relays 851 and 852 (Busy) are operated on busy conditions to cause the connector to return busy tone to the calling line or trunk;

Relay 853 (Reverting Call) is operated on a reverting call to identify the call as a reverting call in the connector;

Relays 854 and 855 (Line-idle) operates if the called line tests idle;

Relay 856 (Reverting-call Test) tests the sleeve of the called line to determine whether the call is a reverting call or not; and Relay 857 (Line-busy) operates when the called line is busy to transmit such information to the associated connector.

The pin-terminal section 700 shown in Fig. 7 is used in conjunction with the hold-magnet control relays, the sleeve call-in relays and the trunk group relays. Its functions will be described in detail hereinafter with reference to the description of the operation of such relays.

IVD3. *Detailed operation*

A detailed operation of the sleeve test relays 800 and the associated pin terminal section 700 will now be given with reference to Fig. 7 and Fig. 8, parts 1 to 4.

IVD3*a*. *Call to a local line*

When a call is to a local line terminated on a horizontal of a line frame switch, the operation of the sleeve test relays is as follows.

On calls to local lines reached by dialing the directory numbers thereof, only relays 851 to 857 of sleeve test relays 800 are involved.

Following the operation of the concerned connector in controlling the line frame switch in extending a connection from the connector to a called line in response to the dialing of the directory number thereof, the sleeve of the called line is connected to line-idle relay 855 over the called sleeve conductor of cable group 1099 or 1199.

IVD3*a*1. *Called line idle*

If the called line is idle, battery potential on the sleeve conductor thereof is extended to the ground-connected winding of line-idle relay 855 through break contacts 2 of the line-busy relay 857.

The line-idle relay 855 operates and at its make contacts extends the ground potential on the guard wire (grounded at contacts 2 of the operated hold magnet terminating the connector) to the battery-connected winding of the idle-auxiliary relay 854.

The idle-auxiliary relay 854 operates and at its make contacts 2 locks operated to its operating ground; at its make contacts 1 grounds the called sleeve conductor to operate the cutoff relay of the line circuit associated with the called line to prevent line-finding action when the called party answers; and at its break contacts 3, opens the operate path of the line-busy relay 857.

The ground appearing on the called-sleeve conductor is now extended to the ground-connected winding of line-idle relay 855, short-circuiting it and causing it to restore. With the restoration thereof, its break contacts extend the ground potential through make contacts 3 of the idle-auxiliary relay 854 to the cut-through conductor CT extending to the connector circuit.

As hereinafter described, following the appearance of ground on the CT lead, the connector chain relay is released, removing ground from the guard wire of cable 1099 or 1199. Idle-auxiliary relay 854 restores returning the sleeve-test relays to normal in preparation for another call.

IVD3*a*2. *Called line busy*

When the called line tests busy, the ground appearing on the called busy sleeve is extended to the ground-connected winding of line-idle relay 855, which fails to operate. At the same time, the ground on the guard wire is extended through break contacts of unoperated relay 855 and the break contacts 3 of idle-auxiliary relay 854 to the battery-connected winding of line-busy relay 857.

After a slight delay, due to the copper slug surrounding the armature end of the core, relay 857 operates.

Responsive to the operation of relay 857, its operate ground (called-sleeve ground) is extended through its make contacts 3 to the battery-connected winding of the first busy relay 852. Relay 852 operates after a slight delay (slow-operating due to its copper slug surrounding the armature end of the core) and at its make contacts further extends the grounded sleeve conductor to the battery-connected winding of the second busy relay 851.

Busy relay 851 operates and grounds busy lead BU which operates the busy relay in the calling connector to cause busy tone to be returned to the calling line. As will be hereinafter pointed out, the appearance of ground on the busy wire BU operates the busy relay therein which restores the associated chain relay and removes ground from the guard wire in cable 1099 or 1199. The sleeve conductor of the calling line is now maintained grounded through resistance 897 to maintain the extended connection intact.

IVD3*b*. *Reverting call*

Following the above described operations when the called line is busy, the sleeve test relays 800 make a further test to determine if the busy condition encountered was due to a reverting call.

With line-busy relay 857 operated and before relay 851 operates, a reverting call test is made as follows: Contacts 1 of relay 857 remove ground potential from the calling sleeve conductor (the sleeve of the calling line) and substitutes resistance battery in lieu thereof from current-limiting resistor 896 and break contacts 2 of reverting-call relay 853.

If the call is a reverting call, the battery potential from resistor 896 appears on the calling sleeve which is now connected to the ground-connected winding of reverting-call test relay 856 through make contacts of the now operated line-busy relay 857.

Reverting-call test relay 856 operates and at its make contacts transfers the ground on the guard wire from the winding of busy relay 852 or 851, to the battery-connected winding of reverting call relay 853 through make contacts 3 of relay 857.

Relay 853 operates and at its make before break contacts 3 locks operated to the ground on the guard wire independent of line-busy relay 857; its contacts 2 remove the substituted battery potential from the sleeve of the calling line thereby restoring the reverting-call test relay 856; its contacts 1 shunt the resistance 897 connected to the calling sleeve, thereby shunting the reverting-call test relay to insure its restoration; its make contacts 4 recloses the operate circuit of the busy relays 851 and 852 if relay 856 fails to restore; and its make contacts 5 extend the ground potential on the guard wire through make contacts 3 of line busy relay 857, the break contacts on reverting-call test relay 856 (now restored) to the reverting-call wire RC extending to the associated connector circuit.

Following the appearance of ground on reverting call wire RC, the associated connector transmits reverting call tones to the calling line and as will be described hereinafter, opens the connector chain circuit, freeing relays 851 to 857 in preparation for another call.

IVE. *Terminal-pin section* (*Fig. 7*)

The terminal pins of Fig. 7 are shown as small individual circles. They provide terminals through which the noted special services are controlled by jumpers extended between the terminals as desired.

There are 300 terminal pins shown in Fig. 7. They comprise two sections (701 and 702) of 150 pins each. In any section 701 and 702 the pins are arranged in ten columns with fifteen pins in a column, and in fifteen levels, with ten pins in a level. For ready identification, the fifteen levels of pins in a section are divided into three five-level groups 1 to 3. The 150 pins of each section thus comprise three smaller groups of fifty each.

IVE1. *Hold magnet field*

Five-level group 1 of each of the two sections 701 and 702 comprise the hold-magnet field. The ten pins in the first level of group 1 of section 701 and the first four pins of the first level of group 1 of section 702 are assigned the hold magnet operate leads HM–12 to HM–25 of the first switch. The second level is assigned the hold-magnet leads of switch 2, and so forth. Accordingly, any jumper connected to any pin the hold magnet field makes connection with the associated hold magnet winding.

IVE2. *Hold magnet control relay field*

The second five-level group of pins in section 701 terminates the five groups of conductors HMG–1 to HMG–5 extending from contacts 1 to 10 of relays 801 to 805 over cable 895. The first level terminates the wires associated with the first relay, the second level terminates the wires of the second relay, and so forth. Accordingly, any jumper connected to the terminal pins in the control relay field is connected to corresponding contacts on the associated relay.

IVE3. *Trunk group relay field*

The third five-level group of pins of section 701 terminates the four groups of sleeve test group conductors STG–1 to STG–4 extending from relays 821 to 824 over cable 895. The first level terminates the ten wires associated with the first relay 821, the second with relay 822, and so forth. Any jumper connected to the terminal pins in the trunk group relay field is connected to corresponding contacts of the associated ones of the relays 821 to 824.

IVE4. *Sleeve field*

The second and third five-level groups of section 702 terminate the one hundred sleeves conductors of the lines of the system extending to the pin-terminal section 700 over sleeve extension group SEG–1 to SEG–10 of cable 895. The sleeves of lines 00 to 09 are terminated on the first level in five-level group 2; the second ten sleeves (lines 10 to 19) are terminated on the second level of the five-level group 2; and so forth for all one hundred sleeves. Any jumper connected to the pins in the sleeve field make connection with the sleeves of corresponding lines.

IVF. *P. B. X service*

The operation of the sleeve test relays 800 in handling calls to lines assigned P. B. X service will now be described.

As it is normal in providing P. B. X service, any tens digit may be arbitrarily assigned for P. B. X service with the restriction that all P. B. X numbers must be in the same tens-line group and that all P. B. X numbers must have a units digit "0."

In order to assign lines to P. B. X service, the sleeves of such lines must be jumpered in such a way that they appear at the contacts of one of the trunk group relays 821 to 824, operation of these relays being described hereinafter. Such jumpering is illustrated in Fig. 7 on the pin-terminal section 700 by jumpers such as 751, 752 and 753 which connect the sleeves of the first three lines (lines 71 to 73) in the eight ten-line group to contacts 1 to 3 of relay 823. In this manner, the sleeves of the first three lines in the eighth group of ten lines are connected to contacts 1 to 3 of relay 823 so that when trunk group relay 823 is operated, the sleeves of the lines assigned P. B. X service are connected to the common conductors C–1, C–2, and C–3 (conductor C–3 not shown) of cable group 875 extending to the sleeve test relays 841 to 850.

As will become apparent hereinafter, the lines in a

P. B. X group, while being in the same ten-line group, need not be consecutive lines as the lines are tested individually and simultaneously.

It has been chosen to utilize relay 823 for P. B. X service. Accordingly, jumpers 751 to 753 were assigned to contacts 1 to 3 of relay 823 and the control wires thereof which are terminated on jumper board JB–898 are connected to other control wires to ready such relay for P. B. X service.

To ready trunk group relay 823 for P. B. X service, control wire A is connected to units wire UO on jumper board JB–898 by jumper 893, and control wire D is connected to the tens digit wire (T–8) assigned P. B. X numbers by jumper 892.

In this manner, responsive to the dialing of the tens digit 8, trunk-group relay 823 operates from ground appearing on the tens wire T–8 and responsive to the dialing of the units digit 0, ground appearing on units wire UO is extended through make contacts 13 to the P. B. X–1 wire extending to the connector circuit.

This ground appearing on the P. B. X–1 conductor is extended through the associated connector 1000 and reappears on the P. B. X–2 conductor extending to the battery-connected winding of the P. B. X start relay 835. At the same time, the sleeves of the lines in the called tens group are connected to the associated common conductors C–1 to C–10 which are extended over associated conductors in cable group 875 to the make contacts 1 to 10 of connect relay 837.

P. B. X start relay 835 operates and at its break contact 6 opens the units wire UO to prevent the call from being handled in the normal manner; its make contacts 2, break contacts 3 of sleeve control relay 832, and break contacts 7 of line-identification start relay 833 ground condutcor 878 which is connected to one side of the upper winding of each of the sleeve test relays 841 to 850; its make contacts 4 extend ground potential from break contacts 6 of relay 832, to wire 880 from whence it is further extended through break contacts 3 of the chained contacts on the sleeve test relays to the battery-connected winding of connect relay 837; its make contacts 1 extend battery potential from current-limiting resistor 872 through break contacts 2 of relay 832 and break contacts 6 of relay 833 to the ground-connected winding of lock relay 838; and its make contacts 5 prepare an operate circuit for the select magnet wires SM–1 to SM–10.

Connect relay 837 operates from the ground on wire 880 and at its contacts 1 to 10 extends the sleeves of the lines assigned P. B. X service to the ground-connected upper windings of the sleeve test relays 841 to 850; its break contacts 13 open the normal operate path of the select magnets; and its make contacts 12 extend its operate ground to the battery-connected winding of the P. B. X busy relay 836.

Lock relay 838 operates form battery through resistor 872 and at its contacts 1 to 10 extends such battery potential through break contacts 1 to 10 of cutoff relay 839 to make contacts 2 on each of the sleeve test relays.

When the sleeves of the lines in the called P. B. X group are extended to the windings of the test relays, the test relays associated with the idle lines will operate from the battery normally appearing on the sleeve conductors from the battery-connected winding of the associated cutoff relays. Responsive to the operation of the test relays associated with idle lines, they lock operated to battery potential through their make contacts 2 and at their break contacts 3 open the operate path of connect relay 837 and P. B. X relay 836.

Following the opening of the operate circuit of connect relay 837, with at least one test relay operated, relay 837 restores and at its contacts 1 to 10 disconnects the sleeve conductors from the test relays. Contacts 13 of relay 837 extend ground potential from break contacts 9 of relay 833 through make contacts 5 of the operated P. B. X start relay 835 to conductor 882 from whence it is further extended through make contacts 6 of the lowest-numbered operated test relay to the select magnet wire SM–1 to SM–10 extending to the principal select magnets over conductors in cable 680. The terminating hold magnet relay T–HM and select magnet SM are operated as noted from ground on conductor UL–ON and connect the hold magnet and select magnet operate leads to associated magnets.

Responsive to the operation of the select magnet associated with the first line of the P. B. X group found idle, and responsive to the operation of the auxiliary select magnet determined by the dialing of the tens digit, the switch is in readiness for operation of the hold magnet associated with the calling connector.

As will be described in detail with reference to connectors 1000 or 1100, ground from conductor SON is connected to the hold magnet operate wire HM–OP of the magnet associated with such connector and is extended through contacts on terminating hold magnet relay 605 (Fig. 6) to the associated hold magnet of switch 5, which terminates lines 81 to 83.

The concerned hold magnet operates and extends the call to the selected P. B. X line in a normal manner. Thereafter, the connector circuit removes ground from the tens and units leads, restoring the operated group relay, the P. B. X start relay, the operated sleeve test relay, and the lock relay, returning sleeve test relays 800 to normal condition in preparation for another call.

Provided there are no idle P. B. X lines in the called P. B. X group, no sleeve test relays operate and the operate path of busy relay 836 is consequently maintained closed. After a slight delay P. B. X busy relay 836 operates, it being slow-operating because of a copper sleeve surrounding the core, and at its make contacts, ground the busy conductor BU extending to the associated connector to operate the busy relay thereof to return busy tone to the calling line.

IVG. *Calls to trunks assigned line circuits*

When trunks are assigned to line circuits, as hereinbefore pointed out, the operation of the sleeve test relays 800 in calling-in the sleeves of such trunks, the testing for an idle trunk in the called trunk group, and the operation of the concerned select magnets and hold magnet is similar to that described for handling P. B. X calls. However, the jumpering on the jumper board 898 is somewhat different and the sleeve test relays are started into their testing operation by relays other than the P. B. X start relay. The operation of sleeve test relays 800 in handling trunk calls will now be described in detail with reference to Figs. 7 and 8.

As hereinbefore described, the group relays 821 to 824 may be assigned for special service as desired. On calls to trunks assigned line circuits, such trunk groups may be reached by the dialing of a single initial digit or by dialing a particular tens digit. It has been chosen to assign the first two relays 821 and 822 for service on handling calls to trunks assigned line circuits, relay 821 used on calls to "initial digit" trunks and relay 822 used on calls to "tens-digit" trunks.

IVG1. *Initial digit trunk calls*

It has been chosen to assign trunk group relay 821 for service in calling in trunk groups assigned to line circuits, such trunk group being reached by a single preliminary digit. When trunk groups are assigned initial digits, instead of tens digits, the entire ten lines need not be lost as subscriber lines. If three lines in a tens group are assigned initial-digit trunks, the remaining seven lines may be used as P. B. X numbers or as subscriber lines.

Assuming the trunk group assigned to line circuits is reached by dialing a single digit, ground appears on one of the digit group wires DG–1 to DG–3, as will be described hereinafter, and such wire is jumpered to the battery-connected winding of the trunk group relay assigned thereto.

It has been chosen to assign relay 821 for service in handling calls to initial digit trunks assigned line circuits and it has been chosen to have such trunk group reached by dialing the initial digit "0" which grounds wire DG–1 as will be described with reference to connector 1100. Accordingly, digit wire DG–1 is connected, by jumper 888 of jumper board JB–898, to the battery-connected winding of group relay 821 over conductor D.

Jumper 887 connects contacts 11 of relay 821 to the switch-through wire SW–THRU to operate the switch-through relay of the associated connector so that the calling line will be connected metallically to the selected trunk.

In order to permit trunks to be assigned lines associated with either an upper or lower select magnet, contacts 13 of group relay 821 is jumpered to the tens wire corresponding to the upper or lower auxiliary select magnet serving the lines assigned trunks.

It has been chosen to assign trunks to several lines associated with the upper select magnet and accordingly tens digit T–0 (corresponding to upper auxiliary select magnet of switch 1) is connected to contacts 13 of relay 821 by jumper 886, its function being described later.

In order for the sleeves of the trunks to be tested for busy or idle conditions, the sleeves of lines assigned trunks are connected to contacts on the associated trunk group relay so that sleeve test relays 841 to 850 may be used to test them.

It has been chosen to assign several lines in the same ten-line group of switch 1 for service as initial-digit trunks. One such line 02 (illustrated in Fig. 1, part 1) is associated with the upper auxiliary select magnet and the second principal magnet. Other lines not shown are assumed to be lines 03 and 04 (associated with the same auxiliary select magnet and principal magets SM–3 and SM–4. Accordingly, the sleeves of the three lines are connected to contacts of relay 821 by jumpers 761 to 763 of pin-terminal section 700.

When the initial-digit assigned the desired trunk group is dialed, ground potential from the digit-group wire DG–1 is extended to the battery-connected winding of trunk group relay 821 over jumper 888.

Relay 821 operates and at its make contacts 12 extend ground potential over jumper 889 to the P. B. X start relay 835 as described for a P. B. X call, and at its contacts 13 and jumper 886, ground the tens wire T–0 extending to the battery-connected winding of the auxiliary select magnet serving the tens group containing the called trunk group. Contacts 2 to 4 extend the sleeves of the trunks in the called group to wires C2 to C4.

P. B. X start relay 835 operates and as hereinbefore described operates the sleeve connect relay 837 and lock relay 838 to extend the trunk sleeves to sleeve test relays 841 to 850. As hereinbefore described the test relays associated with the sleeves of the idle trunks operate and lock.

Assuming the trunk assigned line 02 to be idle, test relay 842 operates and as hereinbefore described, an operate path is completed to the selected select magnet operate wire SM–2.

Select magnet SM–2 operates and as hereinbefore described operates the hold magnet associated with the calling connector.

Following the operation of the hold magnet associated with the calling connector, ground potential appears on the guard lead and is extended through make contacts 11 of trunk group relay 821 and jumper 887 to the switch-through conductor SW–THRU extending to the calling connector.

As will hereinafter be described, the calling connector is cut-through and the calling line is connected metallically to the selected trunk.

Responsive to the switch-through of the connector and the consequent opening of the chain circuit, all operated relays in sleeve test relays 800 are restored and returned to common use.

IVG2. *Tens-digit trunk calls*

It has been chosen to assign trunk group relay 822 for service in extending calls to trunks assigned line circuits and reached by the dialing of an assigned tens digit. Such assignment is with the restriction that none of the unused lines of the tens-group serving trunks selected by a tens digit can be used for subscriber numbers.

Assuming that the trunks in the trunk group reached by the dialing of a tens digit are in the ninth ten-line group, the sleeves of the trunks assigned thereto are connected to the contacts of relay 822 by jumpers on pin terminal section 700.

Assuming lines 96 to 98 are assigned trunks, jumpers 771 to 773 connect the sleeves thereof to contacts 6 to 8 of relay 822. At the same time, the battery-connected winding of the trunk group relay 822 is connected to tens digit wire T–9 by jumper 890 of jumper board 898; the switch-through wire SW–THRU is connected to make contacts 11 of assigned trunk group relay 822 by jumper 891; and contacts 12 are connected to ground by jumper 899.

When the tens digit assigned such trunk group is dialed, ground potential appears on the tens wire T–9 and is extended over jumper 890 to the battery-connected winding of trunk group relay 822. Trunk group relay 822 operates and over jumper 899 extends ground potential through make contacts 12 and 13 to the battery-connected winding of the P. B. X start relay 835 in the manner hereinbefore described.

The P. B. X start relay operates and operates the sleeve connect relay 837 and lock relay 838 thereby connecting the sleeves of the trunks in the called trunk group to the upper winding of the test relays associated with such trunks. The sleeves of the trunks are tested and the selected select magnet path is closed as hereinbefore described.

Following the operation of the select magnet and the operation of the associated hold magnet, ground appears on the guard wire and is extended through make contacts 11 of relay 822 and jumper 891 to the switch-through conductor SW–THRU extending to the associated connector circuit.

When the connector has "cut-through" responsive to the grounding of conductor SW–THRU, as will hereinafter be described, the chain relay therein is restored and ground is removed from the tens wire. The operated group relay 822 releases and restores all operated relays in the sleeve test relays 800. The sleeve test relays 800 are now in readiness for another call.

IVH. *Trunk assigned switch verticals*

As pointed out hereinbefore, an arrangement is provided whereby trunks may be assigned to switch verticals (V12 to V25) in lieu of the normal connectors. These trunks may be reached by dialing an initial digit or a tens digit with the hereinbefore noted restrictions. The operation of sleeve test relays 800 is responding to an initial-digit or a tens digit to extend connections to trunks assigned verticals will now be described.

When a call is made to a trunk group assigned to the verticals of the switch, sleeve test relays 800 identify the calling line so that when an idle trunk has been found, the calling line can be closed through directly to the trunk and the connector circuit released from the train.

IVH1. *Initial-digit trunk jumpering*

Assuming the trunk group assigned to verticals such as V12 to V25 to be selected by the dialing of an initial digit, the start conductor ST terminated on jumper board 898 is connected by jumper 895 to the single digit conductor DG–2 corresponding to initial digit 8 assigned that trunk group. At the same time, the hold-magnet operate leads associated with the verticals serving trunks are connected to contacts on the hold-magnet control relays 801 to 805 in order that they be called-in for test to determine their idle or busy condition.

Assuming the concerned trunk group is served by verticals V23 to V25 of switch 1, the hold magnet operate wires thereof are connected by jumpers 781, 782, and 783 to associated contacts on hold-magnet control relay 801 so that responsive to operation of relay 801, the hold magnet leads HM–OP–23 to HM–OP–25 are connected to the hold magnet leads HM–1 to HM–3 extending to the switching relay 600 over conductors in cable group 680.

At the same time, the idle-test jumpers IT–1 to IT–10 of Fig. 6 extending to the trunks assigned verticals are connected in correspondence with the hold magnet operate leads. For example, if the hold magnet operate wires HM–OP–23 to HM–OP–25 are connected to contacts 1 to 3 of relay 801, idle-test wires IT–1 to IT–3 are interconnected to the trunks assigned verticals V23 to V25. This is required so that the idle-test wires are associated with the same test relays (522 to 531) of Fig. 5 that the hold magnet wires HM–1 to HM–3 are associated with.

IVH2. *Tens-digit trunk jumpering*

Similarly, the hold magnet leads for trunk groups assigned verticals and called-in for test by the dialing of an assigned tens digit are jumpered in a like manner. Assuming that hold-magnet control relay 802 serves a tens-digit trunk group comprising trunks assigned verticals V23 to V25, jumpers 791 to 793 are interconnected so that responsive to the operation of hold-magnet control relay 802, these hold magnet operate leads will be connected to the corresponding ones of ten common hold magnet wires HM–1 to HM–10 extending to switching relays 600.

If the trunk group is to be selected by the dialing of a tens digit, the start wire ST of jumper board 898 is connected to a tens lead such as T–6 by jumper 894 so that responsive to the dialing of the tens digit 6, ground appears on such jumper and is extended to the start lead ST.

Start lead ST is illustrated as connected to both a tens digit wire and a single digit wire, but for actual operation, one or the other of jumpers 894 and 895 is omitted, the same as verticals V23 to V25 are reached by either a tens digit or an initial digit.

IVH3. *Initial-digit trunk call operation*

As will hereinafter be described with reference to connector 1100, responsive to the dialing of the initial digit 8 assigned trunks terminated on connector verticals, the transfer relay of connector 1100 operates and extends the sleeve conductors, US and LS, lock conductor IL and mark conductor MK of the originating vertical to sleeve test relays 800 over conductors in cable 1199 to give the control of the calling sleeve and the originating vertical to the sleeve test circuit. At the same time, ground appears on the digit wire DG–2 and is extended to jumper 895 to the start lead ST from whence it is extended to the battery-connected winding of the line-identifying start relay 833.

The line-identifying start relay 833 operates; its contacts 10 ground the mark ground conductor MK–GRD to extend ground potential to the connector circuit through the off-normal contacts on the operated hold magnet of the originating vertical to the mark lead MK–1 in cable group 884 extending to the battery-connected winding of the hold magnet control relay 801; its contacts 9 grounds conductor 873 extending to make contacts 13 of hold-magnet control relay 801; its contacts 3 ground the trunk group wire TRK–GRP extending to switching relays 600 over conductors in cable group 680 to operate the idle-test trunk group relay 641 of Fig. 6; and removes ground from the units-lock off-normal ground wire UL–ON–GRD to prevent the call from being extended in the normal manner; its makes contacts 1 ground the start-ground wire ST–GRD extending to allotter relays 500 to start the allotter into its hereinafter described operation to connect the idle-test leads (IT–1 to IT–3) of the trunks in the called group to the test relays of the allotter circuit; its contacts 5 prepares a locking circuit for the select-magnet select relay 831; its make contacts 7 extends battery potential from current-limiting resistor 872 to conductor 878 extending to one side of the upper winding of test relays 841 to 850; its break contacts 9 open-circuit the normal operate path of the select magnet; its make contacts 8 prepare an operate path for the sleeve control relay 832; its break contacts 6 open the operate path of lock relay 838; and its make contacts 4 connect the clearout relay 834 to the chain release conductor CH–RLSE.

If the calling line is associated with an upper horizontal the battery-potential from the cutoff relay of the calling line circuit is extended over the upper sleeve conductor US to the ground-connected winding of the select-magnet select relay 831. This operation is such that the holding ground of the cutoff relay is removed for only a fraction of a second for such test, in order to precent the restoration of the cutoff relay.

Relay 831 operates in series with the cutoff relay of the calling line; its make contacts 3 extend ground potential from break contacts 8 of sleeve cutoff relay 832 to maintain the cutoff relay operated from ground in the sleeve test relays 800; its make-first contacts 2 lock relay 831 operated to the ground potential at contacts 5 of the line-identifying start relay 833; and its contacts 1 connect the grounded trunk-group conductor TRK–GRP to the upper sleeve conductor US in cable group 883 extending to make contacts 11 of hold magnet control relays 801 to 805.

If the calling line is associated with a lower horizontal, the lower sleeve conductor LS is directly connected to ground at contacts 8 of relay 832 and relay 831 fails to operate. Under such circumstances, ground from contacts 3 of relay 833 remains on wire LS of cable 883.

Responsive to the ground appearing on the switch mark lead MK–1, hold magnet control relay 801 operates; its make contacts 11 extend the ground potential on the upper sleeve conductor US to the battery-connected winding of the sleeve call-in relay 811; its make contacts 13 extend the ground potential on conductor 873 to the control lead A extending to the battery-connected winding of the select magnet relay 621 (Fig. 6) associated with switch 1; and its contacts 1 to 10 extend the hold-magnet operate leads associated with jumpers 781, 782, and 783 from the concerned hold magnets to the associated hold magnet control wires HM–1 to HM–10.

Sleeve call-in relays 811 to 820 are associated with the sleeves of the one hundred lines associated with frame controller 1550. Relay 811 has access to the ten sleeves associated with the upper horizontals H–1U to H–10U of switch 1; relay 812 is associated with the sleeves of the ten lines associated with the lower horizontals H–1L to H–10L of switch 1; relay 813 with the sleeves of the upper horizontals of switch 2; and so forth.

Sleeve call-in relay 811 operates; its make contacts 12 ground the P. B. X–1 wire extending to the battery-connected winding of the P. B. X start relay 835; its make contacts 13 extend the ground on conductor 873 to the tens wire corresponding to the upper or lower auxiliary select magnet associated with the ten-line group in which the call originated; and at its contacts 1 to 10 connect the sleeves of the ten lines in such group to the sleeve common wires C–1 to C–10 extending to contacts of connect relay 837 over cable 875.

P. B. X start relay 835 operates and at its contacts 4, extends ground potential over conductor 880 to the battery-connected winding of connect relay 837 as described for a P. B. X call.

Connect relay 837 operates; its contacts 1 to 10 extend the called-in sleeves to the upper windings of the test relays; and its contacts 11 open the operate circuit of sleeve cutoff relay 832.

With the test relays having battery connected to one side of their windings from resistor 872 and the sleeve conductors of the called-in ten lines on the other side of the winding, only the test relays 841 to 850, with ground on the called-in sleeve, will operate indicating that such line is busy.

The test relays associated with busy lines operate and at their make contacts 2 lock operated through the associated one of break contacts 1 to 10 of cutoff relay 839 and the break contacts of unoperated lock relay 838. Contacts 3 of the operated test relays 841 to 850 remove ground potential from the battery-connected winding of connect relay 837, permitting it to restore.

Responsive to the restoration of connect relay 837, the ground potential on conductor 880 is extended through make contacts 3 of the highest-numbered operated sleeve test relay to conductor 881 from whence it is extended through contacts 11 of relay 837 to the battery-connected winding of sleeve-control relay 832.

Sleeve control relay 832 operates and locks operated through its make contacts 5 under control of contacts 3 of P. B. X start relay 835; its contacts 4 ground conductor 879 which is connected to one side of the lower winding of each of the sleeve test relays 841 to 850, and its break contacts 8 remove ground potential from the upper and lower sleeve conductors US–GRD and LS–GRD and substitutes battery-potential therefor through current-limiting resistor 870. At such time, the operated cutoff relays of the busy line circuits are held operated by the ground furnished to the sleeve conductor through the marginal lower winding of the operated test relays and their contacts 1. Battery potential through current-limiting resistor 870 and contacts 8 of relay 832 is in parallel with the line circuit cutoff relay of the calling line and furnishes sufficient battery to the test relay associated with the calling sleeve to maintain it operated through its lower winding. Make contacts 7 of relay 832 extend ground potential to the battery-connected winding of the cutoff relay 839.

Cutoff relay 839 operates and at its break contacts 1 to 10 open the locking circuit of all the sleeve test relays 841 to 850.

Under such conditions, the only test relay which can remain in an operated condition is the one which has the battery potential from current-limiting resistor 870 applied in parallel with the line circuit cutoff relay. This circuit includes grounded conductor 879, the marginal winding of the concerned test relay, make contacts 1 thereof, one of the common conductors C1 to C10, and contacts on relay 811 to the battery-connected cutoff relay of the calling line circuit, such cutoff relay being connected in parallel with resistor 870, as noted. Even though the calling subscriber would disconnect at such time, the test relay would release because the line circuit cutoff relay alone cannot furnish sufficient battery to hold the test relay operated.

All operated test relays restore except the one associated with the sleeve of the calling line.

Assuming test relay 841 to be held operated, ground from make contacts 6 of sleeve control relay 832 is extended through break contacts 5 of relays 842 to 850, through make contact 5 of operated test relay 841, through break contacts 13 of connect relay 837, conductor 882, and through make contacts 6 of the operated test relay 841 to the associated select magnet wire SM–1.

Referring now to Fig. 6, part 1, select magnet relay 621 operates from ground appearing on conductor A of cable group 680 as noted. Make contacts 1 of relay 631 extend the grounded select magnet wire SM–1 of cable group 680 to the associated select magnet of cable group SCG–1.

The select magnet associated with the horizontal serving the calling line operates and at its off-normal contacts extends ground potential on the secondary off-normal wire SON to the chain and allotting relays 500 over conductor SON of cable 884.

Responsive to the operation of line-identification start relay 833, trunk ground wire TRK–GRD was grounded and operates idle-test trunk relay 640 of Fig. 6 over conductor TRK–GRD of cable 680. Contacts thereon extend the idle-test wires IT–1 to IT–3 associated with the trunks assigned verticals to the upper winding of test relays 522 to 531 of Fig. 5.

At such time, the auxiliary select magnet associated with the calling line is operated from ground at contacts 13 of the operated sleeve call-in relay 811; the principal select magnet associated with the calling line is operated; the idle-test wires of the trunks assigned verticals are extended to the test relays of Fig. 5; the hold magnet wires associated with such trunks are extended to contacts 5 of such test relays; and ground is present on start ground wire ST–GRD from contacts 1 of line-identification start relay 833.

As hereinbefore described with reference to Fig. 5, the idle-test wires are tested and the hold magnet wire associated with the idle-test wire selected is grounded, and operates the hold magnet associated with the selected trunk. At such time two hold magnets are operated, the hold magnet associated with the originating vertical and the hold magnet of the selected trunk.

Responsive to the grounding of the chain release wire CH–RLSE by the allotter relays, ground is extended through make contacts 4 of the line-identifying start relay 833 to the battery-connected winding of clearout relay 834 of Fig. 8.

Clearout relay 834 operates and at its make contacts 3 extends a ground potential through make contacts 1 to 10 of the operated cutoff relay 839 to one side of the operated sleeve test relay shunting it and causing it to restore. At its contacts 1, relay 834 grounds the hold conductor HOLD extending to the sleeve call-in relays 811 to 820 maintaining relay 811 operated.

Break contacts 4 remove ground from the lock lead L–GRD to permit the hold magnet of the originating vertical to restore, thereby opening the tip conductor, ring conductor, upper and lower sleeve conductors and mark leads thereby releasing connector 1100.

Responsive to the openings of the sleeve conductors US and LS, the paralleled resistance 870 is disconnected from the sleeve conductor. However, at this time, the test relay remains operated due to its upper winding being energized from battery potential from current-limiting resistor 872 through contacts 7 of line-identifying start relay 833 and the ground potential from make contacts 3 of the clearout relay 834 and the concerned contacts 1 to 10 of operated cutoff relay 839.

Responsive to the restoration of the hold magnet associated with the vertical connecting the calling line, hold magnet control relay 801 restores and removes ground from the winding of the operated sleeve call-in relay. This sleeve relay remains operated from the ground appearing on the hold conductor. Contacts 13 of the now restored hold magnet control relay 801 remove ground from conductor A thereby permitting the select magnet relay 621 (Fig. 6) to restore.

At such time, with the sleeve test relay 841 being held operated, until ground appears on the sleeve conductor of the subscriber's line from the seized trunk circuit, the cutoff relays are held operated from ground through the lower winding of the operated test relay 841 to 850.

With the release of connector 1100, ground is removed from the winding of the line-identifying start relay 833 which restores and at its contacts 5 restores the select-magnet select relay 831. At contacts 1, relay 833 removes ground from the start ground lead ST–GRD extending to the allotter circuit, returning it to common use. With the restoration of the chain and allotting relays 500, ground is removed from the release ground wire RLSE-GRD, thereby restoring clearout relay 834.

Responsive to the restoration of clearout relay 834, ground is removed from the operated test relay; from the hold lead HOLD maintaining sleeve call-in relay 811 operated; and from the winding of sleeve control relay 832.

The concerned test relay, sleeve relay, and sleeve cutoff relay restore and ground is removed from the winding of cutoff relay 839. When cutoff relay 839 restores all relays are now returned to normal condition and a circuit is prepared for another call.

The connection from the calling line to the called trunk is now controlled by the last operated hold magnet while the connector circuit is restored for use by other calls.

IVH4. *Tens-digit trunk call operation*

If the trunks assigned connector verticals are reached by the dialing of a tens digit instead of an initial digit, the sleeve test relays are called into operation by the grounding of the tens wire, such as T-6, instead of by the grounding of the single digit wire DG-2.

Responsive to ground appearing or tens wire T-6, start relay 833 is operated from the extension of the tens digit ground over jumper 894, and the operation of sleeve test relays 800 is as described for an initial-digit trunk call.

When the chain and allotting relays 500 are called into operation by the grounding of the start ground wire ST-GRD, an all-trunk-busy condition permits the operation of the busy relay 517 as hereinbefore described if the connection is not extended in a predetermined time.

V. CONNECTOR 1000

(Fig. 10, parts 1 to 3)

As shown in Fig. 10, parts 1 to 3, connector 1000 includes test jack TJ, busy key BK, 17 relays, 1001 through 1017, condensers 1019 to 1021, resistor 1018, and four magnetic impulse counters SEQ, TR, UR, and SR.

VA. *Circuit functions of connector 1000*

Connector 1000 handles only locally-terminated calls which are received over its assigned trunk incoming from the preceding selector stage, such as selector switch 1500 as shown in Fig. 3. Connector 1000 performs the following principal circuit functions:

(1) Normally it supplies idle-indicating battery potential to the sleeve conductor of the attached trunk;

(2) Upon seizure it removes the idle-indicating battery potential and substitutes a holding potential therefore;

(3) It receives and stores three digits, two digits for transfer to the frame controller to control the extension of the connection to a desired line and one digit for controlling the ringing of the desired stations on such desired line;

(4) It temporarily seizes the chain circuit of its connector section, subject to such chain being idle, and thereafter guards the seized chain against seizure by any other connector in the same section;

(5) It transfers the two digits of stored digit information to the frame controller while it has the chain seized;

(6) Upon a signal that the called line is busy, it applies busy tone to the calling line, and frees the seized chain;

(7) When the called line is idle, it applies ringing tone to the calling line; signals the called line; and frees the seized chain;

(8) When the call is answered, it trips the ringing circuit; completes the talking connection; and reverses the current flow over the tip and ring conductors of the associated incoming trunk;

(9) It supplies transmitter current to both lines;

(10) Upon disconnect by the calling and called lines, it clears out and releases the entire connection by removing holding ground from the sleeve conductor;

(11) It provides reverting call service; and

(12) Provides call discrimination between a local call and an operator-originated call.

VB. *Relay functions of local connector 1000*

The 17 relays (1001 to 1017) of connector 1000 have principal functions assigned thereto as follows:

Relay 1001 (Reverting Call) operates responsive to a signal over conductor RC from the frame controller on reverting calls to cause ringing current to be transmitted over the calling line;

Relay 1002 (Switching) operates responsive to a signal over conductor CT from the frame controller on calls to trunks assigned line circuits to cut the tip and ring conductors of the calling line through metallically to the trunk line;

Relay 1003 (Reverse Battery) operates responsive to called party answer to reverse the incoming tip and ring conductors to provide any desired supervisory function;

Relay 1004 (Line) supplies transmitter current to the calling line; operates when the connector is seized, and restores thereafter under control of the calling device or hookswitch whenever the calling line loop is opened;

Relay 1005 (Back Bridge) operates over the called line when the call is answered to operate the reverse battery relay and supplies transmitter current to the called line;

Relay 1006 (Ring-Cutoff) is operated by the ring trip relay when the called line answers to disconnect the called line from the ringing current supply and to close the talking circuit;

Relay 1007 (Code) is operated to place the proper ringing code on the called line for party-line ringing;

Relay 1008 (Ring-Trip) is slow-operating by virtue of a copper collar surrounding the armature end of its core and is operated by the direct-current flow in the ringing circuit when the call is answered;

Relay 1009 (Ring-Reverse) operates when the station digit dialed is greater than 5 to cause ringing current to be applied to the other side of the line for divided ringing;

Relay 1010 (Release) is slow-restoring by virtue of a copper sleeve under its winding; is operated by the line relay; remains operated during the pulsing, but releases when the line relay remains restored for a substantial fraction of a second;

Relay 1011 (Series) is operated by a line relay, is slow-restoring by virtue of a copper sleeve under its winding; and remains operated during pulsing but restores when the line relay remains operated for a substantial fraction of a second;

Relay 1012 (Series-Auxiliary) is operated by the series relay and aids in the performance of the functions of such relay;

Relay 1013 (Discriminating) is operated when the connector is taken for use by a locally originated call;

Relay 1014 (Discriminating-Auxiliary) is operated by the local discriminating relay to aid in the performance of the functions of the discriminating relay;

Relay 1015 (Busy) is operated if the calling line is busy to supply busy tone signals to the calling line;

Relay 1016 (Chain) is operated following the dialing of the stations digit; seizes the chain of the local connector section for the exclusive use of this connector, subject to the chain being idle; and Relay 1017 (Code Control) operates when any counter is operated to control the code relay in providing the proper ringing code.

VC. *Impulse counter functions of connector 1000*

The four impulse counters, the sequence counter SEQ, the tens register TR, the units register UR, and the stations register SR of connector 1000 have principal functions assigned thereto as follows:

Impulse counter SEQ (Sequence Counter) operates at the end of each digit series of impulses to distribute such series to registers TR, UR, and SR;

Impulse counter TR (Tens Register) registers the number of impulses in the tens digit;

Impulses counter UR (Units Register) registers the number of impulses in the units digit; and Impulse counter SR (Stations Register) registers the number of digits in the stations digit.

Sequence device SEQ, which actuates its contact sets 1A and 1B on receipt of the first operating pulse, disconnects resistor 1018 as a sleeve guarding measure and completes an operate circuit for the code control relay 1017.

VD. *Detailed operation*

A detailed operation of connector 1000 will now be given with reference to Fig. 10, parts 1 to 3.

VD1. *Seizure*

Connector 1000 is seized by the closure of the calling line loop across the tip and ring conductors when the preceding equipment finds battery potential on the sleeve conductor from the idle-test conductor IT extending to current-limiting resistor 1018. This closed loop is extended to the battery and ground connected windings of line relay 1004 through break contacts 1 and 2 of the reverse-battery relay 1003 and break contacts 4 and 5 of reverting call relay 1001, or break contacts 5 and 6 of switching relay 1002.

Line relay 1004 operates and at its make contacts ground wire 1037 extending to the battery-connected winding of release relay 1010.

Release relay 1010 operates and at its contacts 6 remove the idle-indicating battery potential from the sleeve conductor; its make contacts 3 extend the ground potential at break contacts 1 of the discriminating auxiliary relay 1014 through the winding of local discriminating relay 1013 to the sleeve conductor; its make contacts 2 ground wire 1046 in preparation for operating the associated chain relay on the completion of the dialing of the stations digit when the chain circuit is idle; its contacts 1 extends the ground potential from break contacts 3 of reverting call relay 1001 to the lock lead L extending to the associated hold magnet off-normal contacts of the associated switch; its make contacts 4 connect pulsing wire 1038 to wires 1034 and 1035 in preparation for delivering stepping impulses through the contacts of the sequence device to the respective registers; its break contacts 5 open the operate path of the code-control relay; its make contacts 7 ground conductor 1030; and its contacts 8 ground machine-start wire MS to start the tone and timing apparatus into operation if they are not operating.

If the call were originated by an operator, ground potential from the operator equipment is projected forward on the sleeve conductor, thereby shunting relay 1013, preventing its operation.

If the call is originated by a local line, battery potential from the cutoff relay of the calling line circuit operates relay 1013.

Contacts on discriminating relay 1013 operate auxiliary relay 1014 which locks operated at its contacts 2. Contacts 1 of relay 1014 transfer the sleeve conductor S to ground at contacts 3 of chain relay 1016 through break contacts 6 of relay 1001, thereby shunting relay 1013, permitting it to restore.

Since the seizure of connector 1000 is accomplished during the interdigit period following the dialing of the hundreds digit selecting the connector group, as described in the noted Hutton et al. case, the tens, units and stations digits of the directory number are immediately dialed in succession.

VD2. *Tens registration*

Each time the calling device (not shown) is operated to transmit a series of circuit interruption impulses constituting the tens, units, and stations digits, line relay 1004 is restored momentarily for each such interruption-impulse in a series, comprising 1 to 10 impulses, depending upon the digit dialed.

Release relay 1010 remains operated throughout any series of impulse-induced restorations of line relay 1004, it being slow-restoring because of the copper sleeve under its winding.

Series relay 1011 operates promptly upon the first restoration of line relay 1004, its operate circuit being from ground at the back contacts of line relay 1004, conductor 1038, conductor 1034, break contacts 9 of reverting-call relay 1001, conductor 1035, break contacts 3 on the sequence device SEQ, conductor 1032, and break contacts 2 of series auxiliary relay 1012 to its battery-connected winding. Upon operating, series relay 1011 locks independent of the series auxiliary relay 1012 and at its make contacts 1 closes an operate circuit for the battery-connected winding of the series auxiliary relay 1012 and removes ground from conductor 1046.

Series auxiliary relay 1012 operates and at its break contacts 2 opens the initial operate circuit of the series relay 1011 and at its contacts 1 prepares an operate circuit for advancing sequence counter SEQ.

With release relay 1010 maintained continuously operated, each restoration of line relay 1004 delivers an impulse at its break contacts to pulse wire 1038 extending to break contacts 3 of sequence counter SEQ as noted. These ground impulses constituting the tens digit are further extended to the battery-connected operate winding of the tens register TR through break contacts 1B of register SEQ. The contact sets 1 to 10 of register TR are actuated successively, responsive respectively to the impulses constituting the tens digit.

When line relay 1004 comes to rest, operated, at the end of any digit series of impulses, series relay 1011 restores after a slight delay and opens the operate circuit of series auxiliary relay 1012 which restores sequentially a short time later. At such time when series relay 1011 is restored and series auxiliary relay 1012 is yet operated, the ground from make contacts 2 of release relay 1010 is transmitted over wire 1047 to the battery-connected operate winding of the sequence device SEQ, thereby delivering a stepping impulse to such winding.

This stepping impulse which is delivered to counter SEQ at the end of the receipt of the registration of the tens digit causes both its contact sets 1A and 1B to shift to their alternate positions.

Make contacts 1A ground wire 1044; break contacts 1A disconnect idle-indicating battery supply resistor 1018 from the idle test wire IT to prevent the reapplication of idle-indicating battery potential to the incoming sleeve conductor of the connector in the event that release relay 1010 restores before sequence counter SEQ is cleared out; break contacts 1B disconnect pulsing wire 1035 from the battery-connected operate winding of the first tens register TR; and make contacts 1B transfer pulsing wire 1035 through break contacts 2 to the battery-connected operate winding of the units register UR.

VD3. *Units digit registration*

Responsive to the dialing of the units digit of the dialed directory number, a series of circuit-interruption impulses are transmitted over pulsing wire 1032 as hereinbefore described and are extended through break contacts 2 and make contacts 1B of sequence counter SEQ to the battery-connected operate winding of units register UR. At the same time, these circuit interruption impulses are transmitted to relays 1011 and 1012 as hereinbefore described. The contact sets 1 to 10 of register UR are actuated successively, responsive respectively to the impulses constituting the units digit.

When line relay 1004 comes to rest, operated at the end of the dialing of the units digit, series relay 1011 restores after a slight delay and thereafter restores series auxiliary relay 1012, as hereinbefore noted. A second stepping impulse is thereupon delivered to the winding of the sequence device SEQ over wire 1047 causing it to shift its contact set 2 to its alternate position which opens the operate circuit of the units register UR and transfers the pulsing wire 1035 through make contacts 2 to the operate winding of the stations register SR.

VD4. *Station digit registration*

Responsive to the restoration and reoperation of the line relay 1004 according to the impulses of the stations digit, ground impulses are transmitted over wire 1035 and through make contacts 2 of sequence device SEQ to the battery-connected operate winding of the stations digit register SR. At the same time, as hereinbefore noted relays 1011 and 1012 operate sequentially in preparation for advancing the sequence counter on the termination of such dialing.

The contact sets 1 to 10 of register SR are actuated successively, responsive respectively to the impulses constituting the stations digit.

If the stations digit comprises from 6 to 10 impulses, ground potential from make contacts 4 of series auxiliary relay 1012, such relay being operated during dialing, is extended to wire 1051 from whence it is extended through the make contacts 6 and break contacts 7 of the stations register SR to wire 1052. This ground is further extended through break contacts 6 of ring-reverse relay 1009 to its battery-connected winding, operating it. Ring-reverse relay 1009 locks operated through its make first contacts 3 to the grounded wire 1030, so that when ringing current is placed on a calling line, the party on the ring side of the line will be signaled instead of the party on the tip side of the line, such operation being described hereinafter.

When line relay 1004 comes to rest, operated at the end of the dialing of the stations digit, series relay 1011 restores followed by the restoration of series auxiliary relay 1012, thereby delivering a ground pulse on wire 1047 to the sequence device SEQ causing it to actuate its contact sets 3. Break contact 3 disconnets the pulsing wire 1035 from the battery-connected operate winding of the stations register SR and at its make contacts 3 connects wire 1046 to wire 1047 extending to the winding of the chain relay 1016. This circuit is as follows:

With release relay 1010 operated, its contacts 2 extend ground potential through break contacts 1 of series relay 1011 and series auxiliary relay 1012 to wire 1046 from whence it is extended through make contacts 3 of sequence device SEQ to wire 1047, through break contacts 2 of the busy relay 1015, break contacts 10 of switching relay 1002, break contacts 10 of reverting call relay 1001, to the one side of the winding of the chain relay. The other side of chain relay 1016 is connected through break contacts 4 thereof to the chain-end conductor, which as hereinbefore described with reference to the chain and allotting relays 500, has battery potential thereon from current-limiting resistor 534 provided such circuit is idle.

If the battery-supply circuit is complete to the chain-end wire extending to one side of the winding of the chain relay 1016, chain relay 1016 operates. The chain-end conductors of the odd-numbered connectors are connected together and the chain-end conductors of the even-numbered connectors are connected together and each extend to the associated chain group relays in chain and allotting relays 500. This operate path of relay 1006 includes the chain-end conductor and the closed chain controlled by the gate relay in chain and allotting relays, The chain-out conductor of each connector is conneted to the chain-in conductor of the next succeeding connector while the chain-out conductor of the last connector in the associated odd or even group is connected to the chain-in conductor of the first connector. This interconnection of such conductors is indicated in Fig. 10, part 2, by dotted lines representing the other connectors in the same section. In this manner, operation of the chain relay of any connector precludes the operation of any other chain relay of other connectors in the same section, and as hereinbefore described with reference to the chain and allotting relays 500 precludes the operation of any other group (odd or even) of connectors.

Responsive to the operation of chain relay 1016, it locks operated through its make contacts 4 to the chain-in conductor CH–IN independent of the chain-end conductor CH–END thereby preventing any other connector in the same group from taking the common equipment for use.

Contacts 3 of chain relay 1016 transfer the calling sleeve conductor to the sleeve test relays 800 over cable 1099; contacts 1 connect the called sleeve to the sleeve test relays 800 for determining its busy or idle condition, as previously described; contacts 2 extend the guard wire G to the sleeve test relays to serve as an indication that the hold magnet associated with the calling connector has operated; contacts 6 connect the busy wire BU to the common equipment in the event the called line is busy; contacts 9 to 11 extend respective conductors SON, CT, and RC to controller 1550; and contacts 7 and 8 ground respective conductors 1048 and 1049 extending to counters TR and SR.

The ground on wires 1048 and 1049 is extended through contacts on registers TR and UR to ground the selected ones of the digit wires T1 to T10 and U1 to U10.

As hereinbefore described, with reference to Fig. 8, the grounded tens and units wires operate the concerned auxiliary select magnet and principal select magnet associated with the calling line.

Off-normal contacts on the principal select magnet ground wire SON of cable 1099 to ground the hold-magnet operate wire HM–OP through contacts 9 of chain relay 1016. This ground operates the hold magnet associated with calling connector 1000 which locks through its off-normal contacts 1 (Fig. 9) to the grounded lock conductor L and its contacts 2 ground guard wire G.

Responsive to the operation of the hold magnet associated with calling connector 1000, the tip, ring, and sleeve conductors T, R, and S are connected to connector circuit 1000. At such time the calling and called sleeves are both extended to the sleeve test relays 800 over respective conductors in cable 1099.

VD5. *Called line tests busy*

Assuming that the called line is busy, the sleeve conductor of the called line has ground potential thereon and this ground appears on the sleeve conductor S from whence it is extended through make contacts 1 of the operated chain relay 1016 to the sleeve test relays 800 over the called sleeve conductor.

As hereinbefore described with reference to the sleeve test relays 800, the appearance on ground of the called sleeve causes the busy conductor BU, extending to the battery-connected winding of the busy relay 1015 through make contacts 6 of chain relay 1016 and break contacts 6 of ring cutoff relay 1006, to be grounded.

Busy relay 1015 operates and locks through its make contacts 1 to grounded conductor 1030. Break contacts 2 of busy relay 1015 open the chain circuit thereby restoring chain relay 1016 and at its make break contacts 3 apply busy tone from terminal BT through break contacts 2 of code relay 1007, and the small-capacity tone-coupling condenser 1021 to the tip conductor of the called line.

Responsive to the receipt of busy tone, the calling subscriber disconnects and connector 1000 and preceding apparatus is restored to normal.

VD6. *Called line idle*

As described hereinbefore, if the called line is idle, sleeve test relays 800 ground the cut-through conductor CT of cable 1099. This ground is extended through make contacts 10 of operated chain relay 1016 to the battery-connected winding of switching relay 1002.

Switching relay 1002 operates and locks operated at its make contacts 9 to grounded conductor 1030. Make contacts 3 of relay 1002 ground the sleeve conductor of the called line to operate the cutoff relay thereof to prevent answer by the called line from causing line-finding action to take place; contacts 1 and 2 together with make contact 4 connect the tip and ring conductors of the called line to the generator trip-battery and ground; make contacts 7 connect the pickup lead PU to wire 1043 extending to the battery-connected winding of code-control relay 1017; and contacts 9 opens the operate circuit of the chain relay 1016.

Chain relay 1016 restores and at its contacts 7 and 8 removes ground from the tens and the units wires thereby restoring the principal and auxiliary operated select magnets of the associated switch, and at its contacts 4 and 5 complete the chain circuit to other connectors in the same section by freeing the common control apparatus for use in extending other calls.

When ground potential appears on the pickup lead PU, such ground originating at common timing apparatus (not shown) which places ground on wire PU at regular intervals, code-control relay 1017 operates and locks through its contacts 4. Contacts 2 and 3 connect code-1 and code-2 conductors to the battery-connected winding of code relay 1007 through break contacts 4 of ring cutoff relay 1006 and make or break contact 3 of ring-reverse relay 1009, depending upon the station digit dialed, as before noted.

When ground potential appears on the code-1 and code-2 leads from the common timing circuit, code relay 1007 operates and restores according to such codes.

Assuming the dialed stations digit was less than 5, relay 1009 is restored and responsive to the operation of code relay 1007, its contacts 1 connects ring-trip relay 1008 in circuit with ringing current as follows:

From the selected one of the generator leads GEN–1 to GEN–5, break and make contacts of the selected one of the armatures of stations registers SR, wire 1083, make contacts 1 of code relay 1007, the winding of the ring-trip relay 1008, break contacts 2 of ring cutoff relay 1006, contacts 2 of ring-reverse relay 1009, make contacts 2 of switching relay 1002, the ring conductor of the called line, the tip conductor of the called line, contacts 1 of switching relay 1002, contacts 1 of ring-reverse relay 1009, break contacts 1 of ring cutoff relay 1006, and make contacts 4 of switching relay 1002 to trip-battery conductor TRIP–BATT.

If ring reverse relay 1009 is operated, generator current would be sent out over the tip conductor and return over the ring conductor.

Code relay 1007 responds to the ground appearing on the code wires by transmitting pulses of the selected generator current in accordance therewith, thereby signalling the called party with coded generator current.

VD7. *Called line answers*

Ring-trip relay 1008, whose winding is included in the ringing circuit does not operate before the call is answered for each ringer on the called line has the usual condenser in series with the ringer to block direct current flow and because the shading collar surrounding the armature end of the core keeps it from responding to the alternating ringing current.

In order to permit ring-trip relay 1008 to be operated by direct-current flow during the application of ringing current (if the call is then answered) battery potential from the trip battery is extended to ground potential through the winding of the ring-trip relay.

When the call is answered at the called station on the called line, the closure of the usual talking bridge across the called line causes direct-current flow thereover from the generator lead GEN–1 to GEN–5 in use to trip-battery appearing on make contacts 4 of the operated switching relay 1002, operates ring-trip relay 1008. Relay 1008 closes its make contacts to extend ground potential from grounded conductor 1036 to the battery-connected winding of the ring-cutoff relay 1006.

Ring-cutoff relay 1006 operates and locks operated at its make contacts 5 independent of the ring-trip relay 1008, which restores a short time later responsive to the opening of its operate circuit at break contacts 1 and 2 of relay 1006 which removes ringing current from the calling line. Break contacts 4 of relay 1006 open the operate circuit of the code relay 1007; its break contacts 6 opens the operate circuit of busy relay 1015; and its contacts 1 and 2 transfer the tip and ring conductors of the called line from the ringing current and completes the talking bridge across the battery and ground connected windings of back-bridge relay 1005, supplying transmitter current to the called line.

The transmitter current flow through the winding of relay 1005 causes it to operate. At its make contacts, relay 1005 extends the ground on conductor 1030 to the battery-connected winding of reverse-battery relay 1003.

If code relay 1007 is restored at such time the called party answers, the current through ring-trip relay 1008 is from ground at break contacts 1 of code relay 1007 over the hereinbefore traced circuit to the trip battery at make contacts 4 of switching relay 1002.

VD–8. *Answered supervision*

Reverse battery relay 1003 operates and at its contacts 1 and 2 reverse the tip and ring conductors of the calling line to perform any required supervisory function. The called party may now converse with the calling party.

During conversation the following relays of connector 1000 are operated:

(1) Switching relay 1002
(2) Reverse-battery relay 1003
(3) Line relay 1004
(4) Back-bridge relay 1005
(5) Ring cutoff relay 1006
(6) Ring reverse relay 1009 (depending upon the stations digit dialed)
(7) Release relay 1010
(8) Discriminating auxiliary relay 1014 (provided the call is a local call)
(9) Code control relay 1017

Additionally, the four counters SEQ, TR, UR and SR are maintained operated by residual magnetism.

VD9. *Clearout*

Responsive to disconnect by the calling party, connector 1000 is cleared out.

The opening of the line loop across the tip and ring conductors restores line relay 1004 which restores release relay 1010. Responsive to the restoration of the release relay 1010, its make contacts 7 remove the ground from conductor 1030, thereby restoring switching relay 1002, reverse battery relay 1003, ring-reverse relay 1009, and the discriminating-auxiliary relay 1014. A short time thereafter, the ring cutoff relay 1006 restores and restores back-bridge relay 1005. At such time, all relays are restored except code control relay 1017 which is held operated from contacts 1 of the operated counters.

Responsive to the restoration of release relay 1010, its break contacts 4 extends the ground potential on conductor 1038 to conductor 1039 and through make contacts 1 of code-control relay 1017 to battery through the series-connected release windings of counters SEQ to SR. The magnetic flux generated by the current flow through the release winding of each counter is in opposition to the residual magnetism and each operated counter restores.

Responsive to the restoration of each of the magnetic impulse counters, the operate and locking circuit of code control relay 1017 is opened, restoring it. With the restoration of code control relay 1017, the current-limiting resistor 1018 is again connected to the idle test wire IT, preparing the connector for use on another call.

VE. *Reverting call operation*

If the call is a reverting call, that is a call to the line originating the call, the called sleeve upon being tested is found busy, it being the calling sleeve.

As hereinbefore pointed out with reference to sleeve test relays 800, responsive to finding a busy condition on the called sleeve, further tests are made to determine whether the call is a reverting call.

When such determination is made on a reverting call, sleeve test relays 800 ground the revertive call conductor RC of cable 1099 instead on conductor CT.

Ground appearing on the RC wire is extended through make contacts 11 of the operated chain relay 1016 to the battery-connected winding of reverting-call relay 1001.

Relay 1001 operates and locks to conductor 1031 through make contacts 7. Conductor 1031 is grounded at contacts 3 of relay 1014.

Contacts 1 and 2 of relay 1001 extend the generator leads and trip battery to make contacts 5 and 6 of unoperated switch relay 1002; contacts 3 remove ground from the lock lead L permitting the operated hold magnet to restore; contacts 4 and 5 partially open the operate path of line relay 1004; contacts 6 partially open the sleeve conductor S from ground through contacts on the chain relay and the calling sleeve conductor extending to sleeve test relays 800; contacts 8 lock release relay 1010 operated; contacts 9 transfer pulsing wire 1034 to the battery connected winding of switching relay 1002; contacts 10 open the chain circuit; and contacts 11 apply reverting-call ring tone from terminal RCT to the tip conductor of the calling line through tone-coupling condenser 1021.

Upon receiving the reverting call tone, the calling subscriber replaces his receiver and waits for ringing to start on his line.

Line relay 1004 restores responsive to the opening of the line loop by the calling line disconnect and at its break contacts ground conductor 1038 extending to the battery-connected winding of switching relay 1002 over conductor 1034, contacts 4 of operated relay 1010, and contacts 8 of relay 1001.

Switching relay 1002 operates. Its contacts 3 ground the calling sleeve conductor S to hold the connection intact; its contacts 4, 5 and 6 complete the ringing circuit to the calling line; contacts 7 complete an operate circuit for the code-control relay 1017; its contacts 8 prepare a locking circuit for ring cutoff relay 1006; its contacts 9 lock it operated to grounded wire 1030; and its contacts 10 open the circuit of chain relay 1016.

At such time, relays 1001, 1002, (1009), 1010, and 1014 are operated and ringing current is applied to the tip and ring conductors of the called line in the manner previously described, the ringing circuit now including make contacts 5 and 6 of switching relay 1002.

Responsive to answer by the called line, ring-cutoff relay 1006 operates and opens the locking circuit of relay 1010.

Release relay 1010 restores and removes ground from wire 1030, permitting relays 1001 and 1002 to restore. The connector is then cleared out as hereinbefore described.

When connector 1000 is released, the answering line is placed in a lockout condition with transmitter current being supplied from the line relay of the three-relay line circuit (not shown).

When the calling line fails to hear the called party ringing current, he removes his receiver and may converse with the called party, both being on the same line.

Connector 1000 is provided with a busy key BK and a test jack TJ. Operation of the busy key removes the idle-test battery potential from the idle-test wire IT, rendering connector 1000 busy to all calls directed thereto. Insertion of a test conductor in test jack TJ permits monitoring of the connection or any desired test operation.

VI. CONNECTOR 1100 (Fig. 11, parts 1 to 3)

Referring now to Fig. 11, parts 1 to 3, connector 1100 shown therein will be described in detail.

Connector 110 includes a test jack TJ, busy key BK, 18 relays 1101 to 1118, condensers 119 to 121, and magnetic impulse counters SEQ, IDR, TR, and UR.

VIA. *Relay functions of connector 1100*

The eighteen relays (1101 to 1118) have principal functions assigned thereto as follows:

Relay 1101 (Switch-through) operates on calls to trunks assigned line circuits to cut the tip and ring conductors of the calling line through metallically to the tip and ring conductors of the line circuit assigned the called trunk;

Relay 1102 (Reverse-battery) operates responsive to called party answer and reverses the incoming tip and ring conductors to provide any desired supervisory function;

Relay 1103 (Line) supplies transmitter current to the calling line; operates when the connector circuit is seized; and restores thereafter under control of the calling device whenever the calling line lop is opened;

Relay 1104 (Differential) operates when the executive-right-of-way key of certain subsets is depressed to permit special features;

Relay 1105 (Back-bridge) operates over the called line when the call is answered to operate the reverse-battery relay and to supply transmitter current to the called line;

Relay 1106 (Differential-auxiliary) operates from control from the differential relay to aid in the performance of its functions;

Relay 1107 (Release) is slow-releasing by virtue of a copper sleeve under its winding; it is operated by the line relay and remains operated during pulsing but restores when the line relay remains restored for a substantial fraction of a second;

Relay 1108 (Ring-cutoff) operates when the called line answers to disconnect the called line from the ringing current supply and to close the talking circuit;

Relay 1109 (Ring-trip) is slow-operating by virtue of a copper collar surrounding the armature end of its core and is operated by the direct current flow over the ringing circuit when the call is answered;

Relay 1110 (Busy) is operated if the called line or trunk is busy to apply busy tone signal to the calling line;

Relay 1111 (Cut-through) operates when the called line is idle to partially cut-through the tip and ring conductors of the calling line to the tip and ring conductors of the called line;

Relay 1112 (Transfer) is operated on calls to trunks assigned verticals to place the conductors of the originating vertical under control of the sleeve test relays 800.

Relay 1113 (Chain) is operated following the dialing of the units digit to seize the chain of the local connector section for the exclusive use of this connector subject to such chain being idle;

Relay 1114 (Chain-auxiliary) is operated by the chain relay to aid in the performance of its functions;

Relay 1115 (Restricted Service) operates when the calling line is one restricted from certain trunk levels to prevent access thereto;

Relay 1116 (Series) is operated by the line relay; is slow-restoring by virtue of a copper sleeve under its winding; and it remains operated during pulsing but restores when the line relay is held operated for a substantial fraction of a second;

Relay 1117 (Series auxiliary) is operated by the series relay and aids in the performance of its functions; and Relay 1118 (Off-normal) is operated when any of the counters are operated and remains operated until all counters are restored.

VIB. *Impulse counter functions of connector 1100*

The four impulse counters, the sequence counter SEQ, the initial digit register IDR, the tens register TR and the units register UR of connector 1100 have principal functions assigned thereto as follows:

Impulse counter SEQ (Sequence Counter) operates at the end of each digit series of impulses to distribute such series of impulses to registers IDR, TR and UR.

Impulse counter ID (Initial Digit) registers the value of the initial digit dialed;

Impulse counter TR (Tens Register) registers the number of impulses in the tens digit; and Impulse counter UR (Units Register) registers the number of impulses in the units digit.

VIC. *Detailed operation*

A detailed operation of connector 1100 will now be given with reference to Fig. 11, parts 1 to 3.

VIC1. *Seizure*

As hereinbefore pointed out, before connector 1100 is taken for use, frame controller 1550 tests the idle-test conductor IT for battery potential. If connector 1100 is idle, the battery potential from the lower winding of restricted service relay 1115 is present on idle test conductor IT through break contacts 2 of relay 1118, contacts 3 of relay 1107, contacts 2 of relay 1105, contacts 6 of relay 1101 and contacts on busy key BK. Upon being found idle, connector 1100 is seized by the appearance of pre-operate battery potential on the tip conductor T of the calling line. This pre-operate battery is extended over the tip conductor T, through break contacts 1 of relays 1101 and 1102 and through the shunting contacts 1 of busy relay 1110 to ground through the upper winding of line relay 1103.

Line relay 1103 operates and at its make contacts extends ground potential from break contacts 5 of switch-through relay 1101 to wire 1137 extending to the battery-connected winding of the release relay 1107.

Release relay 1107 operates and at its make contacts 6 grounds conductor 1155 extending to the upper and lower sleeve conductors LS and US; at its make contacts 7 extends ground potential to the incoming lock wire IL; at its make contacts 8 furnishes dial tone to the calling subscriber through break contacts 3 of off-normal relay 1118, break contacts 5 of busy relay 1110, ring-cutoff relay 1108 and through the small-capacity tone-coupling condenser 1121; its break contacts 3 open the idle-test battery supply from the restricted service relay 1115; its make contacts 2 complete a circuit for connecting pulsing wire 1138 to wire 1122 in preparation for receiving the impulses of the dialed digits; and its make contacts 1 ground the lock wire L extending to the associated switch vertical in preparation for locking operated the concerned hold magnet thereon.

Subscribers which are restricted from reaching predetermined trunk levels place ground potential on the idle-test wire IT. This ground potential is extended through the break contacts of busy key BK; break contacts 6 of switch-through relay 1101, break contacts 2 of back-bridge relay 1105, break contacts 3 of release relay 1107, wire 1133, and break contacts 2 of off-normal relay 1118 to the battery-connected winding of restricted service relay 1115.

Restricted service relay 1115 operates and locks operated at its contacts 1, and at its contacts 2 transfer wire 1152 from the initial digit wire DG–3 in order to prevent the restricted line from making a call to restricted trunk level 9.

The ground appearing on the upper and lower sleeve conductors LS and US maintain the preceding connection intact.

Responsive to the receipt of dial tone, the calling subscriber dials the directory number of the desired line by dialing an initial digit (such as "2") indexing the call as a local call instead of a trunk call, and thereafter dials the tens and units digits.

VIC2. *Initial digit registration*

Each time the calling device (not shown) is operated to transmit a series of circuit interruption impulses constituting the initial digit, tens digit, and units digit, line relay 1103 is restored momentarily for each such interruption impulse in a series, comprising from 1 to 10 impulses, depending upon the digit dialed.

Release relay 1107 remains operated throughout any series of impulse-induced restoration of line relay 1103 for reasons hereinbefore pointed out.

Series relay 1116 operates promptly upon the first restoration of line relay 1103, its operate circuit being from break contacts 5 of switch-through relay 1101, break contacts of line relay 1103, break contacts 3 of reverse-battery relay 1102, wire 1138, make contacts 2 of release relay 1107, break contacts 1 of transfer relay 1112, wire 1122, and break contacts 1 of series auxiliary relay 1117 to the battery-connected winding of series relay 1116. Upon operating, series relay 1116 at its make contacts 2 completes an operate circuit for the battery-connected winding of series auxiliary relay 1117, from grounded conductor 1154, break contacts 3 of busy relay 1110, break contacts 7 of cut-through relay 1111, and conductors 1133 and 1135.

Series auxiliary relay 1117 operates and at its make contacts 2, prepares an operate circuit for sequence counter SEQ.

With release relay 1107 maintained continuously operated, each restoration of line relay 1103 delivers a ground impulse at its break contacts to pulse wire 1138 and 1122 as noted to operate relays 1116 and 1117. These ground impulses are further transmitted to the operate winding of the initial digit register IDR through break contacts 1B of sequence counter SEQ. The contact sets 1 to 10 of register IDR are actuated successively, responsive respectively to impulses constituting the initial digit.

When line relay 1103 comes to rest, operated, at the end of any digit series of impulses, series relay 1116 restores after a slight delay and opens the operate circuit of series auxiliary relay 1117 which restores sequentially a short time later. At such time when series relay 1116 is restored and series auxiliary relay 1117 is yet operated, the ground appearing on wire 1135 is extended through break contacts 2 of relay 1116 and make contacts 2 of series auxiliary relay 1117 to the battery-connected operate winding of sequence counter SEQ, thereby delivering a stepping impulse thereto.

This stepping impulse which is delivered to sequence counter SEQ at the end of the receipt and registration of the initial digit causes both its contact sets 1A and 1B to shift to their alternate positions. Make contacts 1A closes an operate circuit for off-normal relay 1118; its breaks contacts 1B disconnects the incoming pulse wire 1122 from the operate winding of the initial digit register IDR; and its make contacts 1B transfer the pulsing wire to the operate winding of the tens register TR through the break contacts 2 of the sequence counter SEQ.

VIC3. *Tens digit registration*

Responsive to the dialing of the tens digit of the called directory number, providing the initial digit dialed is one indexing the local exchange, a series of circuit-interruption impulses are transmitted over pulsing wire 1122 and are extended through break contacts 2 and make contacts 1B of sequence counter SEQ to the battery-connected operate winding of tens register TR. At the same time, the circuit interruption impulses are transmitted to the battery-connected winding of the series relay 1116 which operates and operates its auxiliary relay 1117 as hereinbefore noted. The contact sets 1 to 10 of the tens register TR are actuated successively responsive respectfully to the impulses constituting the tens digit.

When line relay 1103 comes to rest, operated, at the end of the dialing of the tens digit, series relay 1116 restores after a slight delay and thereafter restores series auxiliary relay 1117, as noted. A second stepping impulse is thereupon delivered to the winding of the sequence counter SEQ from the ground on conductor 1135 causing it to shift its contact set 2 to its alternate position, which opens the operate circuit of the tens register TR and transfers the pulsing wire to the battery-connected operate winding of the units register UR through make contacts 2 and break contacts 3 of sequence counter SEQ.

VIC4. *Units digit registration*

Responsive to the restoration and reoperation of the line relay according to the impulses of the units digit, ground impulses are transmitted over pulse wire 1122 and through break contacts 3 and make contacts 2 of the sequence device SEQ to the battery-connected operate winding of the units register UR. At the same time the circuit interruption impulses are transmitted to series relay 1116 which operates, as noted, and operates series auxiliary relay 1117.

When line relay 1103 comes to rest, operated, at the end of the dialing of the units digit, series relay 1116 restores after a slight delay and thereafter restores series auxiliary relay 1117 as noted to deliver another stepping impulse to the sequence counter SEQ. The stepping impulse thereupon delivered to the winding of the sequence counter SEQ causes it to shift its make contacts 3 to their alternate position which opens the operate circuit of the units register UR and connects wire 1134 to wire 1135 through break contacts 2 of relays 1116 and 1117.

As described hereinbefore with reference to connector 1000, battery from the chain-end wire completes an operate circuit for the chain relay 1113. This circuit is from the chain-end wire CH–END, the break contacts 8 of the chain relay, the winding of relay 1113, wire 1134, make contacts 3 and break contacts 4 of sequence device SEQ, and through break contacts 2 of relays 1116 and 1117 to grounded conductor 1135.

Relay 1113 operates provided no other connector has a chain relay operated. At its make contacts 3, relay 1113 closes an operate circuit for the chain auxiliary relay 1114; its make contacts 1 connect the called sleeve to sleeve test relays 800; its makes contacts 2 connect the guard lead G from the associated switch vertical to the guard lead extending to the sleeve test relays 800; its contacts 4 locks itself operated to grounded conductor 1135; its make contacts 5 complete an operate circuit for the cut-through relay 1111; its make contacts 6 connect the busy wire BU to the busy relay in the event that the called line is busy; and its make contacts 7 prepare an operate circuit for transfer relay 1112.

Chain auxiliary relay 1114 operates and at its make contacts 1 connects the switch-through wire SW–THRU to the battery-connected winding of switch-through relay 1101; its contacts 2 to 4 connect the respective digit wires DG–1 to DG–3 to the associated wires extending to the initial digit register in the event that an initial trunk level is dialed; its make contacts 5 and 6 ground the selected one of the tens and units wires extending to sleeve test relay 800; and its make contacts 7 connect the secondary-off-normal wire SON to the hold-magnet operate wire HM–OP associated with this connector.

As hereinbefore described with reference to connector 1000, the ground appearing on the selected one of the tens wires T–1 to T–0 causes the upper or lower auxiliary select magnet of the connector switch associated with the called tens group to operate and the ground on the selected one of the units wire U–1 to U–0 operates the principal select magnet associated with the called line.

Responsive to the operation of the select magnet, ground on the secondary-off-normal wire SON is extended through the make contacts 7 of chain auxiliary relay 1114 to the hold magnet operate lead HM—OP to operate the hold magnet associated with the connector 1100.

If the called line is idle, as hereinbefore described with reference to connector 1000, ground appears on the cut-through lead CT and is extended through break contacts 3 and make contacts 2 of the initial digit register IDR, wire 1136, and contacts 5 of the operated chain relay 1113 to the battery-connected winding of cut-through relay 1111.

Cut-through relay 1111 operates and locks through its make contacts 8 to grounded conductor 1153. Contacts 1, 2, and 3 of relay 1111 apply ringing current to the called line in series with the winding of ring-trip relay 1109; its make contacts 4 ground the sleeve conductor of the called line; its make contacts 5 provide an additional locking ground for the operated hold magnet; its make contacts 6 prepare a locking circuit for ring-cutoff relay 1108; its make contacts 7 open the operate circuit of the chain relay permitting it to restore; and its make contacts 9 apply ringing tone over conductor RT, through make contacts 3 of off-normal relay 1118, break contacts 5 of relays 1110 and 1108 and through tone-coupling condenser 1121 to the tip conductor T to signal the calling party that ringing has started.

Responsive to the restoration of chain relay 1113 and the consequent restoration of chain auxiliary relay 1114 a short time thereafter, ground is removed from the selected ones of the tens and units wires thereby permitting the common control apparatus to be cleared out in the manner described hereinbefore.

VIC5. *The called line tests busy*

Assuming that the called line is busy, as hereinbefore described with reference to sleeve test relays 800, ground appears on the busy conductor BU to operate busy relay 1110. Contacts thereon restore the chain relay and return busy tone signals to the calling line.

VIC6. *Called line answer*

Ring trip relay 1109, whose winding is included in the ringing circuit does not operate before the call is answered as the usual condenser in series therewith blocks the direct-current flow.

When the call is answered at the called station on the called line, the closure of the usual talking bridge across the called line causes direct-current to flow thereover from the trip battery and coded generator leads thereby operating ring trip relay 1109. Relay 1109 extends ground potential to the battery-connected winding of ring-cutoff relay 1108.

Ring-cutoff relay 1108 operates and locks through its make contacts 4 to the ground at make contacts 6 of cut-through relay 1111; its contacts 1 and 2 open the ringing circuit and restore ring-trip relay 1109; its contacts 2 and 3 connect the tip and ring conductor of the called line to the battery and ground connected windings of back-bridge relay 1105 through break contacts 1 and 2 of differential auxiliary relay 1106; and its contacts 5 open the ring-tone circuit.

The transmitter current flow through the winding of back-bridge relay 1105 causes it to operate. Contacts 1 of relay 1105 extend ground potential to the battery-connected winding of the reverse-battery relay 1102; and at its break contacts 2 opens the idle-test conductor IT to prevent the connector from giving an idle indication until both the calling and called parties have disconnected.

VIC7. *Answered supervision*

Reverse-battery relay 1102 operates and at its make contacts 1 and 2 reverse the tip and ring conductors of the calling line performing any required supervisory function; its break contacts 3 open the pulse circuit to prevent any further dialing; and its make contacts 4 locks the cut-through relay 1111 operated independent of the release relay. Accordingly, under such arrangement, connector 1100 is rendered last party release, as will be described hereinafter.

During conversation, the following relays of connector 1100 are operated:

(1) Reverse battery relay 1102
(2) Line relay 1103
(3) Back-bridge relay 1105
(4) Release relay 1107
(5) Ring cutoff relay 1108
(6) Cut-through relay 1112
(7) Restricted service relay 1115 and
(8) Off-normal relay 1118

Additionally the four counters SEQ, IDR, TR, and UR are held operated by residual magnetism.

VIC8. *Clearout*

Responsive to disconnect by both the calling and called parties, connector 1100 is cleared out.

Assuming that the calling line disconnects first, the opening of the line loop across the tip and ring conductors restores line relay 1103 which restores release relay 1107. The remaining relays are held operated from control from back-bridge relay 1105.

When the called line disconnects thereafter, back-bridge relay 1105 restores and restores reverse-battery relay 1102. Responsive to the restoration of reverse-battery relay 1102, ground is removed from conductor 1153 permitting the restoration of cut-through relay 1111. Cut-through relay 1111 open-circuits ring-cutoff relay 1108 and restricted service relay 1115. Off-normal relay 1118 is held operated from the grounded off-normal contacts 1 of the counters SEQ to UR.

Responsive to the restoration of reverse-battery relay 1102, ground potential from break contacts 5 of switch-through relay 1101 is extended through break contacts of line relay 1103, break contacts 3 of reverse-battery relay 1102, wire 1138, break contacts 2 of release relay 1107, wire 1121, and make contacts 1 of off-normal relay 1118 to the series battery-connected upper winding of the sequence counter SEQ, the initial digit register IDR and the tens and units registers TR and UR.

The magnetic flux generated by the current flow through the restoring windings of the counters in opposition to the residual magnetism maintaining such counters operated, thereby each counter restores. Responsive to the restoration of each of the magnetic impulse counters, the operating circuit of off-normal relay 1118 is opened, permitting it to restore.

With the restoration of the off-normal relay 1118, the knockdown or restoration circuit of the counter is opened at its contacts 1, and the idle test wire IT is again connected to the battery-connected winding of restricted service relay 1115 indicating to the common equipment that such connector is idle and ready to receive another call.

VID. *Executive right-of-way*

Connector 1100 provides a feature whereby an executive may have a special telephone having a control key giving him special privileges, such as cutting-in on a busy line. This arrangement is common when the 100-line unit is a private branch exchange.

Assuming that the calling subscriber who has an executive right-of-way feature, calls a busy line and receives busy tone. At such time, line relay 1110, and off-normal relay 1118 are operated.

Upon the receipt of busy tone, operation of the executive right-of-way key places ground potential on the ring side of the calling line. This ground is extended through break contacts 2 of relays 1101 and 1102 to the battery-connected winding of line relay 1103 through the lower winding of differential relay 1104 (the short-circuit of relay 1104 is removed at break contacts 2 of busy relay 1110).

Differential relay 1104 operates and at its make contacts extends ground potential to the battery-connected winding of the differential auxiliary relay 1106 which operates and locks operated at its make contacts 8 to the grounded conductor 1154. Contacts 4 thereon remove busy tone from the calling line and at make contacts 1 and 2 connect the tip and ring conductors of the called line through to the tip and ring conductors of the calling line through coupling condensers 1119 and 1120. The executive can now converse with or listen to the called busy line.

When the connector is restored as hereinbefore described, the executive auxiliary relay 1106 restores responsive to the restoration of release relay 1107.

VIE. *Trunk group assigned verticals*

Responsive to the dialing of the initial digit 8 assigned trunk groups terminated on switch verticals and the consequent restoration of the series and the series auxiliary relays 1116 and 1117, ground potential from grounded conductor 1135 is extended through break contacts 2 of relays 1116 and 1117, break contacts 10 and make contacts 9 of initial digit register IDR, conductor 1152, break contacts 2 of restricted service relay 1116, break contacts 3 of chain auxiliary relay 1114, and through break contacts 4 of chain relay 1113 to one side of the winding of relay 1113.

Chain relay 1113 operates from the battery appearing on the chain-end conductor CH–END as hereinbefore described and operates the chain auxiliary relay 1114.

The ground appearing on conductor 1152 which operated chain relay 1113 is now extended to the digit group wire DG–3 through contacts 3 of the chain auxiliary relay 1114, and is further extended through make contacts 7 of chain relay 1113 to the battery-connected winding of transfer relay 1112.

Transfer relay 1112 operates, and at its contacts 2 and 3 transfer the incoming lower and upper sleeve wires LS and US to the associated conductors extending to the sleeve test relays 800; its make contacts 4 transfer the incoming lock lead IL to the lock ground conductor of the sleeve test relays; and its make contacts 5 connect the incoming mark lead to the mark lead conductor extending to sleeve test relays 800.

As hereinbefore described with reference to sleeve test relays 800, operations occur responsive to the appearance of ground on a digit group wire such as DG–3, to extend the connection directly to the called trunk vertical and to release connector 1100 for use on other calls. The release of connector 1100 is due to the release of the hold magnet associated with the originating vertical by removing ground potential from the incoming lock conductor IL by operation of the clearout relay 534 of the sleeve test relays 800.

VIF. *Trunks assigned horizontals*

Responsive to the calling of a trunk group assigned a line circuit, the dialing of the initial digit (such as "0") assigned such trunk group operates the chain and chain auxiliary relays 1113 and 1114 in the manner as described for dialing of a trunk group assigned switch verticals. Responsive to the operation of such relays, ground potential is extended to the digit group wire DG–1.

Assuming the initial digit 0 to be dialed, ground on wire 1135 is extended through make contacts 4 of relay 1114 to the digit group wire DG–1 extending to sleeve test relays 800.

As hereinbefore described with reference to the sleeve test relays 800, the grounding of digit group wire DG–1 causes the common control apparatus to seize an idle trunk in a called group as hereinbefore described.

Following such operation, ground appears on the switch-through conductor SW–THRU from whence it is extended through make contacts 1 of the chain auxiliary relay 1114 to the battery-connected winding of the switch-through relay 1101.

Switch-through relay 1101 operates and locks operated through its make contacts 8 to grounded connector 1155. Make contacts 1 and 2 of relay 1101 connect the tip and ring conductors of the calling line through metallically to the tip and ring conductors of the selected trunk in the trunk group; its make contacts 3 extend ground potential to the called sleeve to permit relay 1111 to restore without losing the ground on the called sleeve; its make contacts 4 place a ground on the lock conductor L maintaining the concerned hold magnet operated when release relay 1107 restores; its break contacts 5 open the pulsing circuit to prevent a pulse generated by the restoration of the line relay from advancing the digit registers; its break contacts 6 open the idle-test conductor IT to prevent connector 1100 from appearing idle and being seized for use on another call; its break contacts 7 remove ground from conductor 1153; and its make contacts 9 ground the incoming lock conductor IL to maintain the incoming connection intact.

Responsive to the operation of switch-through relay 1101 and the switching-through to the called tip and ring conductors, line relay 1103 restores followed by the restoration of the release relay 1107, and cut-through relay 1111. At such time, switch-through relay 1101, and off-normal relay 1118 are the only relays held operated.

Responsive to disconnect by the calling line, the ground potential on the selected one of the upper or lower select leads LS or US is removed from the battery-connected winding of switch-through relay 1101, permitting it to restore. Following the restoration of switch-through relay 1101, break contacts 5 ground conductor 1138 as hereinbefore described to release all of the operated counters SEQ to UR.

Following the restoration of the counters and the consequent restoration of off-normal relay 1118, the connector circuit is returned to an idle condition.

I claim:

1. In a switching system for connecting calling and called lines with trunks, a group of crossbar switches each including a numerical switching section and a non-numerical switching section, each section including line multiples and a set of intersecting trunk multiples, together with selectively operable crosspoint means for connecting any line multiple of the section to any trunk multiple thereof, lines and distributing-frame means for connecting them to respective line multiples of one section of any switch, distributing-frame means for connecting the line multiples of the non-numerical sections to respective line multiples of the numerical sections, originating trunks and wiring means for connecting them to respective trunk multiples of the non-numerical sections, terminating trunks and wiring means for connecting them to respective trunk multiples of the numerical sections, control means responsive to a calling condition on any line for selecting and operating a crosspoint means in the associated non-numerical section to connect the associated line multiple of the calling line to the trunk multiple of an idle originating trunk, line selecting means controllable over any terminating trunk connected to a trunk multiple in any numerical section for selecting any called line connected to a line multiple included in that section, and means controlled by the line selecting means for selecting and operating a crosspoint means to connect the last said line multiple and trunk multiple together.

2. In a switching system for connecting calling and called lines with trunks, a frame group of crossbar switches, each switch including a numerical switching section and a non-numerical switching section, each switch including line multiples, each section including trunk multiples intersecting the associated line multiples, together with selectively operable crosspoint means for connecting any line multiple of the section to any associated trunk multiple, lines and wiring means for connecting them to respective line multiples, originating trunks and wiring means for connecting them to respective trunk multiples of the non-numerical sections, terminating trunks and wiring means for connecting them to respective trunk multiples of the numerical sections, control means responsive to a calling condition on any line for selecting and operating a crosspoint means in the associated non-numerical section to connect the associated line multiple of the calling line to the trunk multiple of an idle originating trunk, line selecting means controllable over any terminating trunk connected to a trunk multiple in any numerical section for selecting any called line connected to a line multiple included in that section, means controlled by the line selecting means for selecting and operating a crosspoint means to connect the last said line multiple and trunk multiple together, a frame controller, the means for selecting and operating the crosspoint means of either section of any switch of the frame group being included in the frame controller, and means for individualizing the frame controller temporarily with any switch section in which a crosspoint means is to be selected and operated.

3. In a switching system according to claim 2, the originating-trunk wiring means connecting each originating trunk to a trunk multiple of at least two non-numerical sections, and the terminating-trunk wiring means connecting each terminating trunk to a trunk multiple of at least two numerical sections.

4. In a switching system according to claim 2, wherein the frame group comprises more than two switches, the originating-trunk wiring means connecting each originating trunk to a trunk multiple of at least two non-numerical sections, with at least one originating trunk being connected to fewer than all of the non-numerical sections, and the terminating-trunk wiring means connecting each terminating trunk to a trunk multiple of each numerical section.

5. In a switching system according to claim 4, wherein there are more trunk multiples in each numerical section than there are in any non-numerical section, thereby increasing the number of full-multiplied terminating trunks to equal the number of originating trunks obtainable from the smaller number of originating-trunk multiples when a given portion of the originating trunks are full-multipled with the remainder being partial-multipled.

6. In a switching system according to claim 4, means in the frame controller for giving first choice to any idle originating trunk connected to less than the full number of non-numerical sections before selecting a crosspoint associated with an idle originating trunk connected to all the non-numerical sections.

7. In a switching system according to claim 6, means for establishing an order of preference among the partial-multipled originating trunks for connection therewith when idle, and means for periodically shifting that preference responsive to connections to the trunks.

8. In a switching system, lines, links and a group of trunks, first, second, and third switching devices, means responsive to a calling condition on any line for operating a first switching device to connect the calling line with an idle link, call-indicating means associated with the connected link for either indicating a call for the group of trunks or a call for any line, means responsive to the call-indicating means indicating a call for a line for operating a second switching device to connect the connected link to the called line, means responsive to the call-indicating means indicating a call for the trunk group for selecting an idle trunk of the group and for placing an identifying condition on the calling line by way of the connected link, test means for testing the lines to locate the marked line, means controlled by the test means for operating a third switching device to connect the selected trunk to the located marked line, and means for restoring the operated first switching device to disconnect the connected link from the marked line while leaving the last said line connected with the selected trunk through the operated third switching device.

9. In a switching system according to claim 8, said lines comprising groups, the first switching devices being individual respectively to the links, each first switching device including group-indicating means for indicating at its link the group containing any line to which it connects its link, line-indicating means common to the groups of lines and including a separate indicating device for each line of any group, the group-indicating means and the line-indicating means being included in the means for testing the lines to locate the marked line.

References Cited in the file of this patent

UNITED STATES PATENTS

| | | |
|---|---|---|
| 1,938,381 | Gillings et al. | Dec. 5, 1933 |
| 1,930,522 | Keyser et al. | Oct. 17, 1933 |
| 2,512,942 | Jones | June 27, 1950 |
| 2,522,000 | Shepherd | Sept. 12, 1950 |
| 2,542,999 | Deakin | Feb. 27, 1951 |
| 2,559,702 | Bellamy | July 10, 1951 |
| 2,613,278 | Stehlik | Oct. 7, 1952 |
| 2,668,195 | Brewer | Feb. 2, 1954 |
| 2,674,657 | Bellamy et al. | Apr. 6, 1954 |
| 2,741,663 | Obermann | Apr. 10, 1956 |
| 2,744,163 | Den Hertog | May 1, 1956 |
| 2,747,021 | Chubb et al. | May 22, 1956 |